(12) United States Patent
Isenhour et al.

(10) Patent No.: US 9,645,317 B2
(45) Date of Patent: May 9, 2017

(54) OPTICAL BACKPLANE EXTENSION MODULES, AND RELATED ASSEMBLIES SUITABLE FOR ESTABLISHING OPTICAL CONNECTIONS TO INFORMATION PROCESSING MODULES DISPOSED IN EQUIPMENT RACKS

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 422 days.

(21) Appl. No.: 13/952,151

(22) Filed: Jul. 26, 2013

(65) Prior Publication Data
US 2014/0029907 A1    Jan. 30, 2014

Related U.S. Application Data

(63) Continuation of application No. PCT/US2012/023635, filed on Feb. 2, 2012.
(Continued)

(51) Int. Cl.
*G02B 6/36* (2006.01)
*G02B 6/32* (2006.01)
(Continued)

(52) U.S. Cl.
CPC ............ *G02B 6/32* (2013.01); *G02B 6/3834* (2013.01); *G02B 6/3849* (2013.01);
(Continued)

(58) Field of Classification Search
None
See application file for complete search history.

(56) References Cited

U.S. PATENT DOCUMENTS

| 620,013 A | 2/1899 | Barnes |
|---|---|---|
| 864,761 A | 8/1907 | Erickson |

(Continued)

FOREIGN PATENT DOCUMENTS

| AU | 2010270959 A1 | 2/2012 |
|---|---|---|
| CA | 2029592 A1 | 5/1992 |

(Continued)

OTHER PUBLICATIONS

Advisory Action for U.S. Appl. No. 12/394,114 mailed Jan. 16, 2015, 3 pages.
(Continued)

*Primary Examiner* — Hemang Sanghavi

(57) ABSTRACT

Optical backplane extension modules and related assemblies suitable for establishing optical connections to information processing modules disposed in equipment racks are disclosed. In one embodiment, an optical backplane extension module is provided. The optical backplane extension module comprises an extension module housing comprising an interior space defined by a base, a left side disposed on a left end of the base, a right side disposed on a right end of the base opposite the left end, and a rear side disposed on a rear end of the base. A plurality of backplane fiber optic connectors are disposed through the rear side of the extension module housing and accessible through an exterior side of the rear side. The plurality of backplane fiber optic connectors configured to be directly optically connected to a plurality of blade fiber optic connectors disposed in a plurality of information processing modules disposed in a rack module housing.

19 Claims, 49 Drawing Sheets

Related U.S. Application Data

(60) Provisional application No. 61/438,847, filed on Feb. 2, 2011.

(51) Int. Cl.
*G02B 6/44* (2006.01)
*G02B 6/46* (2006.01)
*G02B 6/25* (2006.01)
*G02B 6/38* (2006.01)
*G02B 6/43* (2006.01)

(52) U.S. Cl.
CPC ......... *G02B 6/3869* (2013.01); *G02B 6/3885* (2013.01); *G02B 6/4447* (2013.01); *G02B 6/4452* (2013.01); *G02B 6/46* (2013.01); *G02B 6/25* (2013.01); *G02B 6/3644* (2013.01); *G02B 6/3652* (2013.01); *G02B 6/3672* (2013.01); *G02B 6/3825* (2013.01); *G02B 6/3853* (2013.01); *G02B 6/3865* (2013.01); *G02B 6/3897* (2013.01); *G02B 6/43* (2013.01); *G02B 6/4471* (2013.01); *Y10T 29/49002* (2015.01)

(56) References Cited

U.S. PATENT DOCUMENTS

| | | |
|---|---|---|
| 2,528,910 A | 11/1950 | Poe |
| 2,614,685 A | 10/1952 | Miller |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,646,244 A | 2/1972 | Cole |
| 3,664,514 A | 5/1972 | Drake |
| 3,683,238 A | 8/1972 | Olds et al. |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow et al. |
| 4,911,662 A | 3/1990 | Debortoli et al. |
| 4,913,514 A | 4/1990 | Then |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |

(56) References Cited

U.S. PATENT DOCUMENTS

| | | |
|---|---|---|
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,495,549 A | 2/1996 | Schneider et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. .......... 385/134 |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,721,564 A | 2/1998 | Patel |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,987,203 A | 11/1999 | Abel et al. |
| 5,993,071 A | 11/1999 | Hultermans |
| 5,995,700 A | 11/1999 | Burek et al. |

(56) References Cited

U.S. PATENT DOCUMENTS

| | | | |
|---|---|---|---|
| 5,999,393 A | 12/1999 | Brower | |
| 6,001,831 A | 12/1999 | Papenfuhs et al. | |
| 6,009,224 A | 12/1999 | Allen | |
| 6,009,225 A | 12/1999 | Ray et al. | |
| 6,011,831 A | 1/2000 | Nieves et al. | |
| 6,027,252 A | 2/2000 | Erdman et al. | |
| 6,027,352 A | 2/2000 | Byrne | |
| 6,041,042 A | 3/2000 | Bussiere | |
| 6,044,193 A | 3/2000 | Szentesi et al. | |
| 6,049,963 A | 4/2000 | Boe | |
| 6,058,235 A | 5/2000 | Hiramatsu et al. | |
| 6,061,492 A | 5/2000 | Strause et al. | |
| 6,078,661 A | 6/2000 | Arnett et al. | |
| 6,079,881 A | 6/2000 | Roth | |
| 6,088,497 A | 7/2000 | Phillips et al. | |
| 6,118,075 A | 9/2000 | Baker et al. | |
| 6,118,868 A | 9/2000 | Daoud | |
| 6,127,627 A | 10/2000 | Daoud | |
| 6,130,983 A | 10/2000 | Cheng | |
| 6,134,370 A | 10/2000 | Childers et al. | |
| 6,141,222 A | 10/2000 | Toor et al. | |
| 6,149,313 A | 11/2000 | Giebel et al. | |
| 6,149,315 A | 11/2000 | Stephenson | |
| 6,151,432 A | 11/2000 | Nakajima et al. | |
| 6,160,946 A | 12/2000 | Thompson et al. | |
| 6,170,784 B1 | 1/2001 | MacDonald et al. | |
| 6,172,782 B1 | 1/2001 | Kobayashi | |
| 6,175,079 B1 | 1/2001 | Johnston et al. | |
| 6,181,861 B1 | 1/2001 | Wenski et al. | |
| 6,188,687 B1 | 2/2001 | Mussman et al. | |
| 6,188,825 B1 | 2/2001 | Bandy et al. | |
| 6,192,180 B1 | 2/2001 | Kim et al. | |
| 6,200,170 B1 | 3/2001 | Amberg et al. | |
| 6,201,919 B1 | 3/2001 | Puetz et al. | |
| 6,201,920 B1 | 3/2001 | Noble et al. | |
| 6,208,796 B1 | 3/2001 | Williams Vigliaturo | |
| 6,212,324 B1 | 4/2001 | Lin et al. | |
| 6,215,938 B1 | 4/2001 | Reitmeier et al. | |
| 6,216,987 B1 | 4/2001 | Fukuo | |
| 6,227,717 B1 | 5/2001 | Ott et al. | |
| 6,229,948 B1 | 5/2001 | Blee et al. | |
| 6,234,683 B1 | 5/2001 | Waldron et al. | |
| 6,234,685 B1 | 5/2001 | Carlisle et al. | |
| 6,236,795 B1 | 5/2001 | Rodgers | |
| 6,240,229 B1 | 5/2001 | Roth | |
| 6,243,522 B1 | 6/2001 | Allan et al. | |
| 6,245,998 B1 | 6/2001 | Curry et al. | |
| 6,247,851 B1 | 6/2001 | Ichihara | |
| 6,250,816 B1 | 6/2001 | Johnston et al. | |
| 6,259,850 B1 | 7/2001 | Crosby, Jr. et al. | |
| 6,263,141 B1 | 7/2001 | Smith | |
| 6,265,680 B1 | 7/2001 | Robertson | |
| 6,269,212 B1 | 7/2001 | Schiattone | |
| 6,273,532 B1 | 8/2001 | Chen et al. | |
| 6,275,641 B1 | 8/2001 | Daoud | |
| 6,278,829 B1 | 8/2001 | BuAbbud et al. | |
| 6,278,831 B1 | 8/2001 | Henderson et al. | |
| D448,005 S | 9/2001 | Klein, Jr. et al. | |
| 6,289,618 B1 | 9/2001 | Kump et al. | |
| 6,292,614 B1 | 9/2001 | Smith et al. | |
| 6,301,424 B1 | 10/2001 | Hwang | |
| 6,305,848 B1 | 10/2001 | Gregory | 385/53 |
| 6,307,997 B1 | 10/2001 | Walters et al. | |
| 6,318,824 B1 | 11/2001 | LaGrotta et al. | |
| 6,321,017 B1 | 11/2001 | Janus et al. | |
| 6,322,279 B1 | 11/2001 | Yamamoto et al. | |
| 6,324,575 B1 | 11/2001 | Jain et al. | |
| 6,325,549 B1 | 12/2001 | Shevchuk | |
| 6,327,059 B1 | 12/2001 | Bhalla et al. | |
| RE37,489 E | 1/2002 | Anton et al. | |
| 6,343,313 B1 | 1/2002 | Salesky et al. | |
| 6,344,615 B1 | 2/2002 | Nolf et al. | |
| 6,347,888 B1 | 2/2002 | Puetz | |
| 6,353,696 B1 | 3/2002 | Gordon et al. | |
| 6,353,697 B1 | 3/2002 | Daoud | |
| 6,357,712 B1 | 3/2002 | Lu | |
| 6,359,228 B1 | 3/2002 | Strause et al. | |
| 6,363,198 B1 | 3/2002 | Braga et al. | |
| 6,363,200 B1 | 3/2002 | Thompson et al. | |
| 6,370,309 B1 | 4/2002 | Daoud | |
| 6,371,419 B1 | 4/2002 | Ohnuki | |
| 6,375,129 B2 | 4/2002 | Koziol | |
| 6,377,218 B1 | 4/2002 | Nelson et al. | |
| 6,379,052 B1 | 4/2002 | De Jong et al. | |
| 6,381,642 B1 | 4/2002 | O'Donnell et al. | |
| 6,385,374 B2 | 5/2002 | Kropp | |
| 6,385,381 B1 | 5/2002 | Janus et al. | |
| 6,389,214 B1 | 5/2002 | Smith et al. | |
| 6,392,140 B1 | 5/2002 | Yee et al. | |
| 6,397,166 B1 | 5/2002 | Leung et al. | |
| 6,398,149 B1 | 6/2002 | Hines et al. | |
| 6,406,314 B1 | 6/2002 | Byrne | |
| 6,410,850 B1 | 6/2002 | Abel et al. | |
| 6,411,767 B1 | 6/2002 | Burrous et al. | |
| 6,412,986 B1 | 7/2002 | Ngo et al. | |
| 6,418,262 B1 | 7/2002 | Puetz et al. | |
| 6,419,519 B1 | 7/2002 | Young | |
| 6,424,781 B1 | 7/2002 | Puetz et al. | |
| 6,425,694 B1 | 7/2002 | Szilagyi et al. | |
| 6,427,045 B1 | 7/2002 | Matthes et al. | |
| 6,431,762 B1 | 8/2002 | Taira et al. | |
| 6,434,313 B1 | 8/2002 | Clapp, Jr. et al. | |
| 6,438,310 B1 | 8/2002 | Lance et al. | |
| 6,452,925 B1 | 9/2002 | Sistanizadeh et al. | |
| 6,456,773 B1 | 9/2002 | Keys | |
| 6,464,402 B1 | 10/2002 | Andrews et al. | |
| 6,466,724 B1 | 10/2002 | Glover et al. | |
| 6,469,905 B1 | 10/2002 | Hwang | |
| D466,087 S | 11/2002 | Cuny et al. | |
| 6,478,472 B1 | 11/2002 | Anderson et al. | |
| 6,480,487 B1 | 11/2002 | Wegleitner et al. | |
| 6,480,660 B1 | 11/2002 | Reitmeier et al. | |
| 6,483,977 B2 | 11/2002 | Battey et al. | |
| 6,484,958 B1 | 11/2002 | Xue et al. | |
| 6,494,550 B1 | 12/2002 | Chen et al. | |
| 6,496,640 B1 | 12/2002 | Harvey et al. | |
| 6,504,988 B1 | 1/2003 | Trebesch et al. | |
| 6,507,980 B2 | 1/2003 | Bremicker | |
| 6,510,274 B1 | 1/2003 | Wu et al. | |
| 6,532,332 B2 | 3/2003 | Solheid et al. | |
| 6,533,472 B1 | 3/2003 | Dinh et al. | |
| 6,535,397 B2 | 3/2003 | Clark et al. | |
| 6,539,147 B1 | 3/2003 | Mahony | |
| 6,539,160 B2 | 3/2003 | Battey et al. | |
| 6,542,688 B1 | 4/2003 | Battey et al. | |
| 6,544,075 B1 | 4/2003 | Liao | |
| 6,550,977 B2 | 4/2003 | Hizuka | |
| 6,554,485 B1 | 4/2003 | Beatty et al. | |
| 6,560,334 B1 | 5/2003 | Mullaney et al. | |
| 6,567,601 B2 | 5/2003 | Daoud et al. | |
| 6,568,542 B1 | 5/2003 | Chen | |
| 6,571,048 B1 | 5/2003 | Bechamps et al. | |
| 6,577,595 B1 | 6/2003 | Counterman | |
| 6,577,801 B2 | 6/2003 | Broderick et al. | |
| 6,579,014 B2 | 6/2003 | Melton et al. | |
| 6,584,267 B1 | 6/2003 | Caveney et al. | |
| 6,585,423 B1 | 7/2003 | Vergeest | |
| 6,587,630 B2 | 7/2003 | Spence et al. | |
| 6,588,938 B1 | 7/2003 | Lampert et al. | |
| 6,591,051 B2 | 7/2003 | Solheid et al. | |
| 6,591,053 B2 | 7/2003 | Fritz | |
| 6,592,266 B1 | 7/2003 | Hankins et al. | |
| 6,597,670 B1 | 7/2003 | Tweedy et al. | |
| 6,600,106 B2 | 7/2003 | Standish et al. | |
| 6,600,866 B2 | 7/2003 | Gatica et al. | |
| 6,601,997 B2 | 8/2003 | Ngo | |
| 6,612,515 B1 | 9/2003 | Tinucci et al. | |
| 6,612,874 B1 | 9/2003 | Stout et al. | |
| 6,614,978 B1 | 9/2003 | Caveney | |
| 6,614,980 B1 | 9/2003 | Mahony | |
| 6,621,975 B2 | 9/2003 | Laporte et al. | |
| 6,622,873 B2 | 9/2003 | Hegrenes et al. | |
| 6,624,389 B1 | 9/2003 | Cox | |
| 6,625,374 B2 | 9/2003 | Holman et al. | |

(56) References Cited

U.S. PATENT DOCUMENTS

| | | |
|---|---|---|
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,728,462 B2 | 4/2004 | Wu et al. |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,792,191 B1 | 9/2004 | Clapp, Jr. et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler ............... 361/752 |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke et al. |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |

(56) References Cited

U.S. PATENT DOCUMENTS

| | | |
|---|---|---|
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,738,757 B1 * | 6/2010 | Pakravan ............ G02B 6/3897 370/351 |
| 7,740,409 B2 | 6/2010 | Bolton et al. |
| 7,743,495 B2 | 6/2010 | Mori et al. |
| 7,748,911 B2 | 7/2010 | Keenum et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,899,298 B2 | 3/2011 | Cox et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |

(56) References Cited

U.S. PATENT DOCUMENTS

| | | |
|---|---|---|
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 | 2/2013 | Wakileh et al. |
| 8,391,666 B2 | 3/2013 | Hertzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,702,318 B2 | 4/2014 | Isenhour et al. |
| 8,824,850 B2 | 9/2014 | Garcia et al. |
| 9,020,320 B2 | 4/2015 | Cooke et al. |
| 9,268,091 B2 | 2/2016 | de Jong et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0123834 A1 | 7/2003 | Burek et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147155 A1* | 7/2006 | Fattal .................. G02B 6/3825 385/53 |
| 2006/0147171 A1 | 7/2006 | Dofher |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047891 A1 | 3/2007 | Bayazit et al. |
| 2007/0047894 A1 | 3/2007 | Holmberg et al. |
| 2007/0058641 A1 | 3/2007 | Cicchetti et al. |
| 2007/0086725 A1 | 4/2007 | Sasaki et al. .................. 385/137 |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. .................. 710/301 |
| 2007/0274718 A1 | 11/2007 | Bridges et al. |
| 2008/0011514 A1 | 1/2008 | Zheng et al. |

(56) References Cited

U.S. PATENT DOCUMENTS

| | | |
|---|---|---|
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180737 A1 | 7/2009 | Burnham et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0290843 A1 | 11/2009 | Reagan et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054665 A1 | 3/2010 | Jones et al. |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0183270 A1 | 7/2010 | Davis et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0215330 A1 | 8/2010 | Sokolowski et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0058786 A1 | 3/2011 | Zimmel |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |

(56) References Cited

U.S. PATENT DOCUMENTS

| | | |
|---|---|---|
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0235985 A1 | 9/2011 | Cote et al. |
| 2011/0249950 A1 | 10/2011 | Chapa Ramirez et al. |
| 2011/0262096 A1 | 10/2011 | Fabrykowski et al. |
| 2011/0268404 A1 | 11/2011 | Cote et al. |
| 2011/0268405 A1 | 11/2011 | Cote et al. |
| 2011/0268406 A1 | 11/2011 | Giraud et al. |
| 2011/0268407 A1 | 11/2011 | Cowen et al. |
| 2011/0268408 A1 | 11/2011 | Giraud et al. |
| 2011/0268409 A1 | 11/2011 | Giraud et al. |
| 2011/0268410 A1 | 11/2011 | Giraud et al. |
| 2011/0268411 A1 | 11/2011 | Giraud et al. |
| 2011/0268412 A1 | 11/2011 | Giraud et al. |
| 2011/0268413 A1 | 11/2011 | Cote et al. |
| 2011/0268414 A1 | 11/2011 | Giraud et al. |
| 2011/0274402 A1 | 11/2011 | Giraud et al. |
| 2011/0280535 A1 | 11/2011 | Womack |
| 2011/0280537 A1 | 11/2011 | Cowen et al. |
| 2012/0020629 A1 | 1/2012 | Shiratori et al. |
| 2012/0025683 A1 | 2/2012 | Mattlin et al. |
| 2012/0027354 A1* | 2/2012 | Katayama ........... H04B 10/801 385/54 |
| 2012/0051707 A1 | 3/2012 | Barnes et al. |
| 2012/0057836 A1 | 3/2012 | Andrzejewski et al. |
| 2012/0057838 A1 | 3/2012 | Hill et al. |
| 2012/0106897 A1 | 5/2012 | Cline et al. |
| 2012/0106899 A1 | 5/2012 | Choi |
| 2012/0106911 A1 | 5/2012 | Cooke et al. |
| 2012/0134639 A1 | 5/2012 | Giraud et al. |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0056599 A1 | 3/2013 | Baker et al. |
| 2013/0058616 A1 | 3/2013 | Cote et al. |
| 2013/0072053 A1 | 3/2013 | Fabrykowski et al. |
| 2013/0077927 A1 | 3/2013 | O'Connor |
| 2013/0134115 A1 | 5/2013 | Hernandez-Ariguznaga |
| 2013/0214108 A1 | 8/2013 | Irudayaraj et al. |
| 2013/0243386 A1 | 9/2013 | Pimentel et al. |
| 2013/0251326 A1 | 9/2013 | Cooke et al. |
| 2013/0266282 A1 | 10/2013 | Cote et al. |
| 2013/0308908 A1 | 11/2013 | Isenhour et al. |
| 2013/0308915 A1 | 11/2013 | Buff et al. |
| 2013/0308916 A1 | 11/2013 | Buff et al. |
| 2013/0328258 A1 | 12/2013 | Mutsuno |
| 2014/0003782 A1 | 1/2014 | Blackwell, Jr. et al. |
| 2014/0010510 A1 | 1/2014 | Blackard |
| 2014/0037251 A1 | 2/2014 | Isenhour et al. |
| 2014/0049931 A1* | 2/2014 | Wellbrock ........... H04B 10/801 361/788 |
| 2014/0079366 A1 | 3/2014 | Rodriguez et al. |
| 2014/0112628 A1 | 4/2014 | Keenum et al. |
| 2014/0226946 A1 | 8/2014 | Cooke et al. |
| 2015/0027967 A1 | 1/2015 | Vazquez et al. |
| 2015/0185429 A1 | 7/2015 | Cooke et al. |

FOREIGN PATENT DOCUMENTS

| | | | |
|---|---|---|---|
| CA | 2186314 A1 | 4/1997 | |
| CA | 2765835 A1 | 1/2011 | |
| CH | 688705 A5 | 1/1998 | |
| CN | 1228847 A | 9/1999 | |
| CN | 1471649 A | 1/2004 | |
| CN | 1643421 A | 7/2005 | |
| CN | 1945368 A | 4/2007 | |
| CN | 101228466 A | 7/2008 | |
| CN | 101866035 A | 10/2010 | |
| CN | 102460258 A | 5/2012 | |
| CN | 101828137 B | 9/2012 | |
| DE | 8711970 U1 | 10/1987 | |
| DE | 3726718 A1 | 2/1989 | |
| DE | 3726719 A1 | 2/1989 | |
| DE | 4030301 A1 | 3/1992 | |
| DE | 4231181 C1 | 8/1993 | |
| DE | 20115940 U1 | 1/2002 | |
| DE | 10338848 A1 | 3/2005 | |
| DE | 202005009932 U1 | 11/2005 | |
| DE | 202007000556 U1 | 10/2007 | |
| DE | 102007024476 A1 | 11/2008 | |
| DE | 202010009385 U1 | 9/2010 | |
| EP | 29512 | 6/1981 | |
| EP | 0105597 A2 | 4/1984 | |
| EP | 0250900 A2 | 1/1988 | |
| EP | 0408266 A2 | 1/1991 | |
| EP | 0474091 A1 | 8/1991 | |
| EP | 0468671 A1 | 1/1992 | |
| EP | 0490698 A1 | 6/1992 | |
| EP | 0529830 A1 | 3/1993 | |
| EP | 0544004 A1 | 6/1993 | |
| EP | 0547778 A1 | 6/1993 | |
| EP | 0581527 A1 | 2/1994 | |
| EP | 0620462 A1 | 10/1994 | |
| EP | 0693699 A1 | 1/1996 | |
| EP | 0720322 A2 | 7/1996 | |
| EP | 0776557 B1 | 6/1997 | |
| EP | 0940700 A2 | 9/1999 | |
| EP | 0949522 A2 | 10/1999 | |
| EP | 1041417 A2 | 10/2000 | |
| EP | 1056177 A1 | 11/2000 | |
| EP | 1065542 A1 | 1/2001 | |
| EP | 1162485 A2 | 12/2001 | ............... G02B 6/38 |
| EP | 1203974 A2 | 5/2002 | |
| EP | 1289319 A2 | 3/2003 | |
| EP | 1310816 A2 | 5/2003 | |
| EP | 1316829 A2 | 6/2003 | |
| EP | 1367308 A1 | 12/2003 | |
| EP | 1621907 A1 | 2/2006 | |
| EP | 1777563 A1 | 4/2007 | |
| EP | 2060942 A2 | 5/2009 | |
| EP | 2159613 A2 | 3/2010 | |
| FR | 1586331 A | 2/1970 | |
| FR | 2123728 A5 | 9/1972 | |
| FR | 2378378 A1 | 8/1978 | |
| GB | 2241591 A | 9/1991 | |
| GB | 2277812 A | 11/1994 | |
| GB | 2367379 A | 4/2002 | |
| GB | 2377839 A | 1/2003 | |
| JP | 3060994 A | 3/1991 | |
| JP | 3172806 A | 7/1991 | |
| JP | 3281378 A | 12/1991 | |
| JP | 5045541 A | 2/1993 | |
| JP | 06018749 A | 1/1994 | |
| JP | 7308011 A | 11/1995 | |
| JP | 7318761 A | 12/1995 | |
| JP | 8007308 A | 1/1996 | |
| JP | 8248235 A | 9/1996 | |
| JP | 8248237 A | 9/1996 | |
| JP | 3487946 A | 10/1996 | |
| JP | 8254620 A | 10/1996 | |
| JP | 3279474 A | 10/1997 | |
| JP | 9258033 A | 10/1997 | |
| JP | 9258055 A | 10/1997 | |
| JP | 2771870 B2 | 7/1998 | |
| JP | 3448448 A | 8/1998 | |
| JP | 10227919 A | 8/1998 | |
| JP | 3478944 A | 12/1998 | |
| JP | 10332945 A | 12/1998 | |
| JP | 10339817 A | 12/1998 | |
| JP | 11023858 A | 1/1999 | |
| JP | 2000098138 A | 4/2000 | |
| JP | 2000098139 A | 4/2000 | |

(56) References Cited

FOREIGN PATENT DOCUMENTS

| | | |
|---|---|---|
| JP | 2000241631 A | 9/2000 |
| JP | 2001004849 A | 1/2001 |
| JP | 3160322 B2 | 4/2001 |
| JP | 2001119177 A | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002032153 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005257937 A | 9/2005 |
| JP | 2005338618 A | 12/2005 |
| JP | 2006507606 A | 3/2006 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 2006276782 A | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 2007511959 A | 5/2007 |
| JP | 3934052 B2 | 6/2007 |
| JP | 2007179046 A | 7/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 2008533583 A | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009515242 A | 4/2009 |
| JP | 2009115962 A | 5/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 9959295 A1 | 11/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A1 | 2/2003 |
| WO | 2004052066 A1 | 6/2004 |
| WO | 2005020400 A1 | 3/2005 |
| WO | 2006076062 A | 7/2006 |
| WO | 2006108024 A1 | 10/2006 |
| WO | 2007050515 A1 | 5/2007 |
| WO | 2007079074 A2 | 7/2007 |
| WO | 2007089682 A2 | 8/2007 |
| WO | 2007149215 A2 | 12/2007 |
| WO | 2008027201 A2 | 3/2008 |
| WO | 2008063054 A2 | 5/2008 |
| WO | 2008113054 A2 | 9/2008 |
| WO | 2008157248 A1 | 12/2008 |
| WO | 2009026688 A1 | 3/2009 |
| WO | 2009029485 A1 | 3/2009 |
| WO | 2009030360 A1 | 3/2009 |
| WO | 2009091465 A2 | 7/2009 |
| WO | 2009120280 A2 | 10/2009 |
| WO | 2010024847 A2 | 3/2010 |
| WO | 2010080745 A1 | 7/2010 |
| WO | 2011005461 A1 | 1/2011 |

OTHER PUBLICATIONS

Notice of Allowance and Examiner-Initiated Interview Summary for U.S. Appl. No. 12/947,883 mailed Jan. 13, 2015, 11 pages.
Non-final Office Action for U.S. Appl. No. 12/818,986 mailed Jan. 5, 2015, 21 pages.
Notice of Allowance for U.S. Appl. No. 13/649,417 mailed Jan. 8, 2015, 7 pages.
Non-final Office Action for U.S. Appl. No. 12/946,217 mailed Dec. 29, 2014, 50 pages.
Notice of Allowance and Examiner-Initiated Interview Summary for U.S. Appl. No. 12/940,585 mailed Feb. 27, 2015, 16 pages.
Notice of Allowance for U.S. Appl. No. 12/953,101 mailed Feb. 20, 2015, 9 pages.
Final Office Action for U.S. Appl. No. 12/953,003 mailed Feb. 12, 2015, 14 pages.
Final Office Action for U.S. Appl. No. 12/953,039 mailed Feb. 23, 2015, 9 pages.
Notice of Allowance for U.S. Appl. No. 13/688,675 mailed Jan. 26, 2015, 7 pages.
Final Office Action for U.S. Appl. No. 12/819,065 mailed Mar. 12, 2015, 13 pages.
Examiner's Answer to the Appeal Brief for U.S. Appl. No. 12/946,139 mailed Feb. 5, 2015, 12 pages.
Notice of Allowance for U.S. Appl. No. 12/707,889 mailed Feb. 17, 2015, 7 pages.
Non-final Office Action for U.S. Appl. No. 13/902,012 mailed Feb. 17, 2015, 9 pages.
Non-final Office Action for U.S. Appl. No. 13/081,856 mailed Feb. 9, 2015, 8 pages.
Examination Report for European Patent Application No. 10707153.2, mailed Mar. 25, 2015, 6 pages.
International Search Report for PCT/US2011/057582 mailed Jan. 27, 2012, 3 pages.

(56) References Cited

OTHER PUBLICATIONS

Non-final Office Action for U.S. Appl. No. 13/901,074 mailed May 30, 2015, 8 pages.
Notice of Allowance for U.S. Appl. No. 12/947,883 mailed May 21, 2015, 11 pages.
Final Office Action for U.S. Appl. No. 12/940,699 mailed Jun. 1, 2015, 10 pages.
Non-final Office Action for U.S. Appl. No. 13/663,949 mailed May 5, 2015, 19 pages.
Non-final Office Action for U.S. Appl. No. 13/952,014 mailed Jul. 30, 2015, 9 pages.
Final Office Action for U.S. Appl. No. 12/818,986 mailed Jul. 23, 2015, 24 pages.
Non-final Office Action for U.S. Appl. No. 12/956,446 mailed Jul. 31, 2015, 14 pages.
Notice of Allowance for U.S. Appl. No. 13/902,012 mailed Aug. 5, 2015, 8 pages.
Final Office Action for U.S. Appl. No. 12/946,217, mailed Jul. 16, 2015, 50 pages.
Non-final Office Action for U.S. Appl. No. 12/394,114 mailed Aug. 12, 2015, 8 pages.
Non-final Office Action for U.S. Appl. No. 12/953,039 mailed Sep. 3, 2015, 8 pages.
Final Office Action for U.S. Appl. No. 13/081,856 mailed Sep. 8, 2015, 10 pages.
Examiner's Answer to the Appeal Brief for U.S. Appl. No. 13/663,975 mailed Oct. 5, 2015, 14 pages.
Non-final Office Action for U.S. Appl. No. 12/819,065 mailed Aug. 26, 2015, 13 pages.
Final Office Action for U.S. Appl. No. 13/567,288 mailed May 8, 2015, 13 pages.
Chinese Search Report, Application No. 201280009252X, June 25, 2015. 2 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Annex to Form PCT/ISA/2006, Communication Relating to the Results of the Partial International Search, for PCT/US2009/004549 mailed Feb. 10, 2010, 2 pages.
Annex to Form PCT/ISA/2006, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.

(56) References Cited

OTHER PUBLICATIONS

Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.

(56) References Cited

OTHER PUBLICATIONS

Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Non-final Office Action for U.S. Appl. No. 13/603,894 mailed Oct. 3, 2013, 9 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US2010/038986 mailed Aug. 18, 2010, 1 page.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Non-final Office Action for U.S. Appl. No. 13/901,074 mailed Oct. 9, 2013, 6 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
International Search Report for PCT/US2013/041268 mailed Aug. 20, 2013, 5 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.

(56) References Cited

OTHER PUBLICATIONS

Notice of Allowance and Applicant-Initiated Interview Summary for U.S. Appl. No. 12/771,473 mailed Feb. 27, 2014, 8 pages.
Non-final Office Action for U.S. Appl. No. 13/081,856 mailed Nov. 26, 2013, 11 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.
Final Office Action for U.S. Appl. No. 12/940,585 mailed Mar. 18, 2014, 15 pages.
Non-final Office Action for U.S. Appl. No. 12/953,101 mailed Apr. 3, 2014, 9 pages.
Advisory Action for U.S. Appl. No. 12/953,039 mailed Mar. 6, 2014, 3 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Notice of Allowance for U.S. Appl. No. 12/417,325 mailed Aug. 22, 2012, 7 pages.
International Search Report for PCT/US2012/023622 mailed Mar. 9, 2012, 4 pages.
International Search Report for PCT/US2012/023635 mailed Sep. 14, 2012, 3 pages.
International Search Report for PCT/US2012/023626 mailed May 22, 2012, 4 pages.
Notice of Allowance for U.S. Appl. No. 13/951,916 mailed Dec. 16, 2013, 12 pages.
International Preliminary Report on Patentability for PCT/US2012/052958 mailed Mar. 13, 2014, 14 pages.
Non-final Office Action for U.S. Appl. No. 12/947,883 mailed Sep. 6, 2013, 9 pages.
Final Office Action for U.S. Appl. No. 12/947,883 mailed Mar. 31, 2014, 13 pages.
International Search Report for PCT/US2011/030446 mailed Jul. 14, 2011, 2 pages.
International Search Report for PCT/US2011/030448 mailed Jul. 20, 2011, 2 pages.
International Search Report for PCT/US2011/030466 mailed Aug. 5, 2011, 2 pages.
International Search Report for PCT/US2012/052958 mailed Mar. 1, 2013, 7 pages.
International Search Report for PCT/US2013/041266 mailed Aug. 20, 2013, 4 pages.
Non-final Office Action for U.S. Appl. No. 13/621,958 mailed Feb. 13, 2014, 10 pages.
Non-final Office Action for U.S. Appl. No. 13/649,417 mailed Feb. 13, 2014, 10 pages.
Non-final Office Action for U.S. Appl. No. 13/663,949 mailed Feb. 3, 2014, 19 pages.
Non-final Office Action for U.S. Appl. No. 12/953,003 mailed Apr. 14, 2014, 13 pages.
Non-final Office Action for U.S. Appl. No. 12/953,039 mailed Apr. 15, 2014, 8 pages.
Final Office Action for U.S. Appl. No. 12/946,139 mailed Apr. 22, 2014, 18 pages.
Final Office Action for U.S. Appl. No. 13/597,549 mailed Apr. 24, 2014, 10 pages.
Final Office Action for U.S. Appl. No. 13/901,074 mailed May 9, 2014, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-final Office Action for U.S. Appl. No. 13/688,675 mailed Jan. 31, 2014, 13 pages.
Non-final Office Action for U.S. Appl. No. 12/946,217 mailed Jul. 26, 2012, 25 pages.
Final Office Action for U.S. Appl. No. 12/946,217 mailed Mar. 18, 2013, 48 pages.
Non-final Office Action for U.S. Appl. No. 12/946,217 mailed Oct. 3, 2013, 47 pages.
Final Office Action for U.S. Appl. No. 12/946,217 mailed Apr. 25, 2014, 40 pages.
Non-final Office Action for U.S. Appl. No. 13/833,876 mailed Apr. 24, 2014, 7 pages.
Notice of Allowance for U.S. Appl. No. 12/953,536 mailed May 20, 2014, 9 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Final Office Action for U.S. Appl. No. 13/649,417 mailed Jun. 25, 2014, 9 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.

(56) References Cited

OTHER PUBLICATIONS

Non-final Office Action for U.S. Appl. No. 12/751,895 mailed May 20, 2014, 9 pages.
Notice of Allowance for U.S. Appl. No. 13/533,093 mailed Jul. 8, 2014, 9 pages.
Notice of Allowance for U.S. Appl. No. 13/597,549 mailed Jul. 8, 2014, 8 pages.
Notice of Allowance for U.S. Appl. No. 13/455,646 mailed Jun. 2, 2014, 9 pages.
Non-final Office Action for U.S. Appl. No. 12/819,065 mailed Jul. 18, 2014, 10 pages.
Final Office Action for U.S. Appl. No. 12/818,986 mailed Jul. 18, 2014, 27 pages.
Final Office Action for U.S. Appl. No. 13/081,856 mailed Jul. 2, 2014, 8 pages.
Notice of Allowance for U.S. Appl. No. 12/221,117 mailed Jul. 16, 2014, 7 pages.
Decision on Appeal for U.S. Appl. No. 12/221,117 mailed Jul. 1, 2014, 7 pages.
Author Unknown, "FiberManager Frame Cross-connect Configuration Fiber Tracing Option: Installation and Maintenance," Siecor Corporation, A0402884, Release 04.00, Jul. 1995, 80 pages.
Author Unknown, "FOS-FDF", Corning Cable Systems, SRP-003-305, Issue 4, Mar. 2001, 17 pages.
Author Unknown, "Optical Management Shelf (OMS)," Corning Cable Systems, Standard Recommended Procedure (SRP) 003-600, Issue 3, Apr. 2004, 9 pages.
Author Unknown, "Single Shelf HDF Installation," Standard Recommended Procedure (SRP) 003-377, Corning Cable Systems, Issue 5, Aug. 2001, pp. 1-12.
Final Office Action for U.S. Appl. No. 12/953,039 mailed Jul. 25, 2014, 10 pages.
Advisory Action for U.S. Appl. No. 12/953,039 mailed Oct. 3, 2014, 3 pages.
Notice of Allowance for U.S. Appl. No. 12/953,536 mailed Aug. 28, 2014, 9 pages.
Final Office Action for U.S. Appl. No. 13/901,074 mailed Sep. 5, 2014, 7 pages.
Final Office Action for U.S. Appl. No. 13/663,975 mailed Aug. 14, 2014, 42 pages.
Corrected Notice of Allowance for U.S. Appl. No. 13/533,093 mailed Sep. 2, 2014, 7 pages.
Notice of Allowance for U.S. Appl. No. 13/649,417 mailed Sep. 8, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 mailed Sep. 16, 2014, 4 pages.
Notice of Allowance for U.S. Appl. No. 13/455,646 mailed Sep. 26, 2014, 9 pages.
Non-Final Office Action for U.S. Appl. No. 13/663,949 mailed Sep. 25, 2014, 21 pages.
Non-Final Office Action for U.S. Appl. No. 13/688,675 mailed Sep. 30, 2014, 9 pages.
Notice of Allowance for U.S. Appl. No. 13/597,549 mailed Oct. 3, 2014, 8 pages.
Decision on Appeal for U.S. Appl. No. 11/320,062 mailed Aug. 14, 2014, 8 pages.
Final Office Action for U.S. Appl. No. 12/953,101 mailed Oct. 20, 2014, 14 pages.
Notice of Allowance for U.S. Appl. No. 13/533,093 mailed Oct. 17, 2014, 9 pages.
Notice of Allowance for U.S. Appl. No. 12/732,487 mailed Oct. 7, 2014, 8 pages.
Non-Final Office Action for U.S. Appl. No. 13/567,288 mailed Oct. 8, 2014, 7 pages.
Advisory Action for U.S. Appl. No. 12/818,986 mailed Oct. 15, 2014, 5 pages.
Examiner's Answer to the Appeal Brief for U.S. Appl. No. 12/953,134 mailed Aug. 1, 2014, 7 pages.
Non-final Office Action for U.S. Appl. No. 12/956,446 mailed Dec. 5, 2014, 12 pages.
Advisory Action for U.S. Appl. No. 13/663,975 mailed Dec. 24, 2014, 7 pages.
Final Office Action for U.S. Appl. No. 12/394,114 mailed Oct. 31, 2014, 10 pages.
Non-final Office Action for U.S. Appl. No. 12/940,699 mailed Oct. 28, 2014, 9 pages.
Non-final Office Action for U.S. Appl. No. 12/953,039 mailed Nov. 12, 2014, 8 pages.
Notice of Allowance for U.S. Appl. No. 12/952,960 mailed Nov. 10, 2014, 7 pages.
Notice of Allowance for U.S. Appl. No. 13/081,856 mailed Oct. 29, 2014, 10 pages.
Notice of Allowance for U.S. Appl. No. 13/833,876 mailed Nov. 7, 2014, 7 pages.
Advisory Action for U.S. Appl. No. 13/901,074 mailed Nov. 24, 2014, 3 pages.
Notice of Allowance for U.S. Appl. No. 12/751,895 mailed Nov. 19, 2014, 8 pages.
PCT Search Report, Application No. PCT/US2012/023635, Sep. 14, 2012, 3 pages.
Official Action issued in corresponding Chinese Appln. No. 201280009252.x dated Nov. 27, 2014.
Official Action issued in corresponding Chinese Appln. No. 201280009252.x dated Jul. 3, 2015.
Rules 161(1) and 162 Communication issued in corresponding European Appln. No. 12706144.8 dated Sep. 17, 2013.
CN201280009252.X Search Report Dated Jun. 25, 2015; 2 pages; Chinese Patent Office.
CN201280010672.X Search Report Dated Dec. 15, 2014; 2 pages; Chinese Patent Office.
CN201280010680.4 Search Report Dated Mar. 3, 2015; 2 pages; Chinese Patent Office.
International Search Report of the International Searching Authority; PCT/US2012/023622; Mailed Sep. 3, 2012; 4 pages; European Patent Office.
International Search Report of the International Searching Authority; PCT/US2012/023626; Mailed May 22, 2012; 4 pages; European Patent Office.
International Search Report of the International Searching Authority; PCT/US2012/023635; Mailed Sep. 14, 2012; 7 pages; European Patent Office.

* cited by examiner

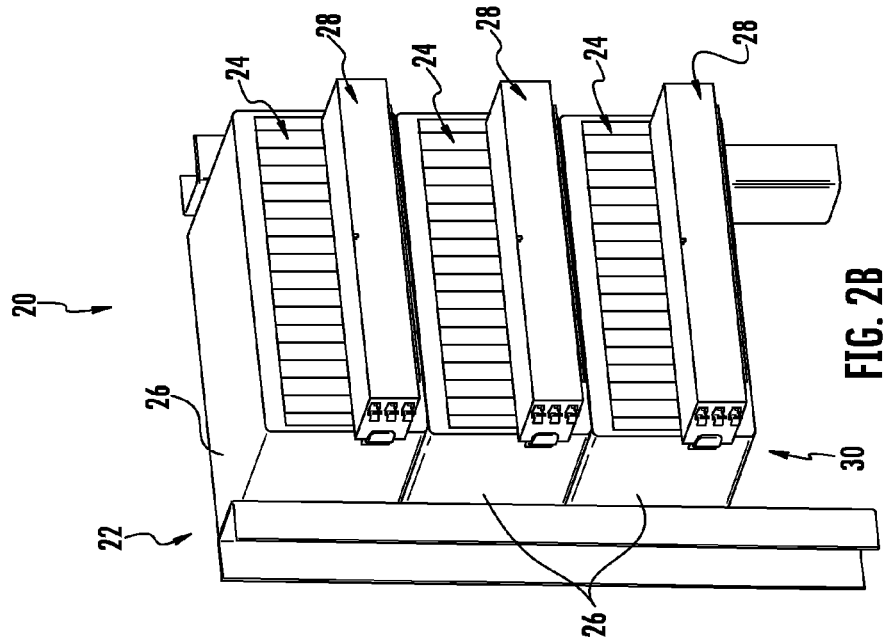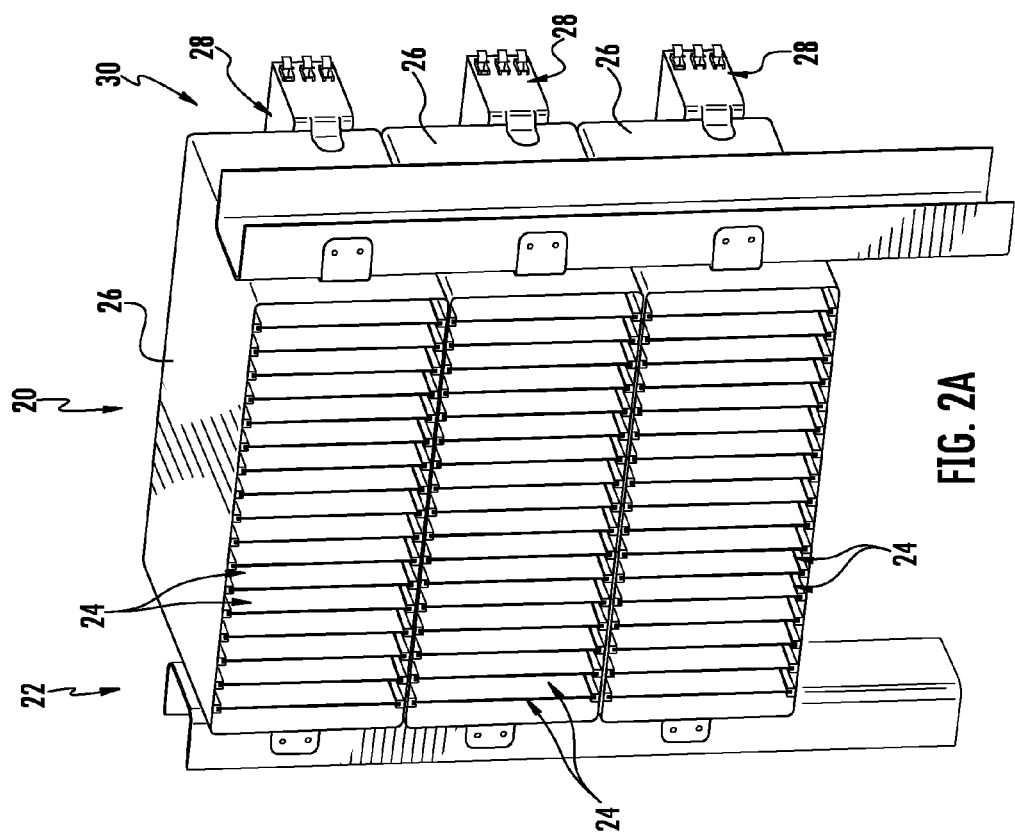

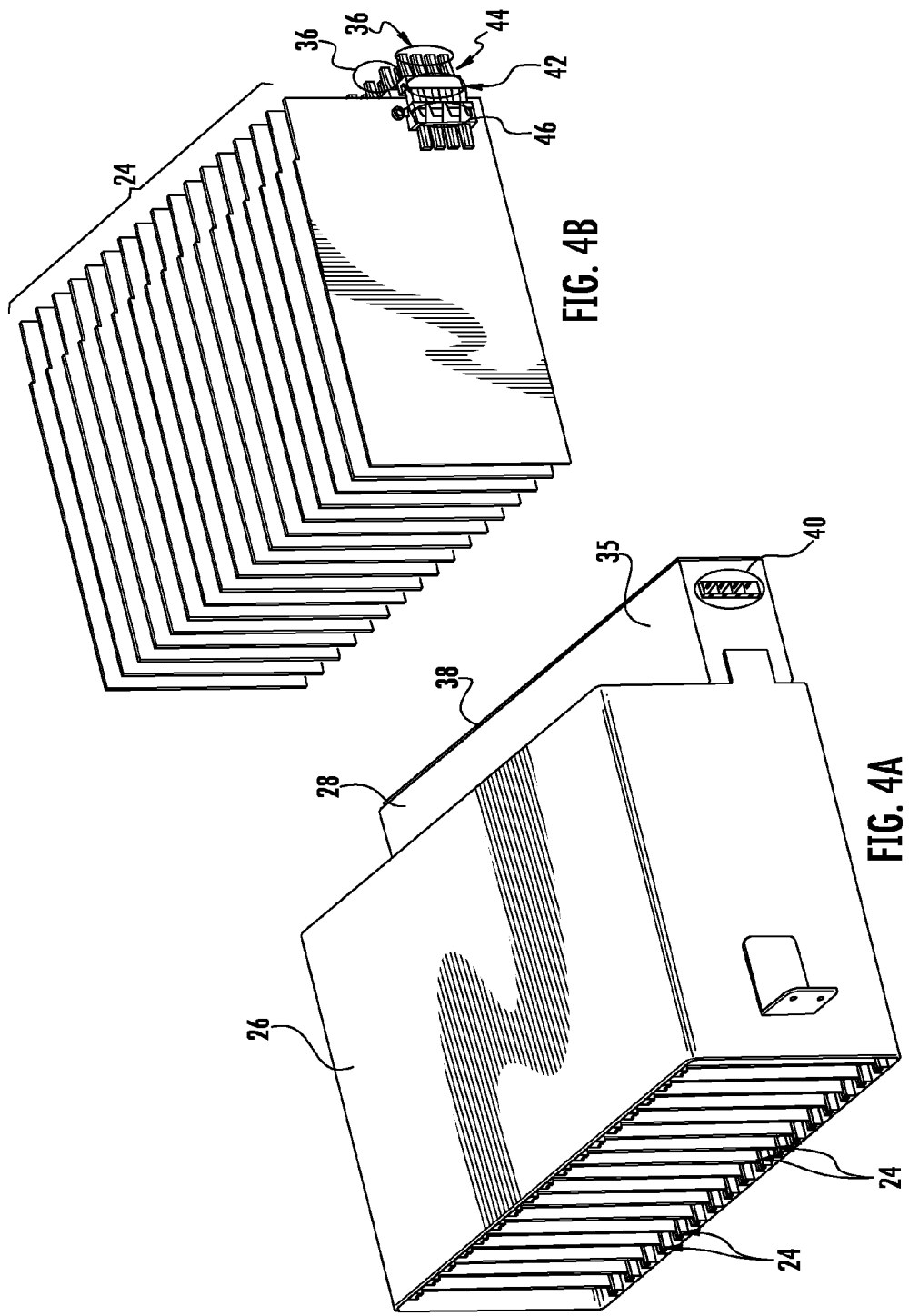

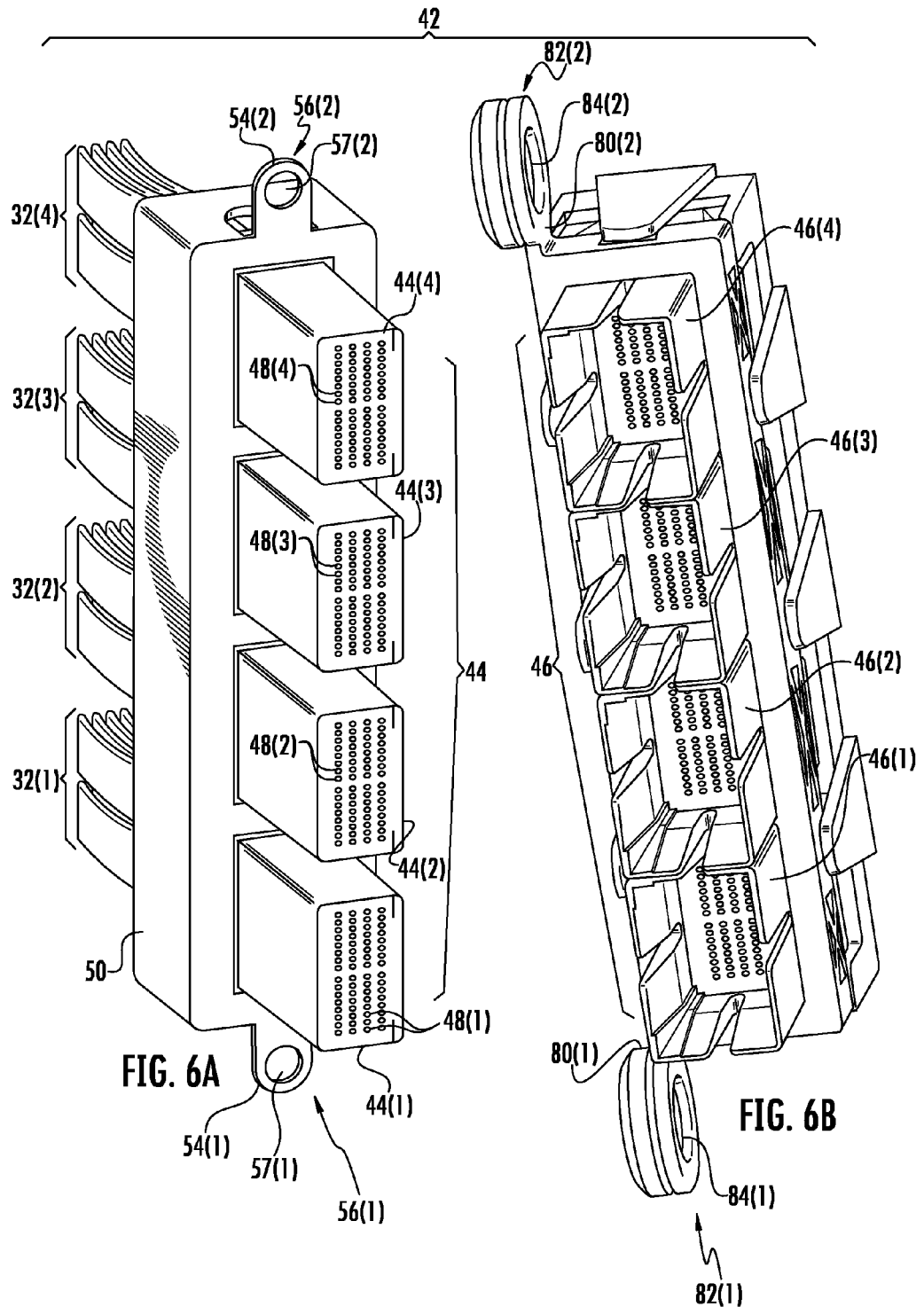

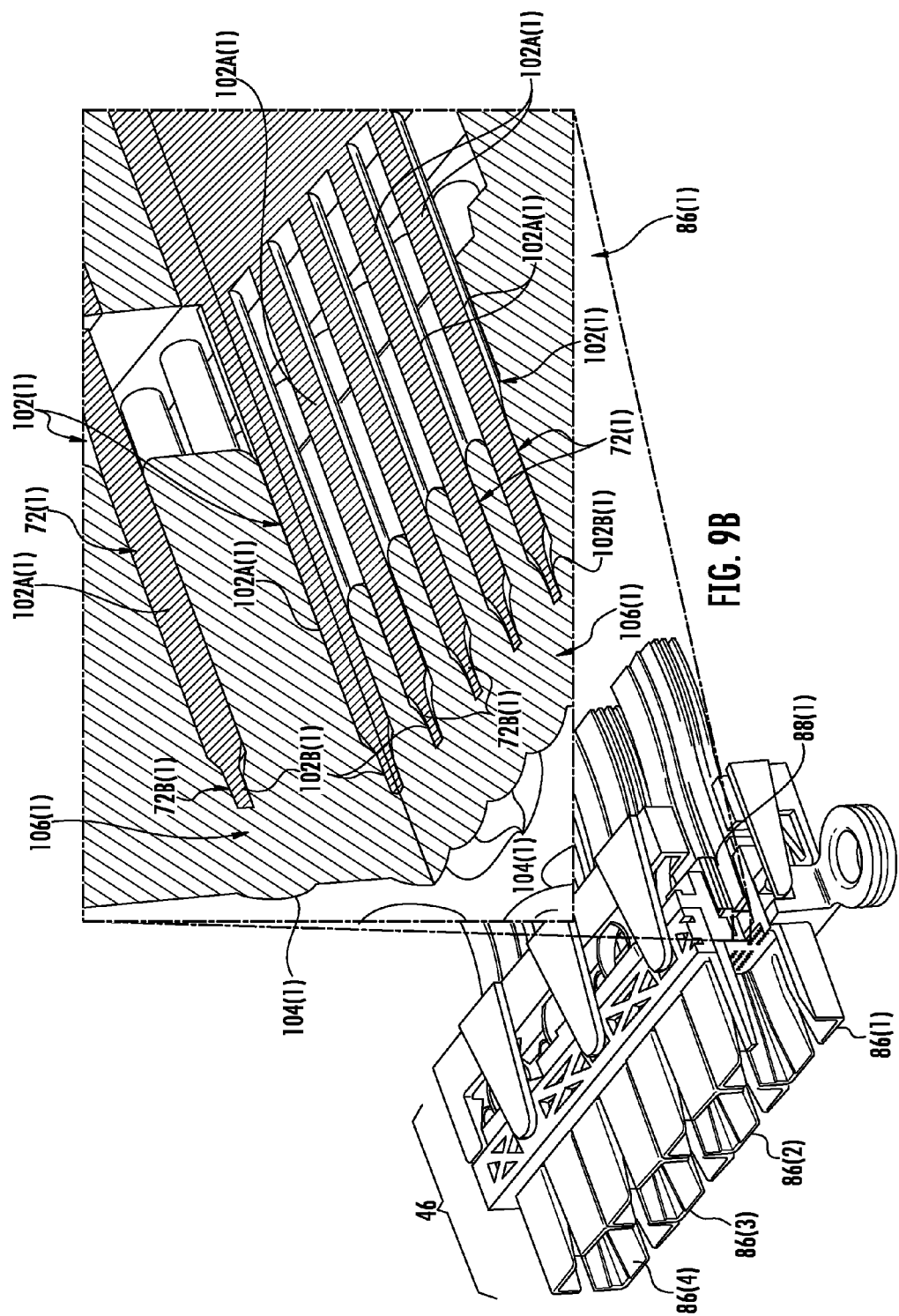

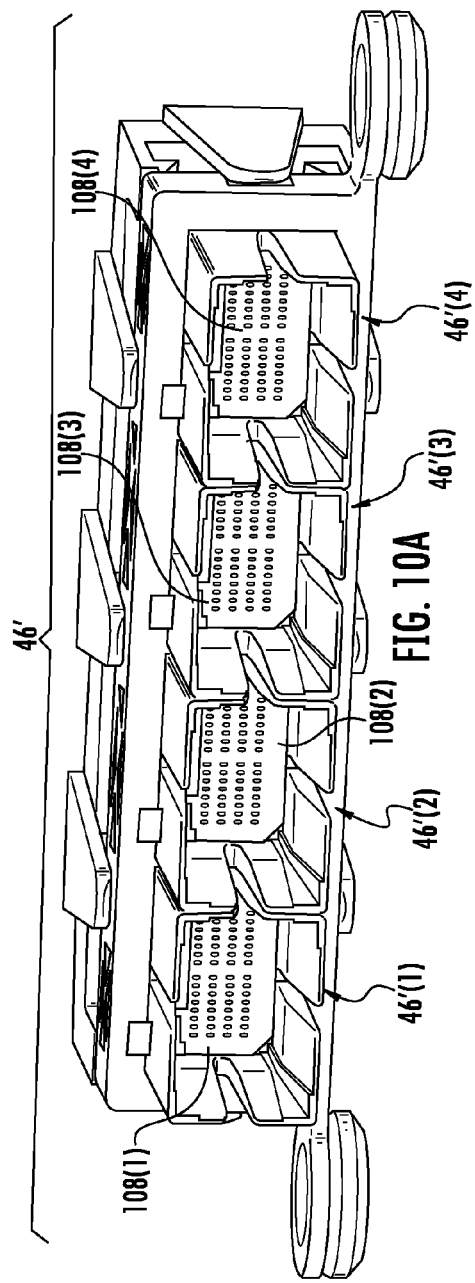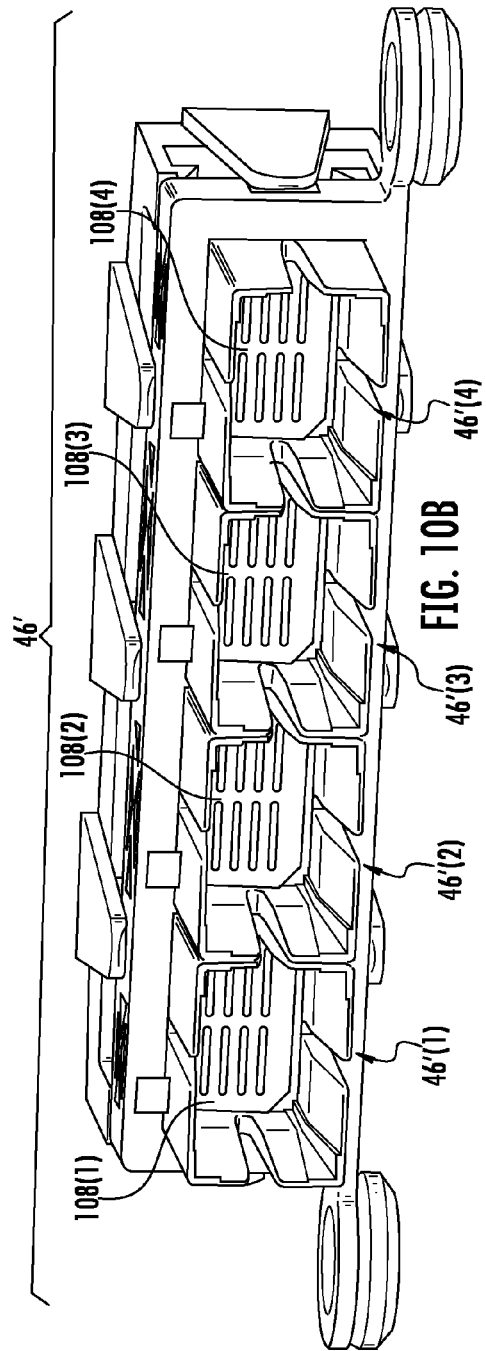

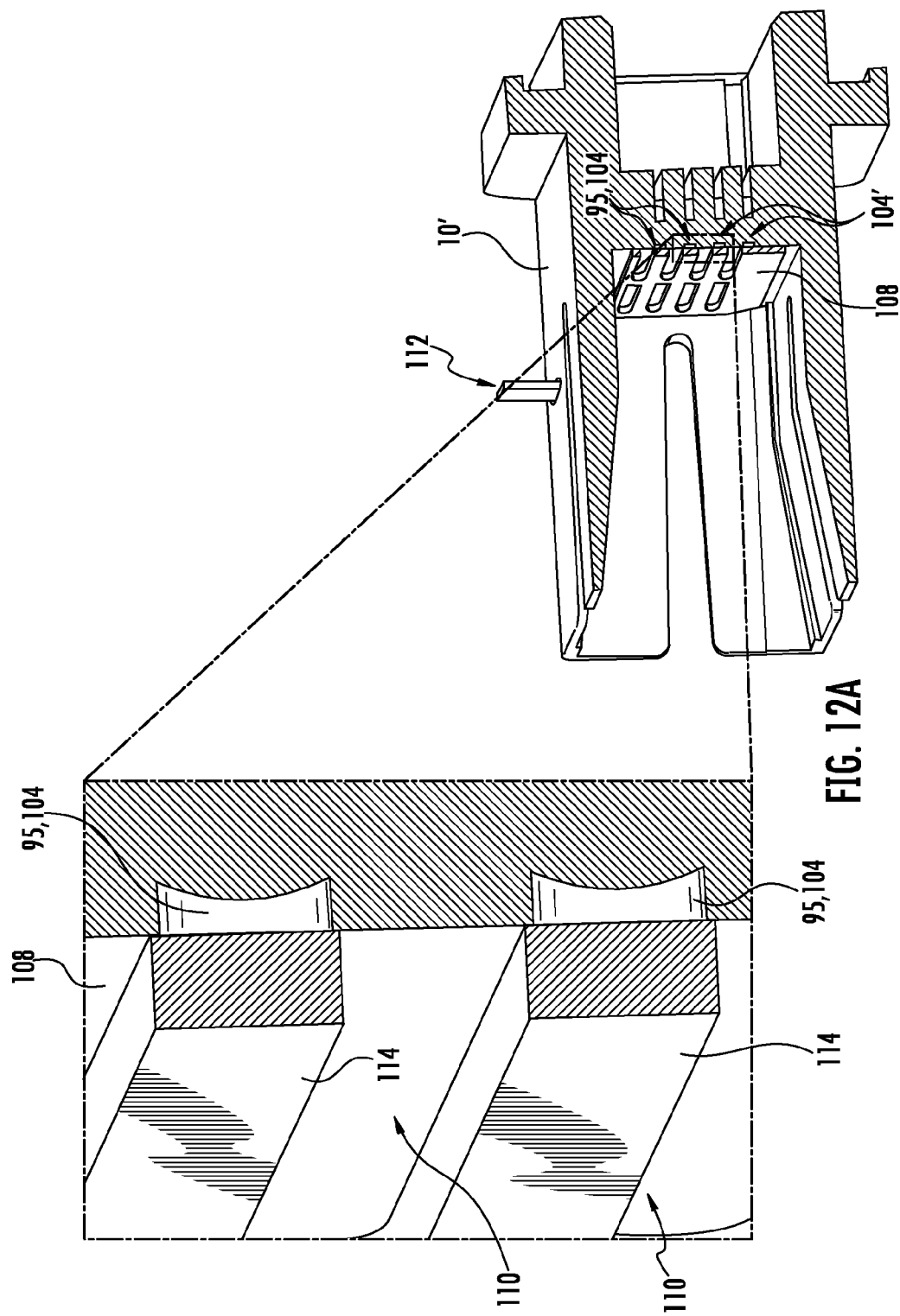

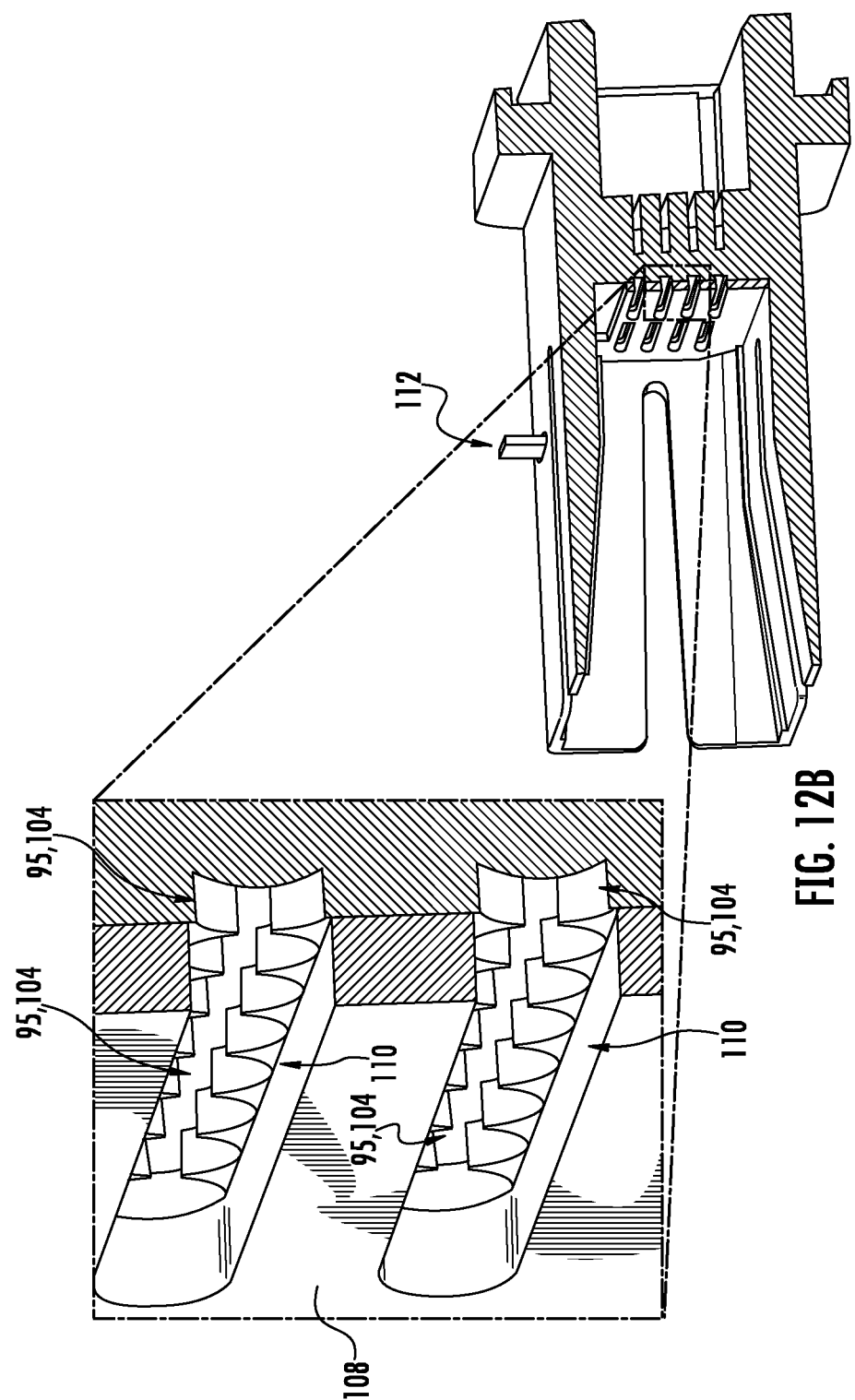

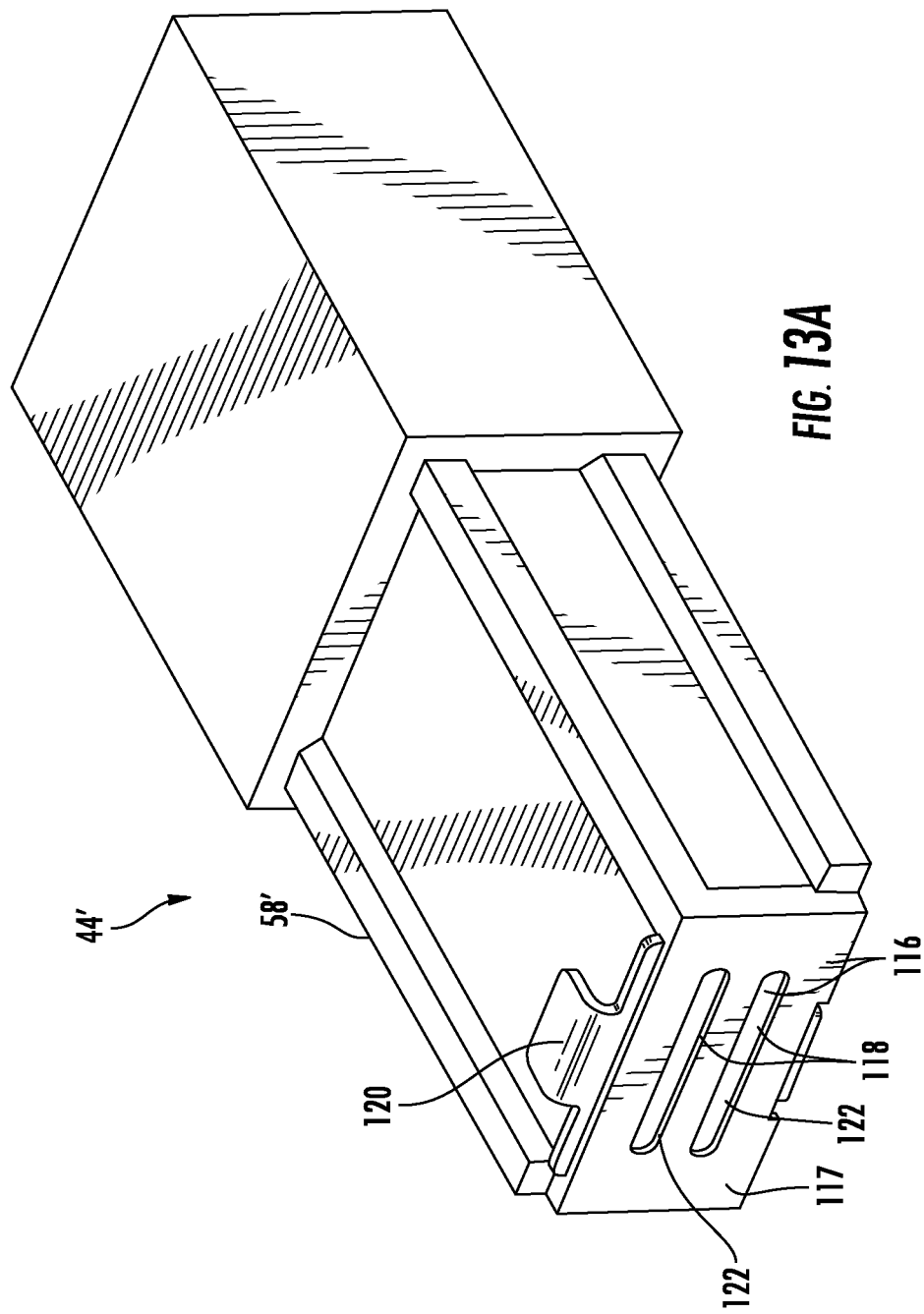

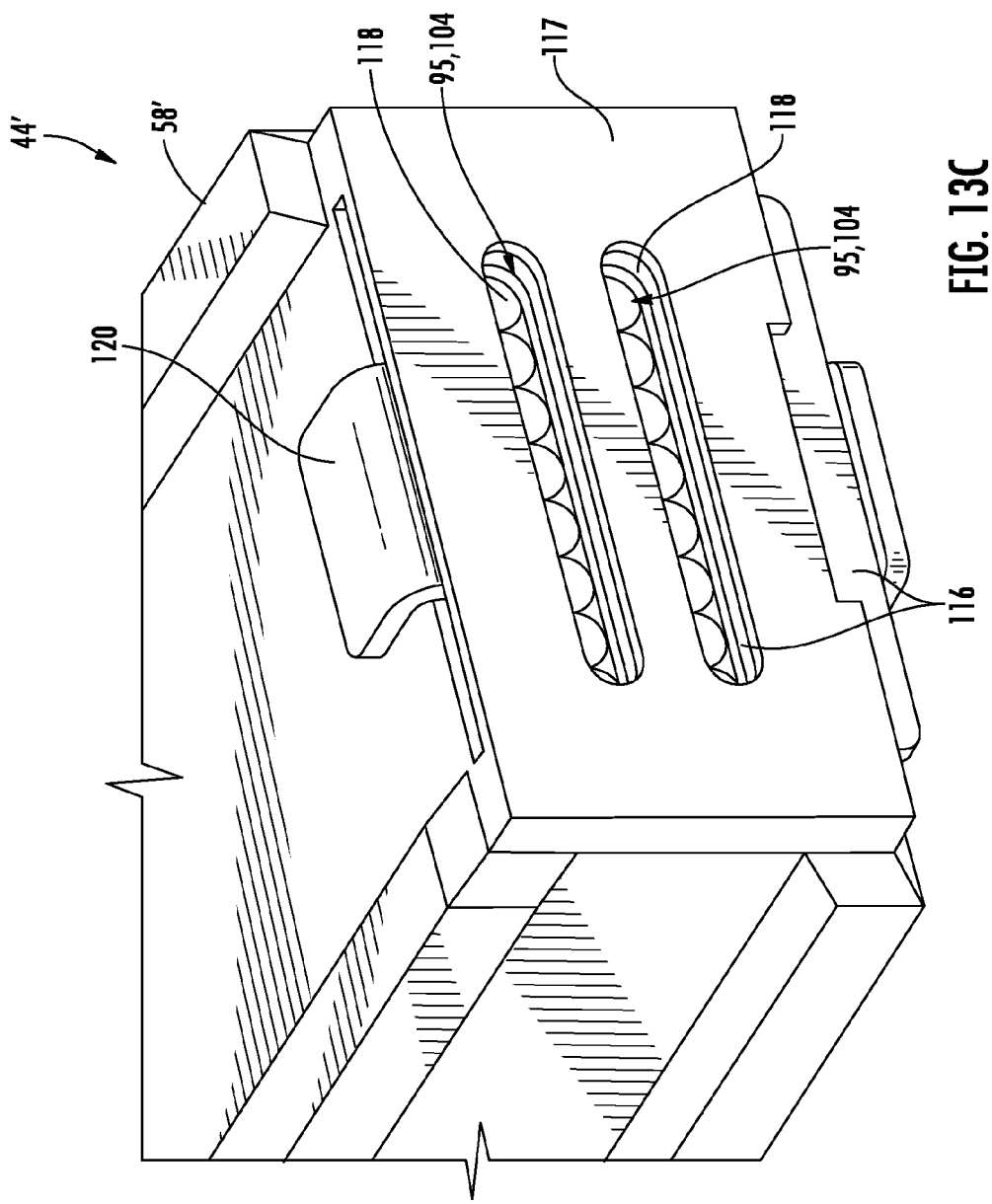

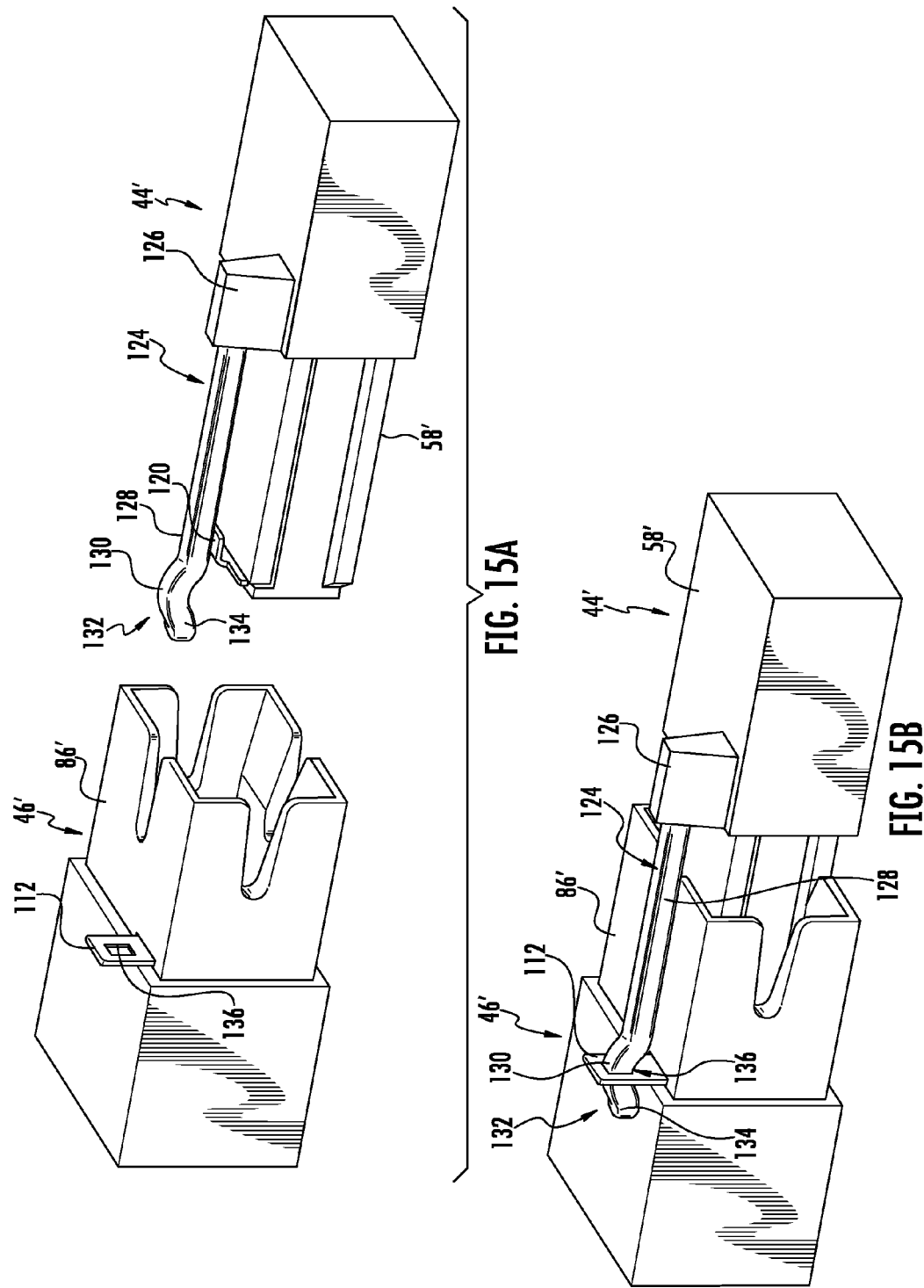

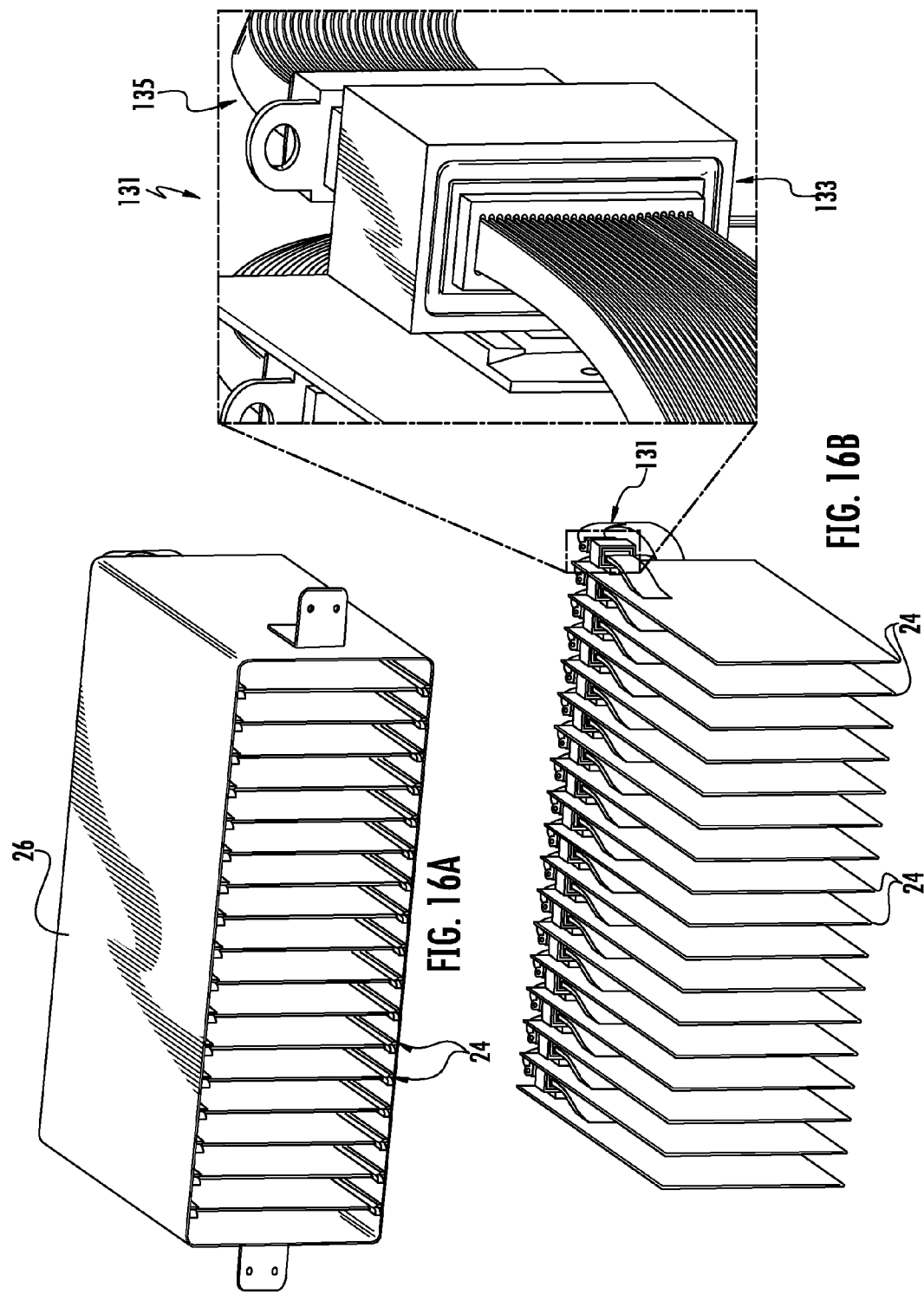

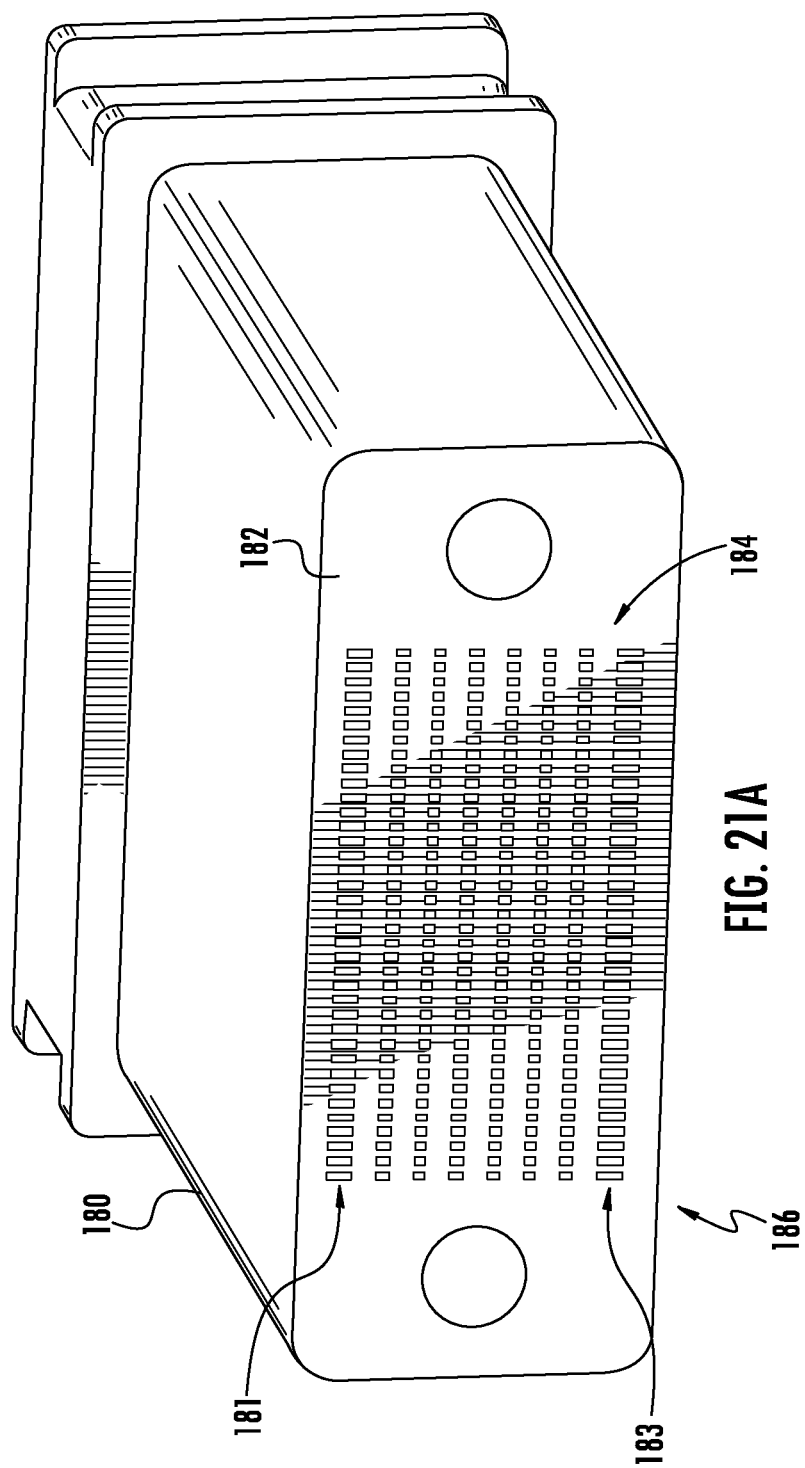

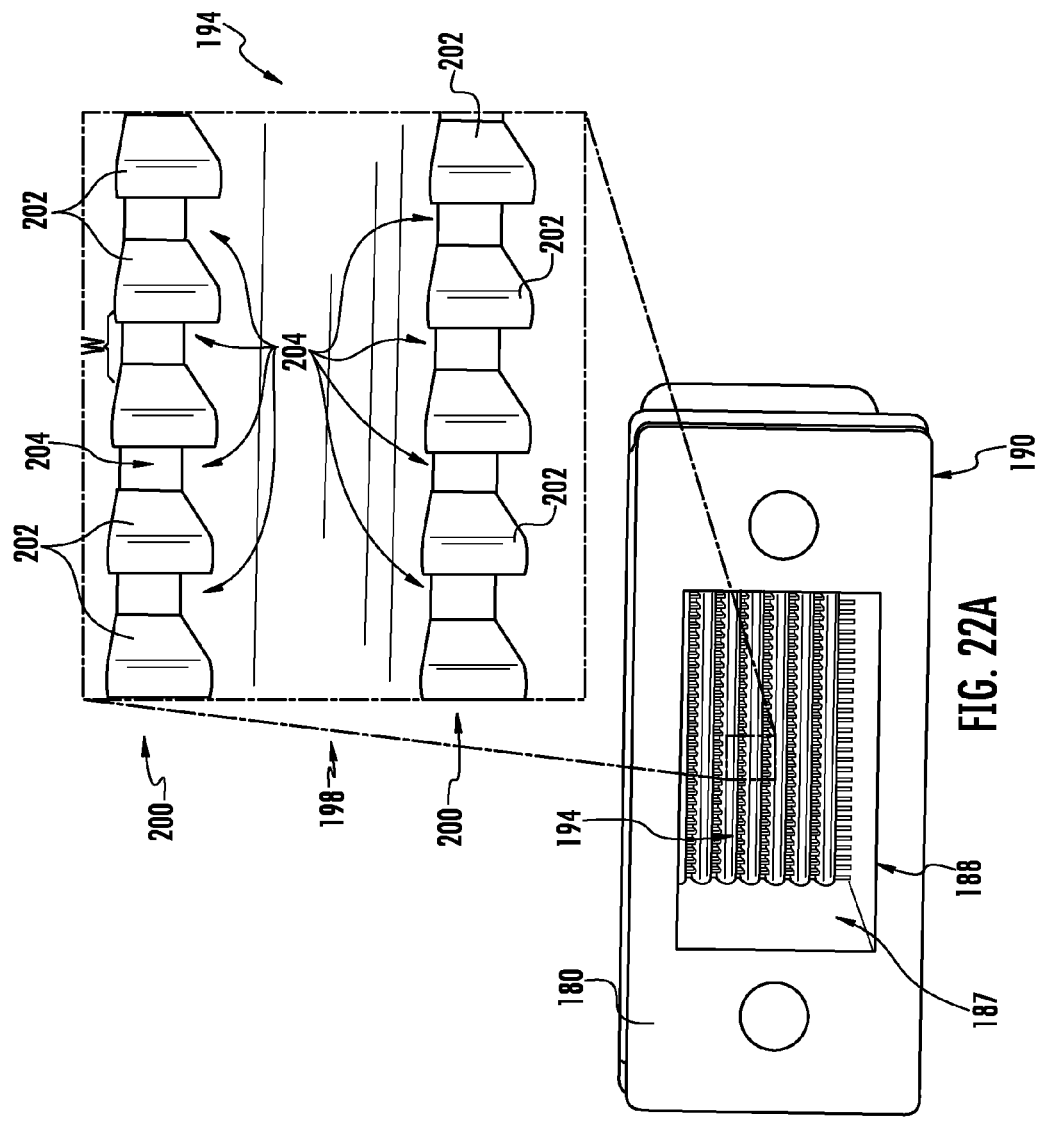

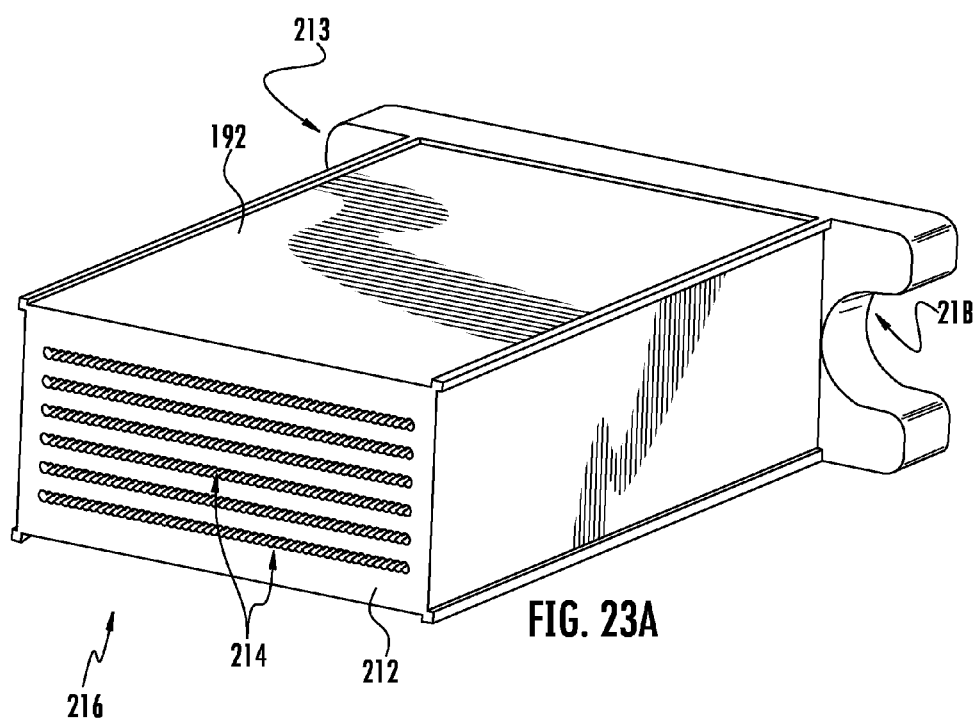

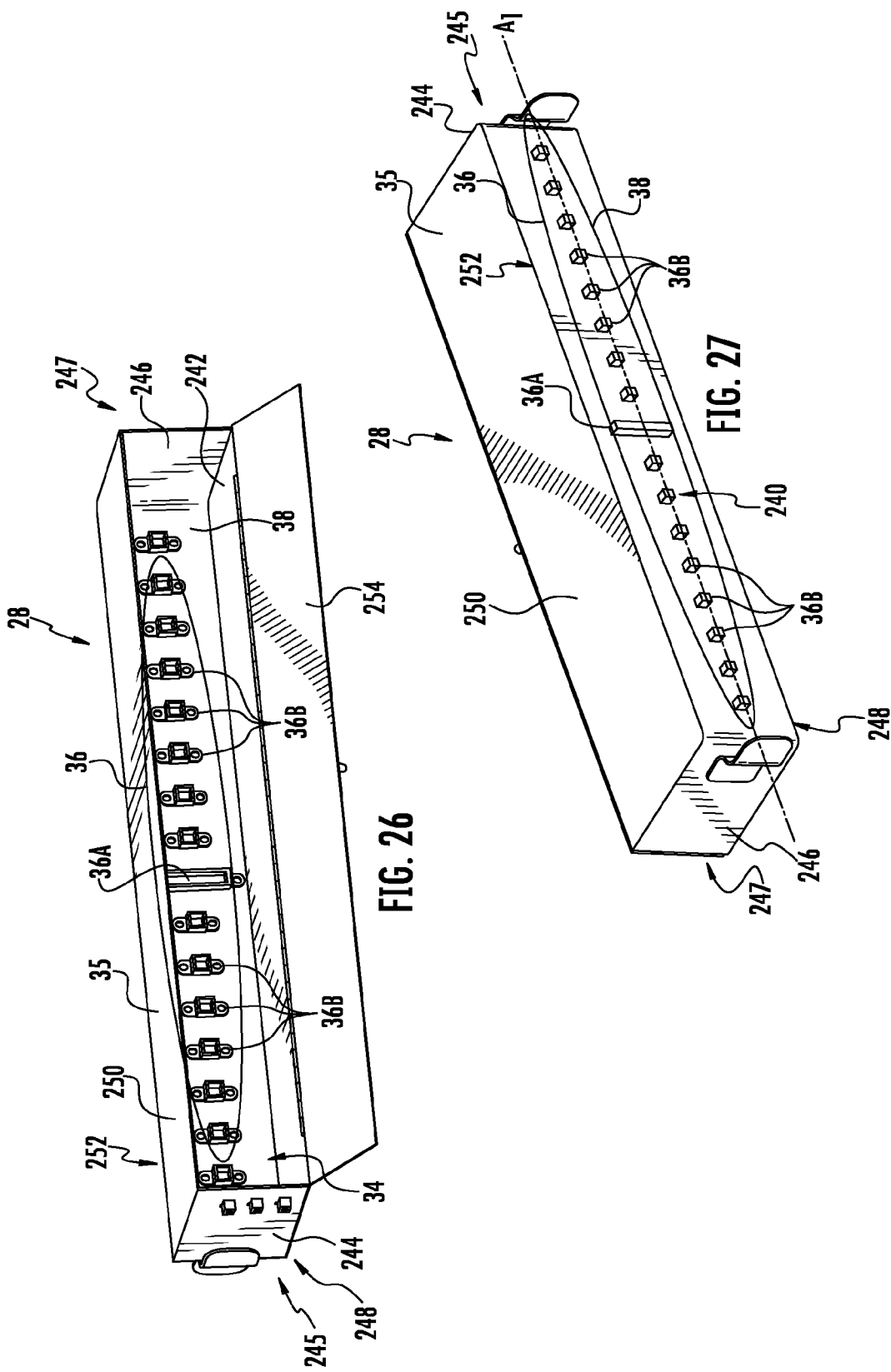

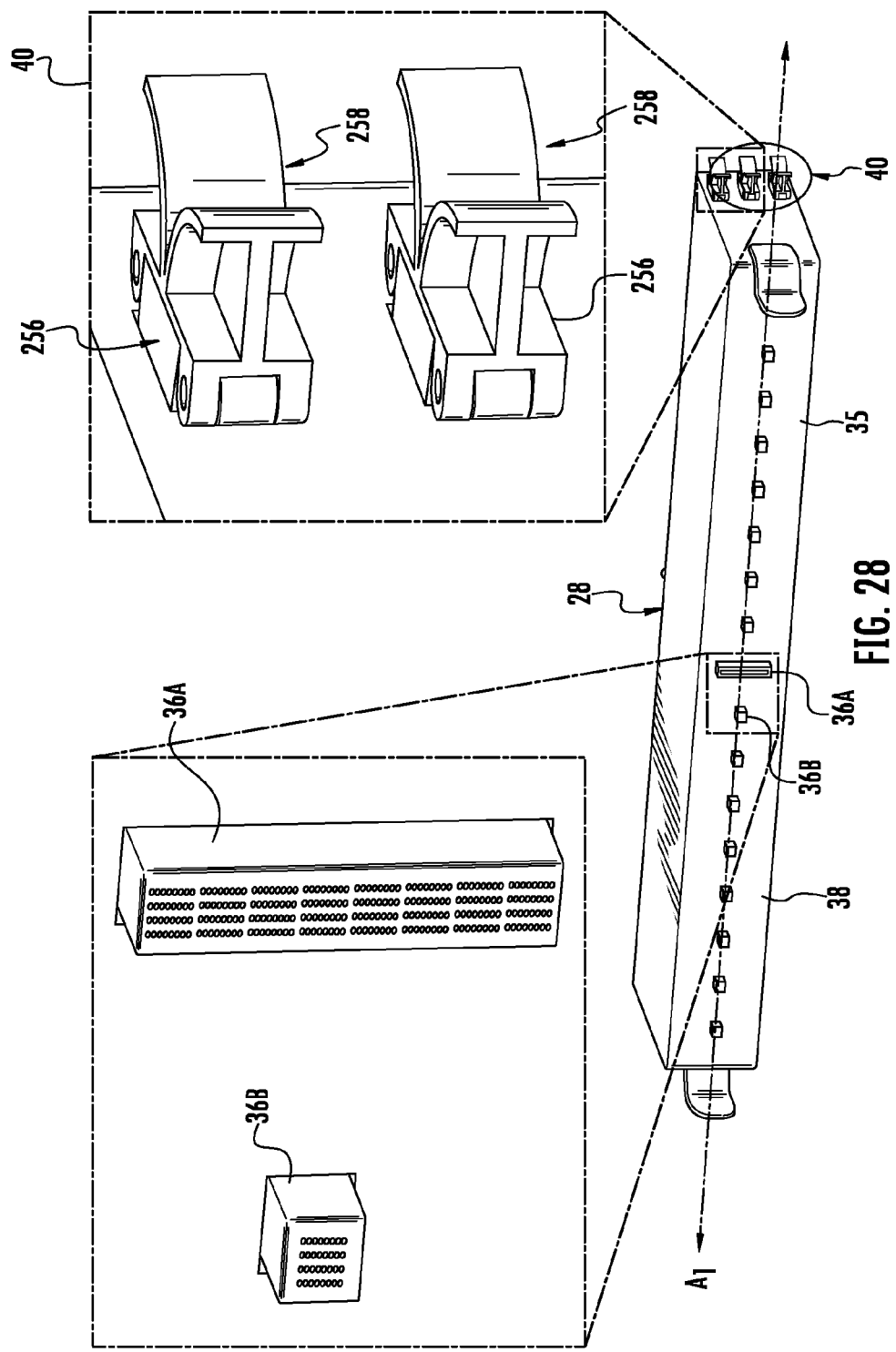

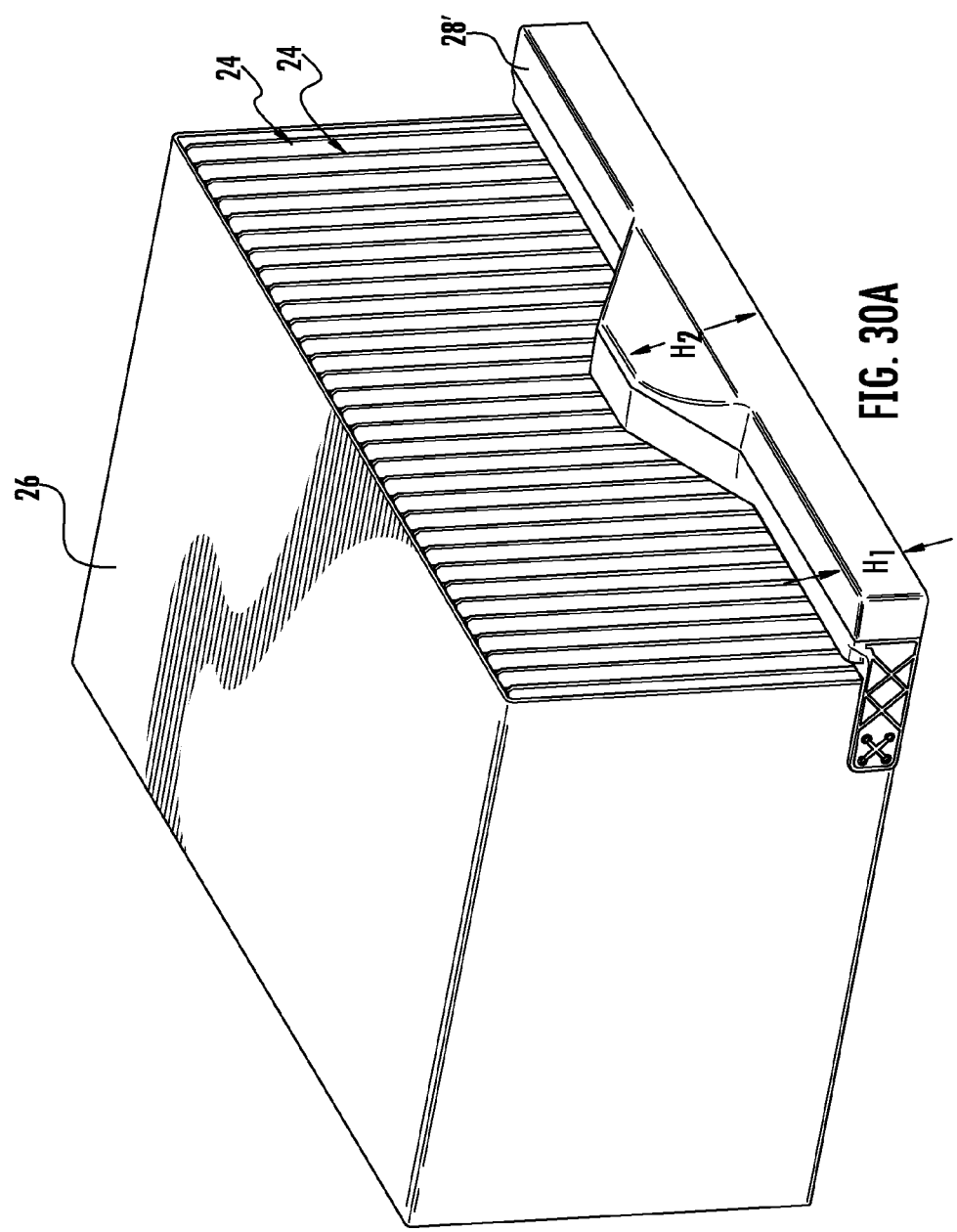

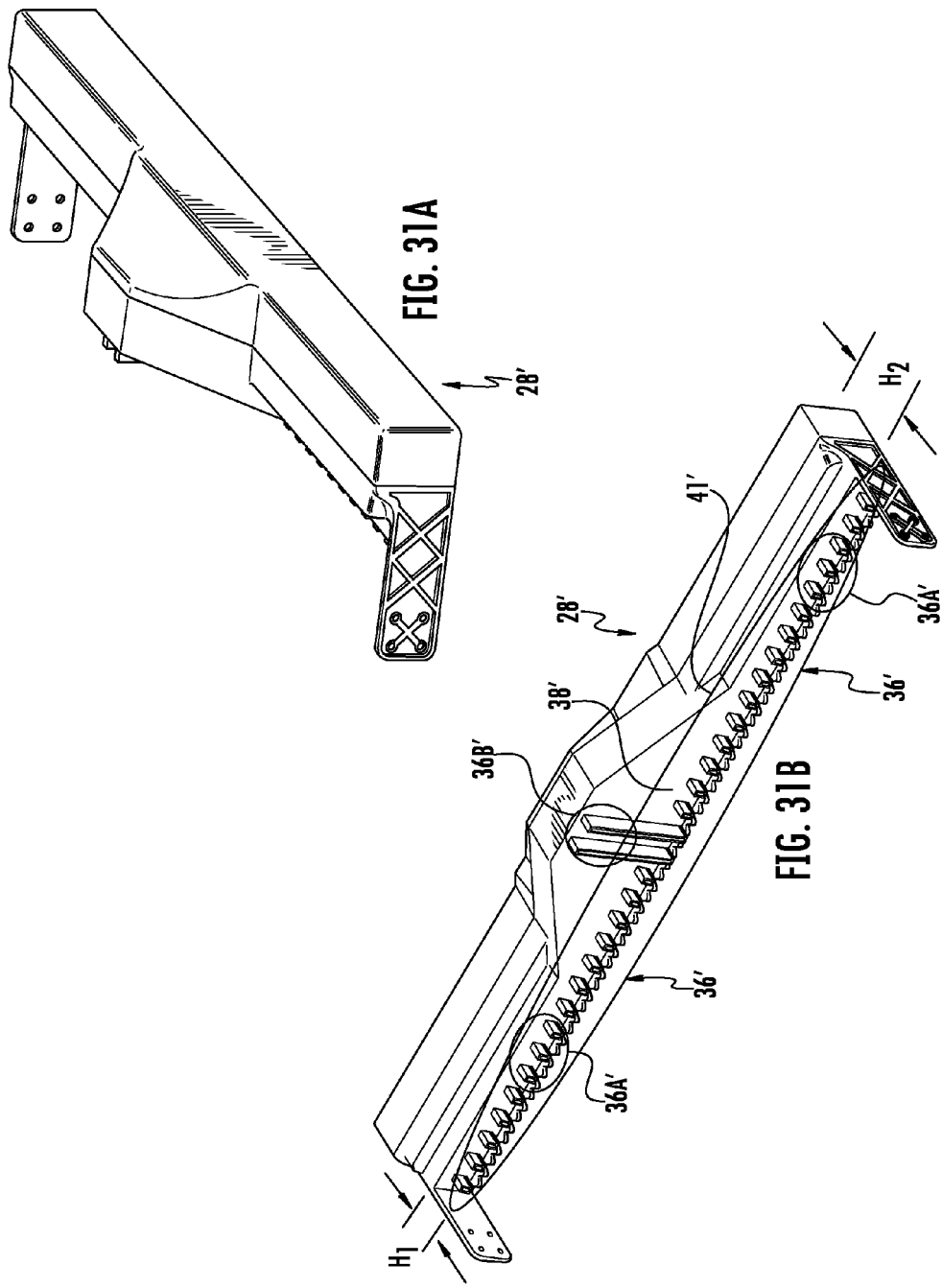

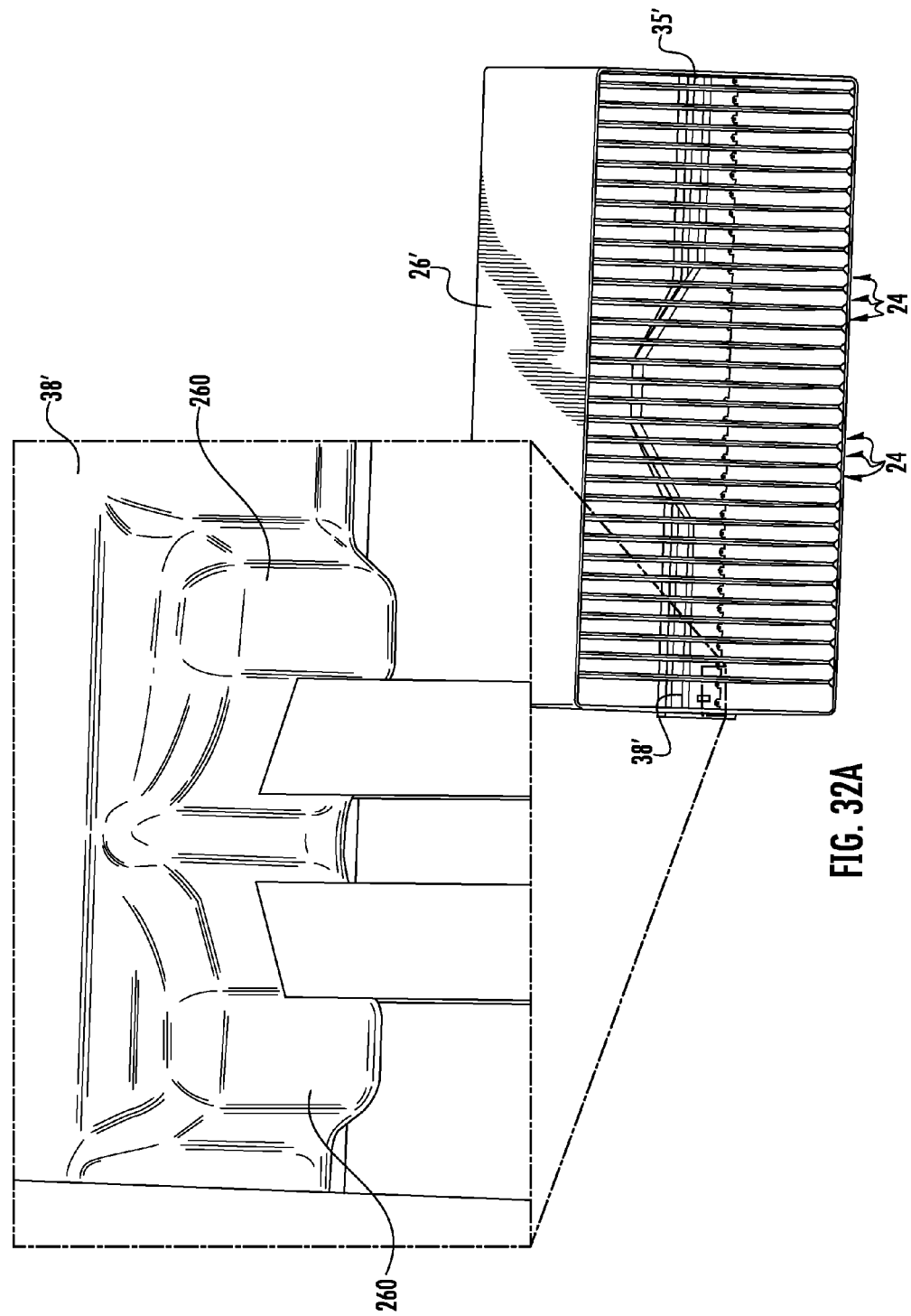

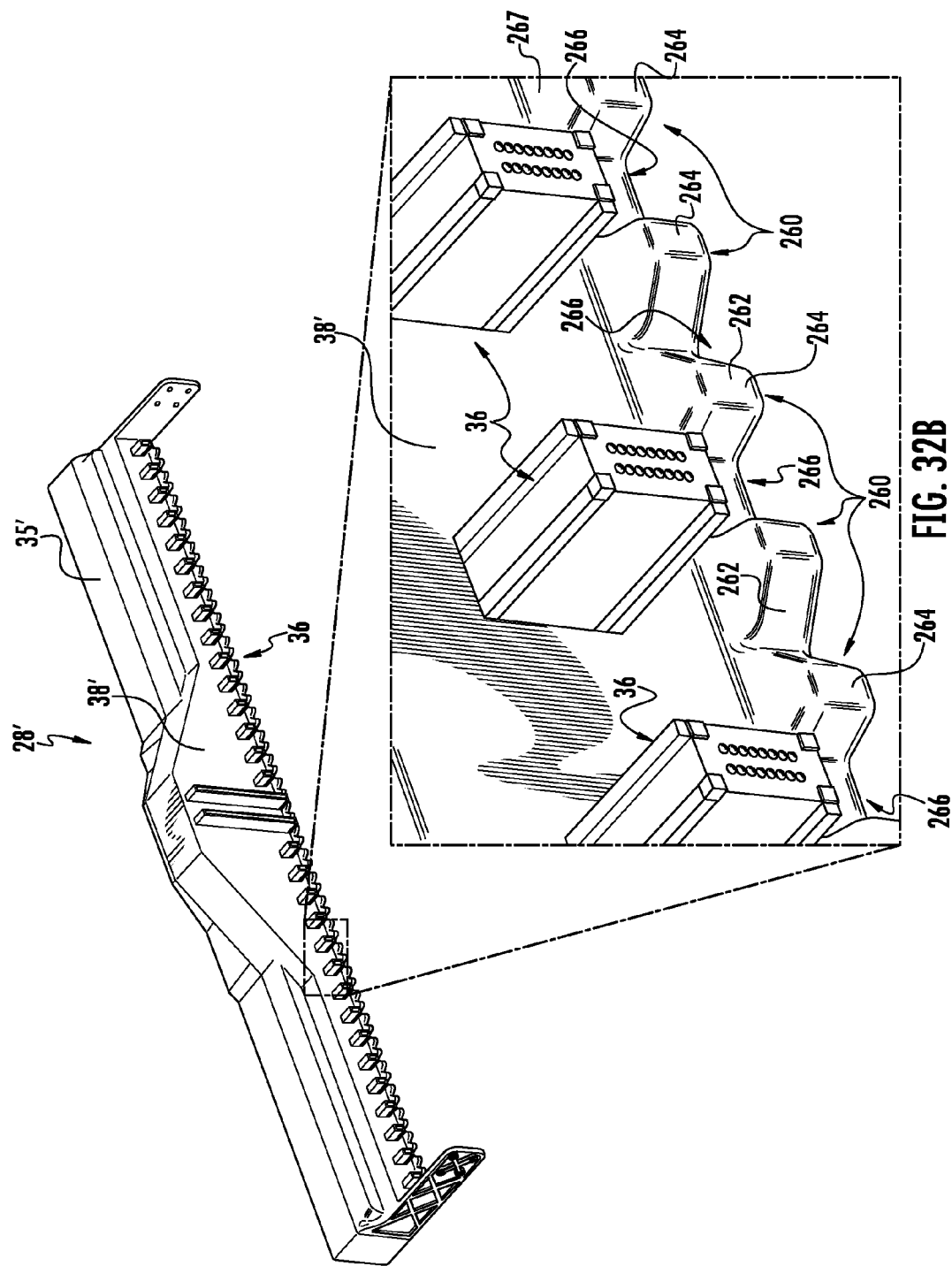

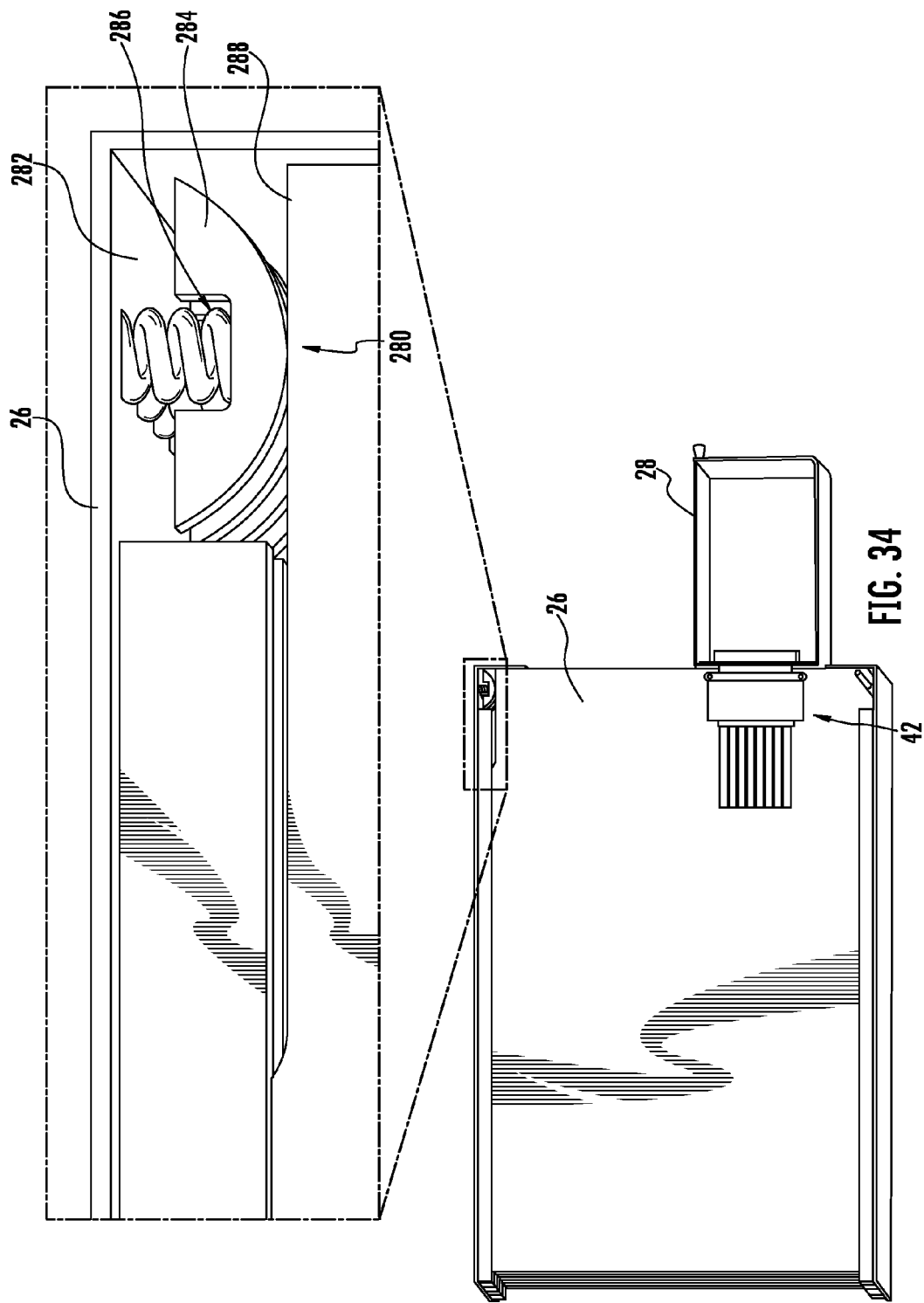

OPTICAL BACKPLANE EXTENSION MODULES, AND RELATED ASSEMBLIES SUITABLE FOR ESTABLISHING OPTICAL CONNECTIONS TO INFORMATION PROCESSING MODULES DISPOSED IN EQUIPMENT RACKS

PRIORITY APPLICATIONS

This application is a continuation of International Application No. PCT/US12/23635 filed Feb. 2, 2012, which claims the benefit of priority to U.S. Application No. 61/438,847, filed Feb. 2, 2011, both applications being incorporated herein by reference.

RELATED APPLICATIONS

The present application is related to PCT Patent Application PCT/US12/23626 filed on Feb. 2, 2012 and entitled "DENSE SHUTTERED FIBER OPTIC CONNECTORS AND ASSEMBLIES SUITABLE FOR ESTABLISHING OPTICAL CONNECTIONS FOR OPTICAL BACKPLANES IN EQUIPMENT RACKS," which is incorporated herein by reference in its entirety.

The present application is also related to PCT Patent Application PCT/US12/23622 filed on Feb. 2, 2012 and entitled "OPTICAL BACKPLANE EXTENSION MODULES, AND RELATED ASSEMBLIES SUITABLE FOR ESTABLISHING OPTICAL CONNECTIONS TO INFORMATION PROCESSING MODULES DISPOSED IN EQUIPMENT RACKS," which is incorporated herein by reference in its entirety.

BACKGROUND

Field of the Disclosure

The technology of the disclosure relates to dense fiber optic connectors, and related fiber optic components, housings, and modules for facilitating optical connections for information processing modules (e.g., a server blade) disposed in an equipment rack.

Technical Background

A data center is a facility used to remotely house computer systems and associated components. These systems may be used for a variety of purposes. Examples include telecommunications such as telecommunications and storage systems applications, server farms for web page accesses, remote storage, such as for backup storage purposes, and providing access to Enterprise applications. To provide for efficient management of these computer systems, data centers include equipment racks, such as the equipment rack 10 illustrated in FIG. 1. For example, the equipment rack 10 in FIG. 1 is comprised of rails 12A, 12B extending in a vertical direction and spaced a distance apart to support a plurality of modular housings 14 disposed between the rails 12A, 12B in vertical space for efficient use of data center space. The modular housings 14 are configured to support information processing devices 16, such as computer servers and data storage devices, as examples, in the form of cards 18, also referred to as "blades 18." The blades 18 may be printed circuit boards (PCBs) containing computer-based components and electrical traces for connections between components. The modular housings 14 may also include a backplane (not shown) connected to power and other data transfer devices which are coupled to the information processing devices 16 when installed in the modular housing 14 and connected to the backplane.

As the demand for access to remote applications and data storage increases, it will be desirable to find ways to increase computational power and data throughput of data center computer devices. It will be desirable to find ways to increase computational power and data throughput of data center computer devices without necessarily having to increase floor space of data centers.

SUMMARY OF THE DETAILED DESCRIPTION

Embodiments disclosed herein include optical backplane extension modules and related assemblies suitable for establishing optical connections to information processing modules disposed in equipment racks. In this regard in one embodiment, an optical backplane extension module is provided. The optical backplane extension module comprises an extension module housing comprising an interior space defined by a base, a left side disposed on a left end of the base, a right side disposed on a right end of the base opposite the left end, and a rear side disposed on a rear end of the base. A plurality of backplane fiber optic connectors is disposed through the rear side of the extension module housing and accessible through an exterior side of the rear side. The plurality of backplane fiber optic connectors are configured to be directly optically connected to a plurality of blade fiber optic connectors disposed in a plurality of information processing modules disposed in a rack module housing.

In another embodiment, a method of connecting an optical backplane extension module to a rack module housing is provided. The method comprises providing an optical backplane extension module. The optical backplane extension module comprises an extension module housing comprising an interior space defined by a base, a left side disposed on a left end of the base, a right side disposed on a right end of the base opposite the first end, and a rear side disposed on a rear end of the base. A plurality of backplane fiber optic connectors is disposed through the rear side of the extension module housing and accessible through an exterior side of the rear side. The method also comprises directly optically connecting the plurality of backplane fiber optic connectors disposed through the rear side of the extension module housing to a plurality of blade fiber optic connectors disposed in a plurality of information processing modules disposed in a rack module housing.

In another embodiment, a fiber optic rack module configured to be supported in an equipment rack is provided. The fiber optic rack module comprises a rack module housing comprising an interior space defined by a base, a left side disposed on a left end of the base, and a right side disposed on a right end of the base opposite the left end. The rack module housing is configured to support at least one information processing module having at least one blade fiber optic connector in the interior space. At least one alignment member is disposed in the interior space of the rack module housing. The at least one alignment member is configured to provide at least one datum for the at least one information processing module to align the at least one information processing module disposed in the rack module housing.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2A is a front perspective view of exemplary information processing modules disposed in rack module housings disposed in an equipment rack, with optical backplane extension modules directly optically connected to information processing modules in the rear of the rack module housings;

FIG. 2B is a rear perspective view of the optical backplane extension modules in FIG. 2A optically connected in the rear of the rack module housings to the information processing modules;

FIG. 4A is a right side perspective view of the optical backplane extension module in FIG. 2B optically connected to the information processing modules in the rear of a rack module housing;

FIG. 4B is a right side perspective view of the information processing modules in FIG. 4A with rack module housing removed, and illustrating an exemplary dense fiber optic connector assembly facilitating direct optical connections to the information processing modules through the optical backplane extension module in FIGS. 2A-3;

FIG. 6A is a close-up perspective view of the backplane fiber optic plugs in FIG. 5;

FIG. 6B is a close-up perspective view of the blade fiber optic receptacles in FIG. 5;

FIG. 9B is a perspective cross-section view of an exemplary dense fiber optic connector assembly supporting blind holes and lenses that may be employed in the blade fiber optic receptacles in FIGS. 5, 6B, and 8;

FIGS. 10A and 10B are right side perspective views of the shuttered fiber optic receptacles that can be employed as the blade fiber optic receptacles in FIGS. 5, 6B, and 8 with the slideable shutters disposed in open and closed positions, respectively;

FIGS. 12A and 12B are side cross-sectional views of the shuttered fiber optic receptacles in FIGS. 11A, and 11B, respectively, illustrating the slideable shutter disposed in closed and open positions, respectively;

FIG. 13A is a rear perspective view of an exemplary shuttered fiber optic plug that can be employed as the backplane fiber optic plug in FIGS. 5, 6A, and 7 with the slideable shutter disposed in a closed position;

FIG. 13C is a close-up view of the slideable shutter actuated to dispose the slideable shutter in an open position in FIG. 13B;

FIG. 15A is a side perspective view of the shuttered fiber optic receptacle in FIGS. 11A and 11B with the actuation members unactuated to place the slideable shutters in closed positions before the shuttered fiber optic receptacle receipt of the fiber optic plug body in FIGS. 13A-14;

FIG. 15B is a side perspective view of the shuttered fiber optic receptacle in FIGS. 11A and 11B with the actuation members actuated to place the slideable shutters in open positions as the shuttered fiber optic receptacle receives and is mated with the fiber optic plug body in FIGS. 13A-14;

FIG. 16A is a right side perspective view of the front of a rack module housing with information processing modules disposed therein;

FIG. 16B is a right side perspective view of the information processing modules in FIG. 16A without the rack module housing illustrated, and illustrating another exemplary dense fiber optic connector assembly to facilitate optical connections to the information processing modules through the optical backplane extension module in FIGS. 2A-3;

FIGS. 21A and 21B are front and rear perspective views, respectively, of the molded fiber optic plug body in FIGS. 20A and 20B, respectively;

FIG. 22A is a close-up view of the rear perspective view of lead-in detail of the molded fiber optic plug body in FIGS. 20A and 20B;

FIG. 23A is a front perspective view of an intermediate organizer ferrule configured to facilitate fiber ribbonization and be disposed in the molded fiber optic plug body in FIGS. 20A and 20B;

FIGS. 26 and 27 are front and rear perspective views, respectively, of the optical backplane extension module in FIGS. 2A-3;

FIG. 28 is a rear perspective view of the optical backplane extension module in FIG. 27 illustrating a close-up view of the backplane fiber optic plugs disposed in the rear of the optical backplane extension module and interconnection fiber optic adapters disposed through interconnection ports in the side of the optical backplane extension module;

FIGS. 30A and 30B are rear and front perspective views, respectively, of exemplary information processing modules disposed in rack module housings, with another exemplary optical backplane extension module disposed in the rear of the rack module housing and optically connected to the information processing modules in the rear of the rack module housings using a dense fiber optic connector assembly;

FIGS. 31A and 31B are front and rear perspective views, respectively, of the optical backplane extension module in FIGS. 30A and 30B;

FIG. 32A is a close-up view of alignment members disposed in the optical backplane extension module to align the optical backplane extension module with the information processing modules disposed in a rack module housing;

FIG. 32B is a close-up perspective view of backplane fiber optic plugs disposed between alignment members in the optical backplane extension module in FIGS. 30A and 30B;

FIG. 34 is a side perspective view and close-up view of spring-loaded biasing members configured to push information processing modules down against the bias wheels in FIG. 33 to securely align the information processing modules in the rack module housing.

DETAILED DESCRIPTION

Figure 1:
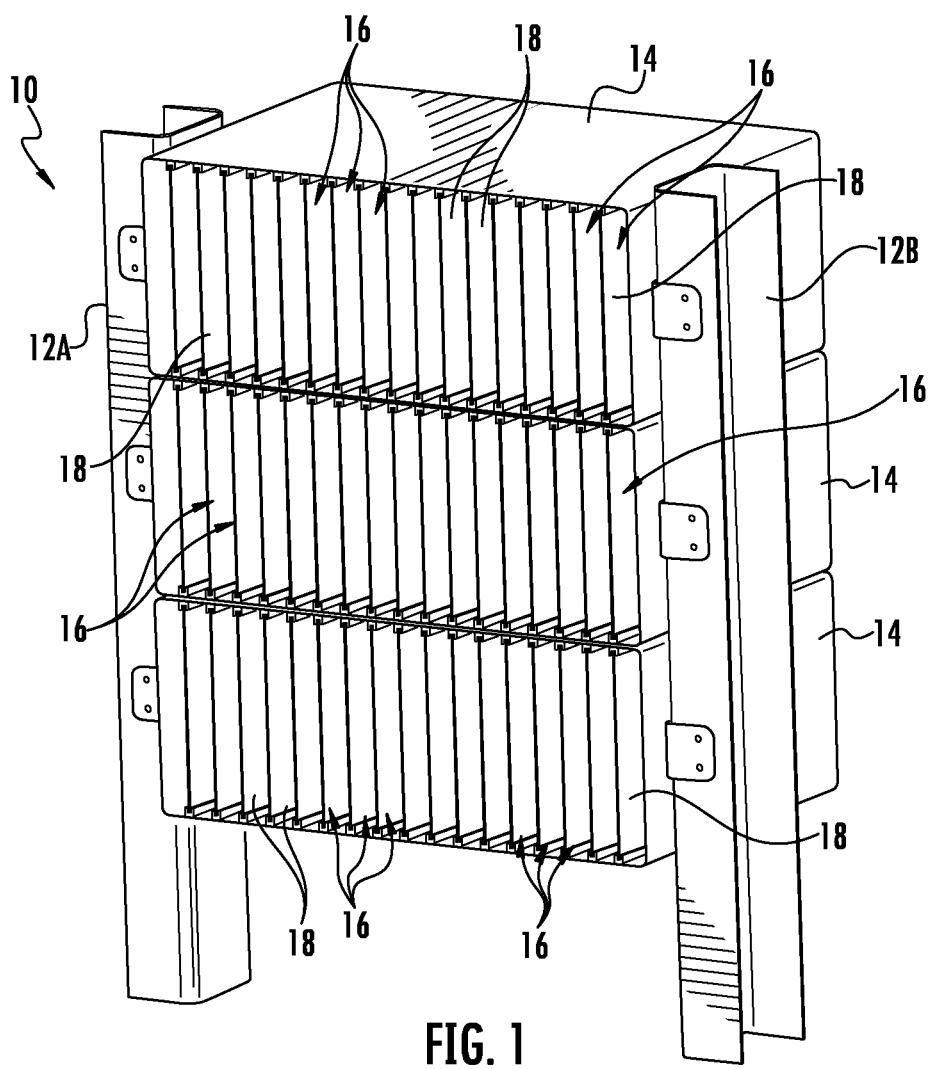
FIG. 1 is a front perspective view of an exemplary equipment rack supporting rack module housings each supporting a plurality of information processing modules.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include optical backplane extension modules and related assemblies suitable for establishing optical connections to information processing modules disposed in equipment racks and the like. In this regard in one embodiment, an optical backplane extension module is provided. The optical backplane extension module comprises an extension module housing comprising an interior space defined by a base, a left side disposed on a left end of the base, a right side disposed on a right end of the base opposite the left end, and a rear side disposed on a rear end of the base. A plurality of backplane fiber optic connectors is disposed through the rear side of the extension module housing and accessible through an exterior side of the rear side. The plurality of backplane fiber optic connectors is configured to be directly optically connected to a plurality of blade fiber optic connectors disposed in a plurality of information processing modules disposed in a rack module housing.

In this regard, FIGS. 2A and 2B illustrate a data center 20 illustrating front and rear perspective views, respectively of an exemplary equipment rack 22. Although only one equipment rack 22 is illustrated in FIGS. 2A and 2B, it is understood that a plurality of equipment racks 22 may be present at the data center 20. The equipment rack 22 is configured to support information processing modules 24 in rack module housings 26 disposed in the equipment rack 22. For example, the information processing modules 24 may include computer servers, switches, and computer storage devices, and which may be referred to as server blades and storage blades, respectively. As will be discussed in greater detail below, the present disclosure provides fiber optic connectors, connector assemblies, cables, housings, and other related fiber optic components and methods that may be employed to connect and interconnect the information processing modules 24 to increase the data throughput of information process modules 24 thus increasing the throughput of the data center 20. Benefits of optical fiber include extremely wide bandwidth and low noise operation, and thus higher data throughput as a result.

Figure 3:
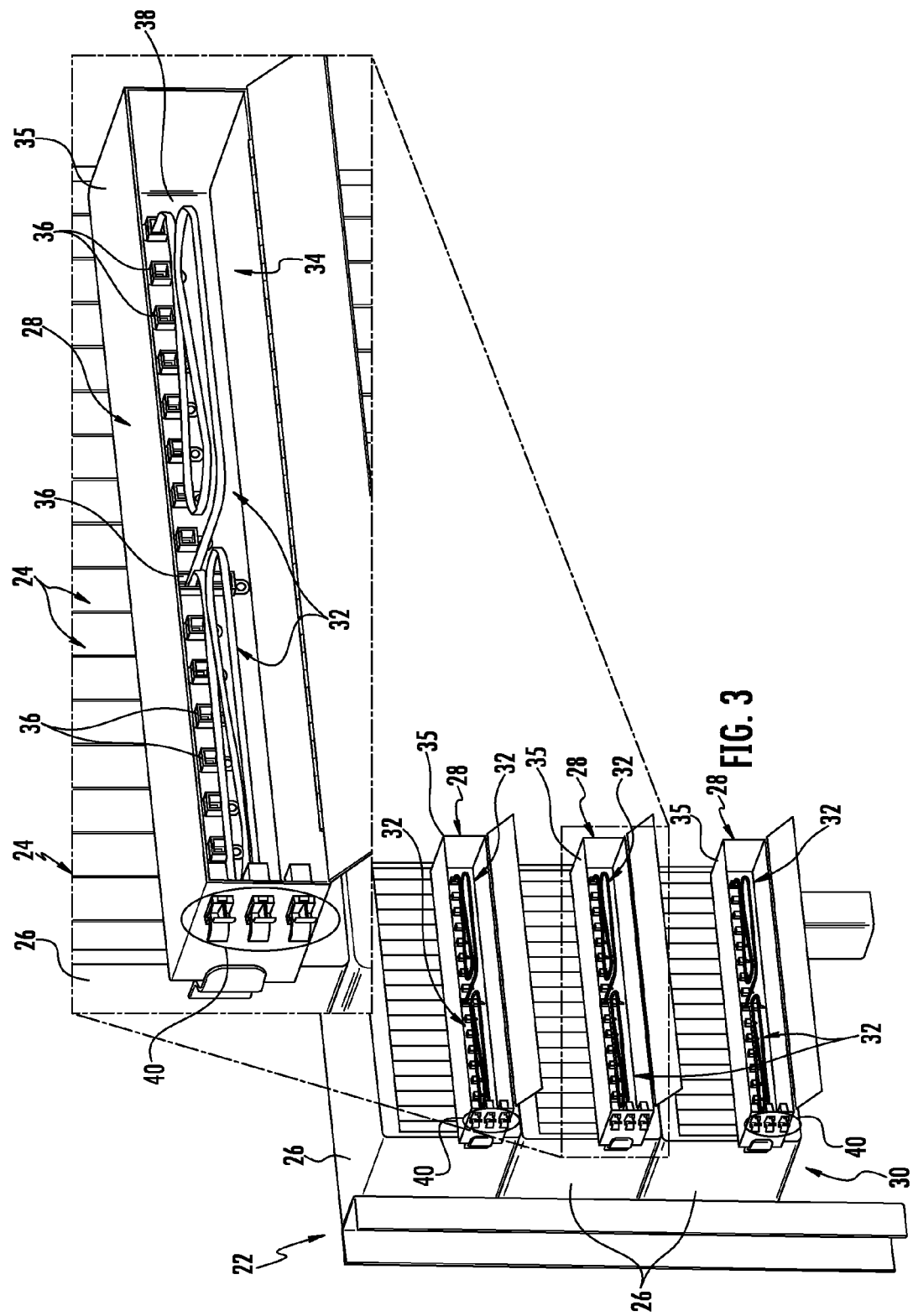
FIG. 3 is a rear perspective view of the optical backplane extension modules in FIG. 2B optically connected in the rear of the rack module housings to information processing modules, with the doors of the optical backplane extension modules open to show the interior routing and cable management space in the optical backplane extension modules.

With continuing reference to FIGS. 2A and 2B, because fiber optic components are used to connect and interconnect the information processing modules 24, fiber optic cables are employed. It may be needed or desired to provide fiber optic cable management and neat storage and routing to avoid complexity in maintaining the data center 20 and to avoid or minimizing interfering with air flow between the information processing modules 24 disposing in the rack module housings 26. In this regard, as will be discussed in more detail below, optical backplane extension modules 28 can be provided. As illustrated in FIG. 3, the optical backplane extension modules 28 are configured to be attached to the rear side 30 of the equipment rack 22 and a rack module housing 26 to manage and route fiber optic cables 32 extending from fiber optic connections to the information processing modules 24.

As illustrated in FIG. 3 generally and described later in this disclosure, the optical backplane extension modules 28 each comprise an interior space 34 defined by an extension module housing 35 for maintaining and routing of the fiber optic cables 32. As illustrated in the close-up view of the optical backplane extension module 28 in FIG. 3, the optical backplane extension modules 28 also support a plurality of backplane fiber optic connectors 36 attached to the fiber optic cables 32. The optical backplane extension module 28 supports disposing the backplane fiber optic connectors 36 through a rear side 38 of the extension module housing 35 to form an optical backplane. The optical backplane is configured to be directly optically connected to complementary fiber optic connectors disposed in information processing modules 24 to establish fiber optic connections when the optical backplane extension modules 28 are installed. By "directly connected," it is meant that there is not intermediate cabling used to make the connection. One connector is directly connected to another connector. The fiber optic connections can be intraconnections between information processing modules 24 within the same rack module housing 26 and thus the same optical backplane extension module 28. However, in one embodiment, the optical backplane extension modules 28 also contain optical interconnection ports 40 to allow interconnections between optical backplane extension modules 28 and/or direction to information processing modules 24.

Figure 4C:
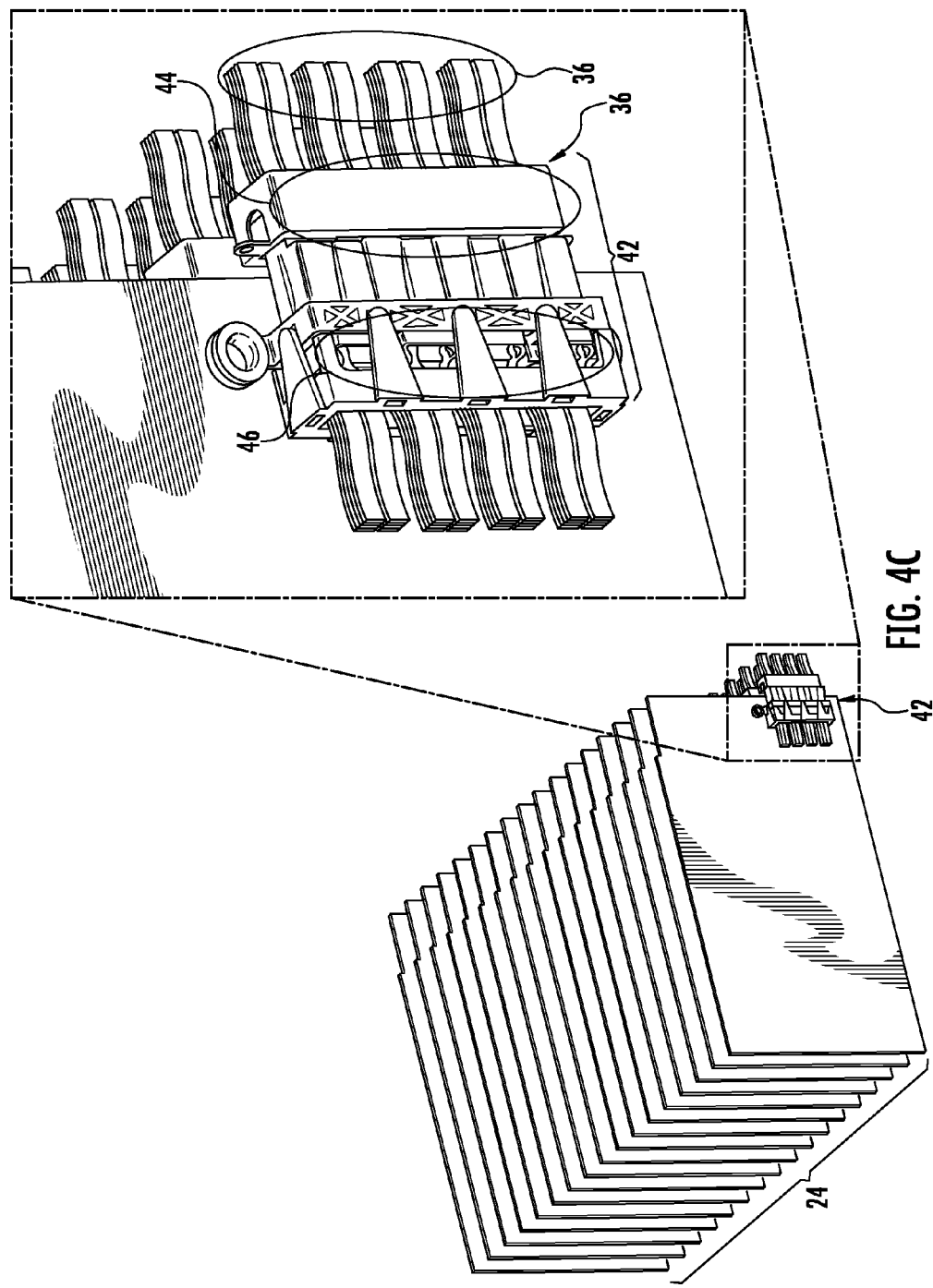
FIG. 4C is a close-up view of the dense fiber optic connector assembly in FIG. 4B.

Embodiments disclosed herein include dense fiber optic connector assemblies and related connectors and fiber optic cables suitable for establishing optical connections for optical backplanes in equipment racks. In this regard, FIG. 4A illustrates a right side perspective view of the optical backplane extension module 28 in FIG. 2B directly optically connected in the rear of the rack module housing 26 to the information processing modules 24. FIGS. 4B and 4C are right side perspective views of the information processing modules 24 with the rack module housing 26 removed for clarity purposes. As illustrated in FIG. 4B and the close-up view in FIG. 4C, an exemplary dense fiber optic connector assembly 42 is illustrated and provided to facilitate direct optical connections to the information processing modules 24 through the optical backplane extension module 28 in FIGS. 2A-3. A dense fiber optic connector assembly or related component is one in which a large number of optical fibers are supported to provide larger fiber optic connections in a dense area. Providing dense fiber optic connections can provide greater data throughput. For example, the dense fiber optic connector assembly 42 in FIGS. 4B and 4C support any suitable number of fiber optic connections such as sixty-four (64), one-hundred and twenty-eight (128), two-hundred and fifty-six (256) optical fibers or more for providing the desired number of fiber optic connections.

With continuing reference to FIGS. 4A-4C, and as will be described in greater detail below, the dense fiber optic connector assembly 42 is comprised of one or more fiber optic connectors, which are backplane fiber optic plugs 44 in this embodiment. The backplane fiber optic plugs 44 are configured to be disposed through the rear side 38 of the extension module housing 35 (see FIG. 3). By the term "backplane," it refers to disposition in the optical backplane extension module 28. The dense fiber optic connector assembly 42 also comprises one or more blade fiber optic connectors, which are blade fiber optic receptacles 46 in this embodiment, mounted on the information processing modules 24. By the term "blade," it is meant to refer to a card, board, or other carrier used to provide the components of an information processing module 24 that is mechanically received in the rack module housing 26. The blade fiber optic connectors 46 are connected to components in the information processing modules 24 to facilitate transfer of data from these components. Thus, when the backplane fiber optic plugs 44 are mated to the blade fiber optic receptacles 46, optical connections are established to the information processing modules 24. These optical connections can be routed through the fiber optic cables 32 connected to the backplane fiber optic plugs 44 (see FIG. 3) to other information processing modules 24 through intraconnections in the optical backplane extension module 38 and/or interconnections through the optical interconnection ports 40.

Figure 5:
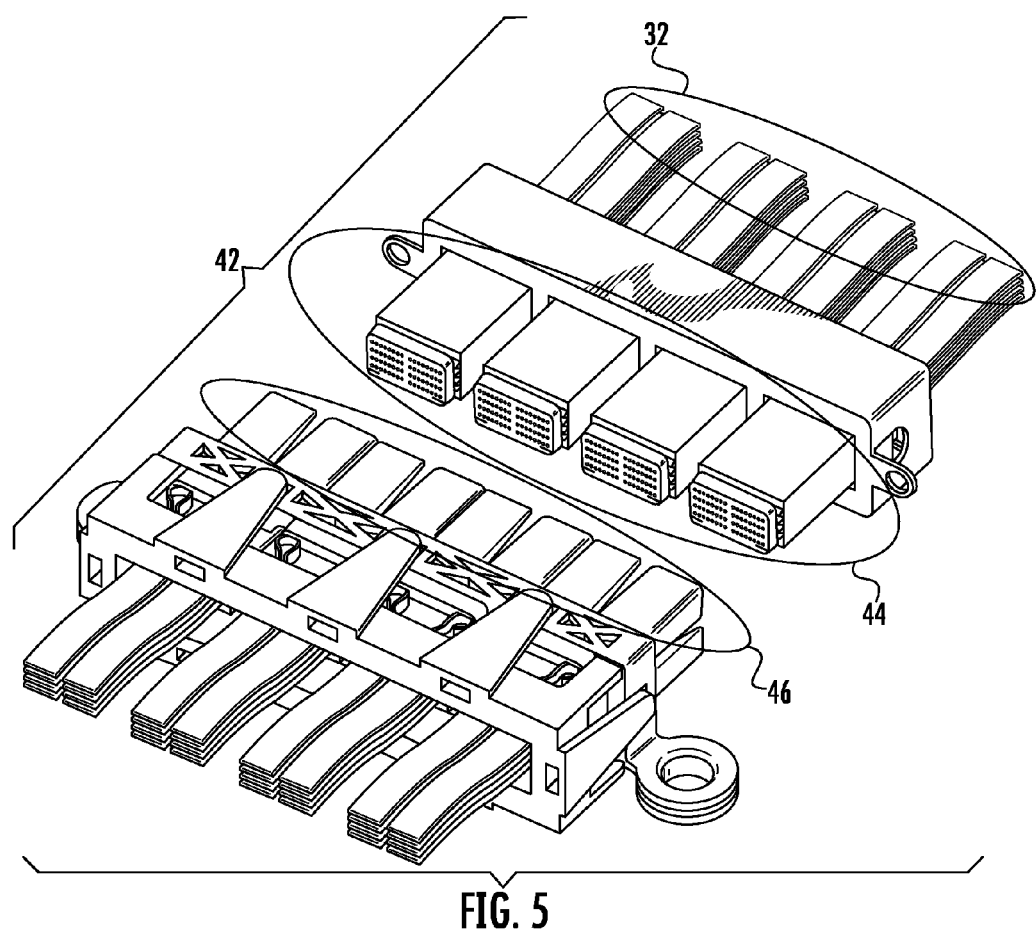
FIG. 5 is a perspective view of the dense fiber optic connector assembly in FIG. 4B comprised of dense information processing module fiber optic receptacles ("blade fiber optic receptacles") configured to receive and optically connect to dense optical backplane extension module fiber optic plugs ("backplane fiber optic plugs")

FIG. 5 is a close-up perspective view of the dense fiber optic connector assembly 42 in FIGS. 4B and 4C. In this example, the dense fiber optic connector assembly 42 is comprised of dense information processing module fiber optic receptacles ("blade fiber optic receptacles 46") configured to receive and directly optically connect to dense optical backplane extension module fiber optic plugs ("backplane fiber optic plugs 44"). FIG. 6A is a close-up perspective view of the backplane fiber optic plugs 44 in FIG. 5. FIG. 6B is a close-up perspective view of the blade fiber optic receptacles 46 in FIG. 5. Note that the dense fiber optic connector assembly 42 is not limited to this connector configuration. For example, the blade fiber optic receptacles 46 could be configured as plugs, and the backplane fiber optic plugs 44 could be configured as receptacles.

Figure 7A:
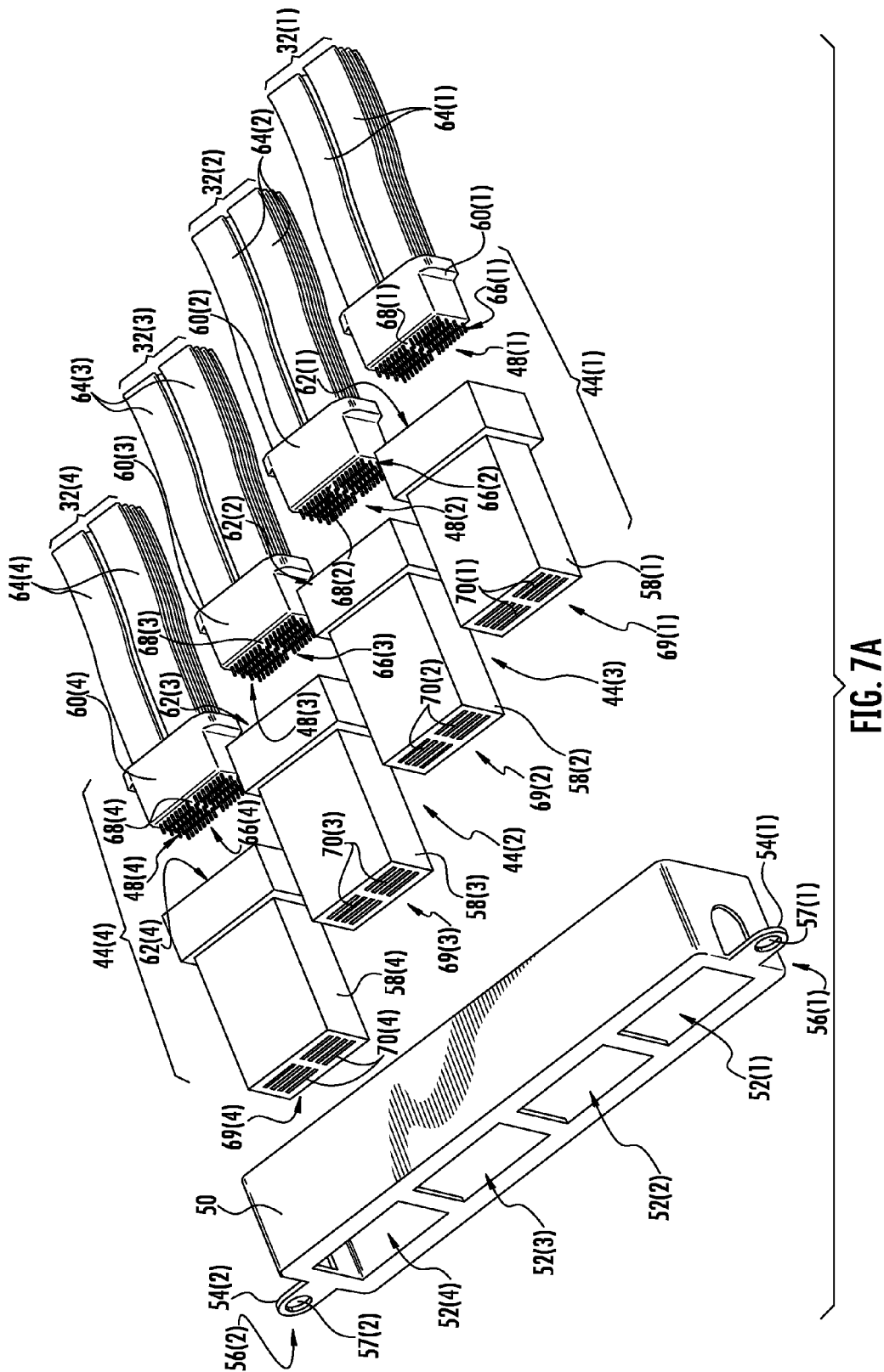
FIG. 7A is a perspective exploded view of the backplane fiber optic plugs in FIGS. 5 and 6A.

FIG. 7A is a perspective exploded view of the backplane fiber optic plugs 44 in FIGS. 5 and 6A. With reference to FIGS. 5, 6A, and 7, the backplane fiber optic plugs 44 are comprised of four (4) backplane fiber optic plugs 44(1)-44(4) in this embodiment. Each backplane fiber optic plug 44 supports sixty-four (64) optical fibers 48(1)-48(4). As will be described in more detailed below, the backplane fiber optic plugs 44(1)-44(4) are configured to support multiple fiber optic cables 32(1)-32(4) to provide a high density optical fiber count in the backplane fiber optic plugs 44(1)-44(4). In this embodiment, the fiber optic cables 32(1)-32(4) are each comprised of a plurality of ribbonized fiber optic cables; however, other embodiments may use optical fibers without cable such as optical fibers that are ribbonized or not. Providing backplane fiber optic plugs 44(1)-44(4) that are configured to receive ribbonized fiber optic cables is one method of allowing the backplane fiber optic plugs 44(1)-44(4) to support high density optical fiber count since ribbonized fiber optic cables are flat and efficient in terms of optical fiber count versus space. Further in this embodiment, each of the fiber optic cables 32(1)-32(4) are comprised of a plurality of ribbonized cables which allows flexibility in providing intraconnections and interconnections facilitated by the optical backplane extension module 28. Each fiber optic cable 32(1)-32(4) does not have to be intraconnected or interconnected to the same fiber optic connector depending on the design.

With continuing reference to FIGS. 6A and 7, each of the backplane fiber optic plugs 44(1)-44(4) are disposed in a backplane connector frame 50 to group the backplane fiber optic plugs 44(1)-44(4) together. The backplane connector frame 50 may be comprised of a plastic member that is molded or stamped, as non-limiting examples. The backplane connector frame 50 contains a plurality of openings 52(1)-52(4) configured to receive the backplane fiber optic plugs 44(1)-44(4). The backplane connector frame 50 also includes a suitable number of mounting features such as two tabs 54(1), 54(2) extending from ends 56(1), 56(2) of the connector frame 50 for mounting the backplane connector frame 50 to the rear side 38 of the extension module housing 35 (see FIG. 3). Each mounting tab 54(1), 54(2) contains an opening 57(1), 57(2) that is configured to receive a fastener to secure the backplane connector frame 50 with the backplane fiber optic plugs 44(1)-44(4) to the extension module housing 35 (see FIG. 3) to form an optical backplane for connection to the blade fiber optic receptacles 46(1)-46(4).

Figure 7B:
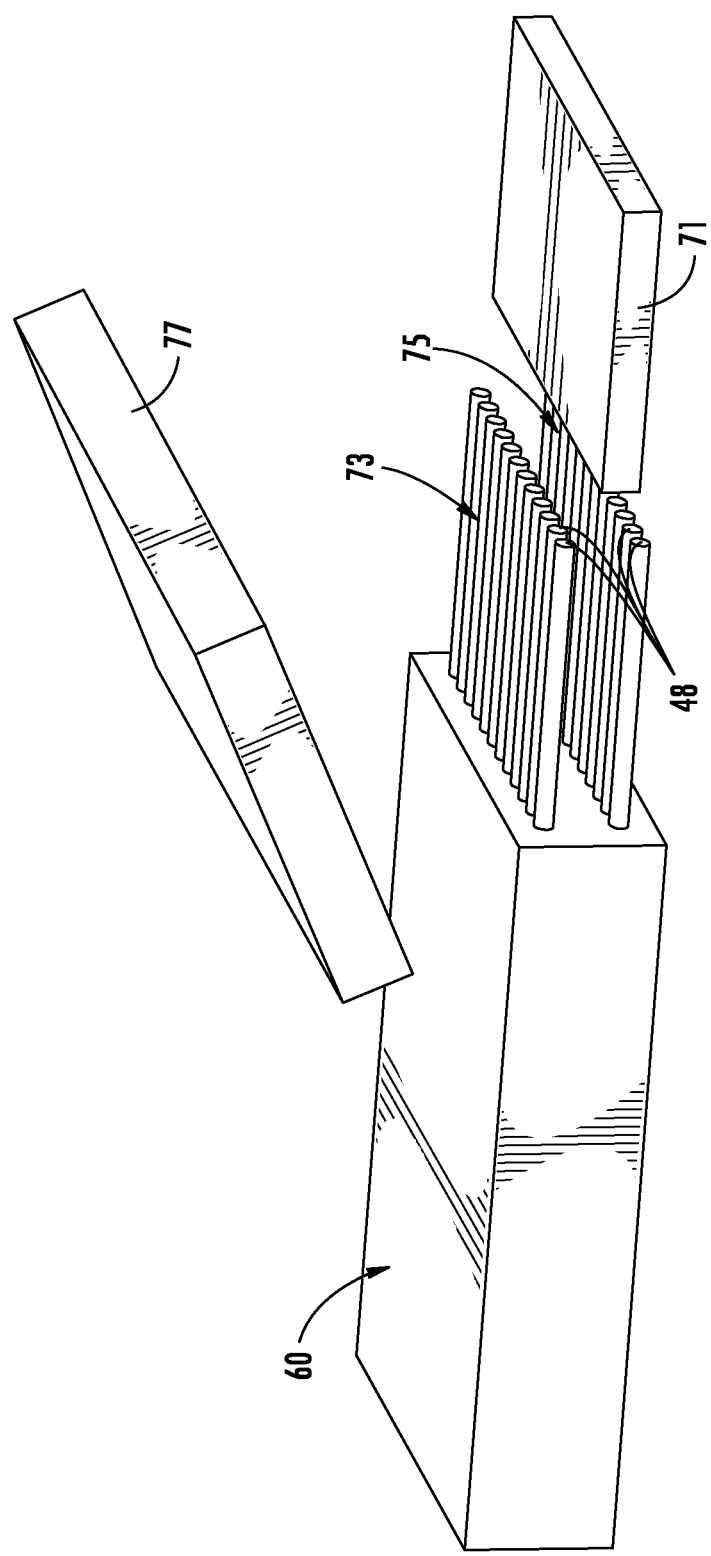
FIG. 7B schematically depicts a method for laser processing a plurality of optical fibers disposed in the backplane fiber optic plugs in FIG. 7A using a protection element disposed between a first row and a second row of optical fibers.

FIG. 7A also illustrates more detail of the backplane fiber optic plugs 44(1)-44(4). Each backplane fiber optic plug 44(1)-44(4) is comprised of a fiber optic connector body in the form of a fiber optic plug bodies 58(1)-58(4) and a fiber optic ferrule in the form of a fiber optic plug ferrules 60(1)-60(4). The fiber optic plug ferrules 60(1)-60(4) are configured to be disposed through first ends 62(1)-62(4) of the fiber optic plug bodies 58(1)-58(4) and disposed in internal chambers in the fiber optic plug bodies 58(1)-58(4). Optical fibers 48(1)-48(4) may be exposed and prepared from the sheaths 64(1)-64(4) of the fiber optic cables 32(1)-32(4) if necessary are aligned with fiber openings 66(1)-66(4) disposed in end faces 68(1)-68(4) of the fiber optic plug ferrules 60(1)-60(4). The second ends 69(1)-69(4) of the fiber optic plug bodies 58(1)-58(4) contain lenses 70(1)-70(4) are configured to be aligned with the fiber openings 66(1)-66(4) of the fiber optic plug ferrules 60(1)-60(4). The lenses 70(1)-70(4) allow for optical connections to be made to the optical fibers 48(1)-48(4) when the backplane fiber optic plugs 44(1)-44(4) are mated to the blade fiber optic receptacles 46(1)-46(4). With continuing reference to FIG. 7A, the purpose of the fiber optic plug ferrules 60(1)-60(4) is to hold the optical fibers 48(1)-48(4) together during fiber processing and during their insertion into the fiber optic plug bodies 58(1)-58(4). Laser processing of the optical fibers 48(1)-48(4) can provide a quick and efficient method for producing a high-quality end face on the optical fibers 48(1)-48(4) for termination. Examples of laser processing that can be provided to the optical fibers 48(1)-48(4) are described in U.S. patent application Ser. No. 13/028,799 filed on Feb. 16, 2011 and titled "METHODS FOR LASER PROCESSING ARRAYED OPTICAL FIBERS ALONG WITH SPLICING CONNECTORS". In this regard, FIG. 7B depicts a first method for laser processing the plurality of optical fibers 48 using a protection element 71. Protection element 71 is used for protecting the optical fibers 48 in the array that are not intended for laser processing since they are located at a further distance from the laser than the optical fibers optical fibers 48 intended for processing. By way of example, the fiber optic plug ferrules 60 have the optical fibers 48 disposed in a first row 73 at a first distance and a second row 75 at a second distance so that the laser could not be focused for both distances. More or fewer rows can be provided as desired. As shown, the first row 73 and second row 75 of the optical fibers 48 are schematically shown disposed within the fiber optic plug ferrules 60. The protection element 71 can reflect, absorb and/or disperse the laser energy after it passes the optical fibers being processed depending on the type of material used for the same. For instance, if the protection element 71 is a material that has a smooth surface such as a machined aluminum, stainless steel, etc. it will have a high-degree of reflection. On the other hand, if the protection element 71 is formed from a mica, carbon, ceramic plate or other similar porous material it will have a high-degree of absorption. Still further, the degree of dispersion caused by protection element 71 can depend on the surface finish. In other words, the rougher the surface, the greater the dispersion. Examples of surface finishes on protection element 71 that can create dispersion are grooves, knurling, etc.

With continued reference to FIG. 7B, the protection element 71 has a smooth surface that has a relatively high degree of reflection of the laser energy that impinges on the same. The protection element 71 allows the laser energy to reach the optical fibers being processed, but inhibits the laser energy from damaging the optical fibers not being processed, other portions of structure 30, or from creating a safety issue, but the protection element 71 may also absorb and/or disperse a portion of the energy depending on the material used. This laser process method also uses an optional laser absorption element 77 to contain the reflected laser energy. As shown in FIG. 7B, the protection element 71 is positioned near the ends of the optical fibers 48, and the absorption element 77 is disposed above the first row 73 of optical fibers 48 to inhibit the travel of any reflected laser energy from the protection element 71.

With reference back to FIG. 7A, the fiber optic plug bodies 58(1)-58(4) can be configured to provide optical transmission to the optical fibers 48(1)-48(4) disposed through the fiber optic plug ferrules 60(1)-60(4) through lenses that are molded-in, GRIN lenses, or other suitable lenses disposed in the fiber optic plug bodies 58(1)-58(4). If molded-in lenses are used, the fiber optic plug bodies 58(1)-58(4) is preferably manufactured of a light transmission material to provide blind holes internal to the fiber optic plug bodies 58(1)-58(4) with lenses that extend to the second ends 69(1)-69(4) of the fiber optic plug bodies 58(1)-58(4).

Figure 8:
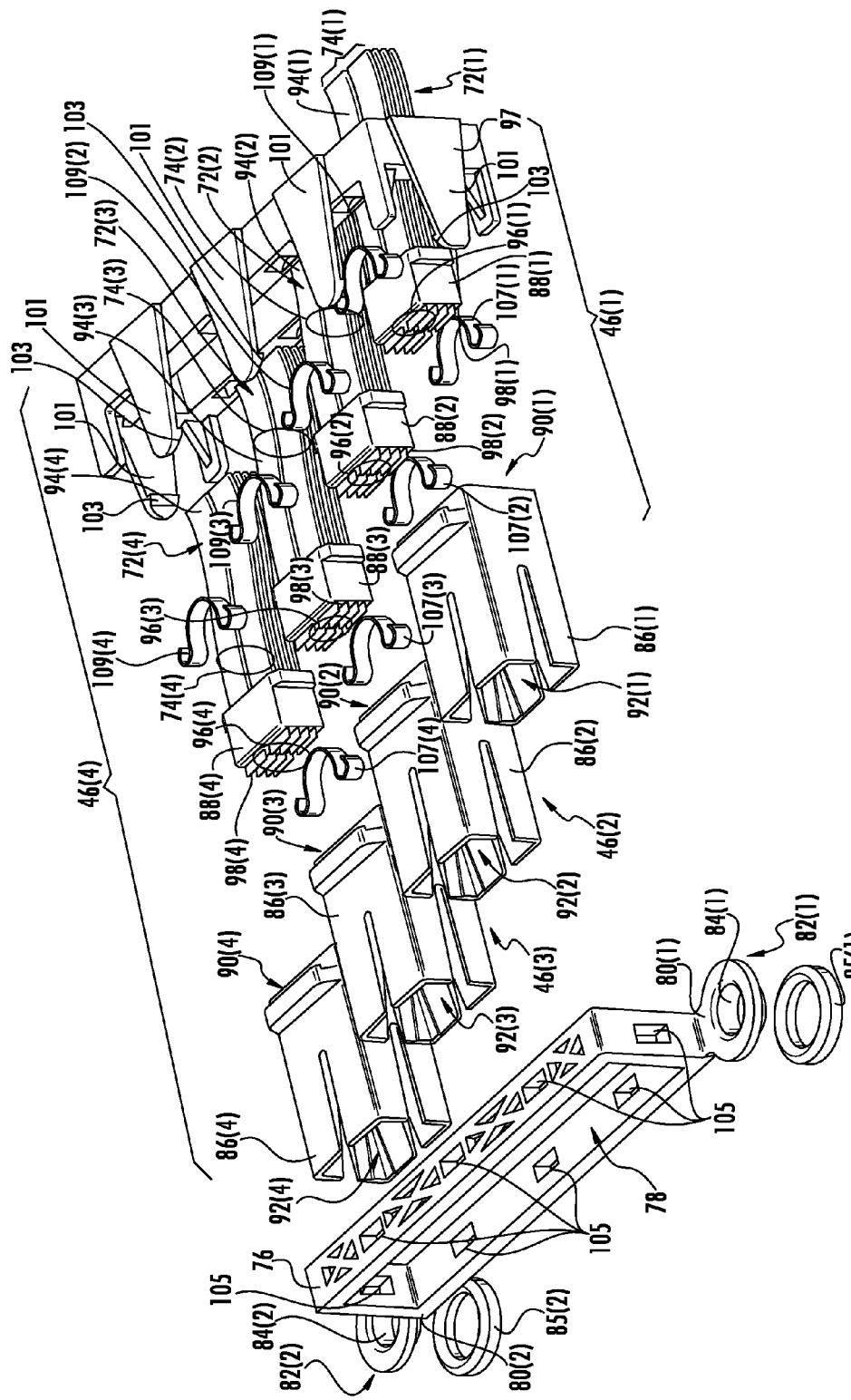
FIG. 8 is a perspective exploded view of the blade fiber optic receptacles in FIGS. 5 and 6B.

FIG. 8 is a perspective exploded view of the blade fiber optic receptacles 46 in FIGS. 5 and 6B. With reference to FIGS. 5, 6B and 8, the blade fiber optic receptacles 46 are comprised of four (4) blade fiber optic receptacles 46(1)-46(4) in this embodiment. Each blade fiber optic receptacle 46(1)-46(4) supports sixty-four (64) optical fibers 72(1)-72(4). As will be described in more detailed below, the blade fiber optic receptacles 46(1)-46(4) are configured to support multiple fiber optic cables 74(1)-74(4) to provide the a high optical fiber count in the blade fiber optic receptacles 46(1)-46(4). In this embodiment, the fiber optic cables 74(1)-74(4) are each comprised of a plurality of ribbonized fiber optic cables. Providing blade fiber optic receptacles 46(1)-46(4) that are configured to receive ribbonized fiber optic cables is one method of allowing the blade fiber optic receptacles 46(1)-46(4) to support high density optical fiber count since ribbonized fiber optic cables are flat and efficient in terms of optical fiber count versus space. Further in this embodiment, each of the fiber optic cables 74(1)-74(4) are comprised of a plurality of ribbonized cables which allows flexibility in providing fiber optic connections to different component and/or to different areas on the information processing modules 24.

With continuing reference to FIGS. 6B and 8, each of the backplane fiber optic receptacles 46(1)-46(4) are disposed in a blade connector frame 76 to group the blade fiber optic receptacles 46(1)-46(4) together when disposed on the information processing module 24. The blade connector frame 76 may be comprised of a plastic member that is molded or stamped as examples. The blade connector frame 76 contains an opening 78 configured to receive the blade fiber optic receptacles 46(1)-46(4). The blade connector frame 76 also includes suitable mounting features such as two tabs 80(1), 80(2) extending from ends 82(1), 82(2) of the blade connector frame 76 for mounting the blade connector frame 76 to a surface of the information processing module 24 (see FIG. 3). Each mounting tab 80(1), 80(2) contains an opening 84(1), 84(2) that is configured to receive a fastener to secure the blade connector frame 76 with the blade fiber optic receptacles 46(1)-46(4) to the information processing module 24 (see FIG. 3) for optical connections. Washers or spacers 85(1), 85(2) may be provided and disposed between the surface of the information processing module 24 and the blade connector frame 76. The spacers 85(1), 85(2) may be elastomeric elements that are intended to allow resilient coupling of the blade fiber optic receptacle 46 with the backplane fiber optic plug 44. By the spacers 85(1), 85(2) being elastomeric elements, when the backplane fiber optic plug 44 starts to mate with the blade fiber optic receptacle 46, the spacers 85(1), 85(2) allow the blade fiber optic receptacle 46 to be flexible and move slightly to allow for the backplane fiber optic plug 44 to properly mate with the blade fiber optic receptacles 44 in the event that the backplane fiber optic plug 46 and the blade fiber optic receptacles 44 are not perfectly aligned.

FIG. 8 also illustrates more detail of the blade fiber optic receptacles 46(1)-46(4). Each blade fiber optic receptacle 46(1)-46(4) is comprised of a fiber optic connector housing in the form of fiber optic receptacle bodies 86(1)-86(4) and a fiber optic ferrule in the form of fiber optic receptacle ferrules 88(1)-88(4). The fiber optic receptacle ferrules 88(1)-88(4) are configured to be disposed through first ends 90(1)-90(4) of the fiber optic receptacle bodies 86(1)-86(4) and disposed in internal chambers 92(1)-92(4) in the fiber optic receptacle bodies 86(1)-86(4). Optical fibers 72(1)-72(4) that are exposed and prepared from the sheaths 94(1)-94(4) of the fiber optic cables 74(1)-74(4) are aligned with fiber openings 96(1)-96(4) disposed in end faces 98(1)-98(4) of the fiber optic receptacle ferrules 88(1)-88(4). Optical connections to the optical fibers 72(1)-72(4) disposed in the fiber optic receptacle ferrules 88(1)-88(4) are made when the backplane fiber optic plugs 44(1)-44(4) are inserted into the internal chambers 92(1)-92(4) of the fiber optic receptacle bodies 86(1)-86(4). The fiber optic receptacle bodies 86(1)-86(4) align the fiber optic plug bodies 58(1)-58(4) (FIG. 7A) and their lenses 70(1)-70(4) with the fiber openings 96(1)-96(4) in the end faces 98(1)-98(4) of the fiber optic receptacle ferrules 88(1)-88(4).

With continuing reference to FIG. 8, the fiber optic receptacle ferrules 88(1)-88(4) can be configured to provide optical transmission to the optical fibers 72(1)-72(4) disposed therein through lenses such as molded-in lenses, GRIN lenses, or the like disposed in the fiber optic receptacle ferrules 88(1)-88(4). By way of example, fiber optic receptacle ferrules 88(1)-88(4) may support GRIN lenses in bores. In this regard, FIG. 9A is a perspective quarter cut view of the blade fiber optic receptacles 46(1)-46(4) in FIGS. 5, 6B, and 8, wherein the fiber optic connector bodies 86(1)-86(4) are configured to support GRIN lenses.

To assemble the blade fiber optic receptacles 46(1)-46(4), the blade fiber optic receptacles 46(1)-46(4) are disposed through the blade connector frame 76. The fiber optic receptacle ferrules 88(1)-88(4) are disposed through a rear blade connector frame 97. The blade connector frame 76 and rear blade connector frame 97 are secured to each other by latches 101 that contain protrusions 103 configured to engage with openings 105 disposed in the back connector frame 76. Springs 107(1)-107(4), 109(1)-109(4) are included to provide spring loading of the blade fiber optic receptacles 46(1)-46(4) to the blade connector frame 76 and rear blade connector frame 97 to allow for movement, when needed, to be connected to the backplane fiber optic plugs 44(1)-44(4).

Figure 9A:
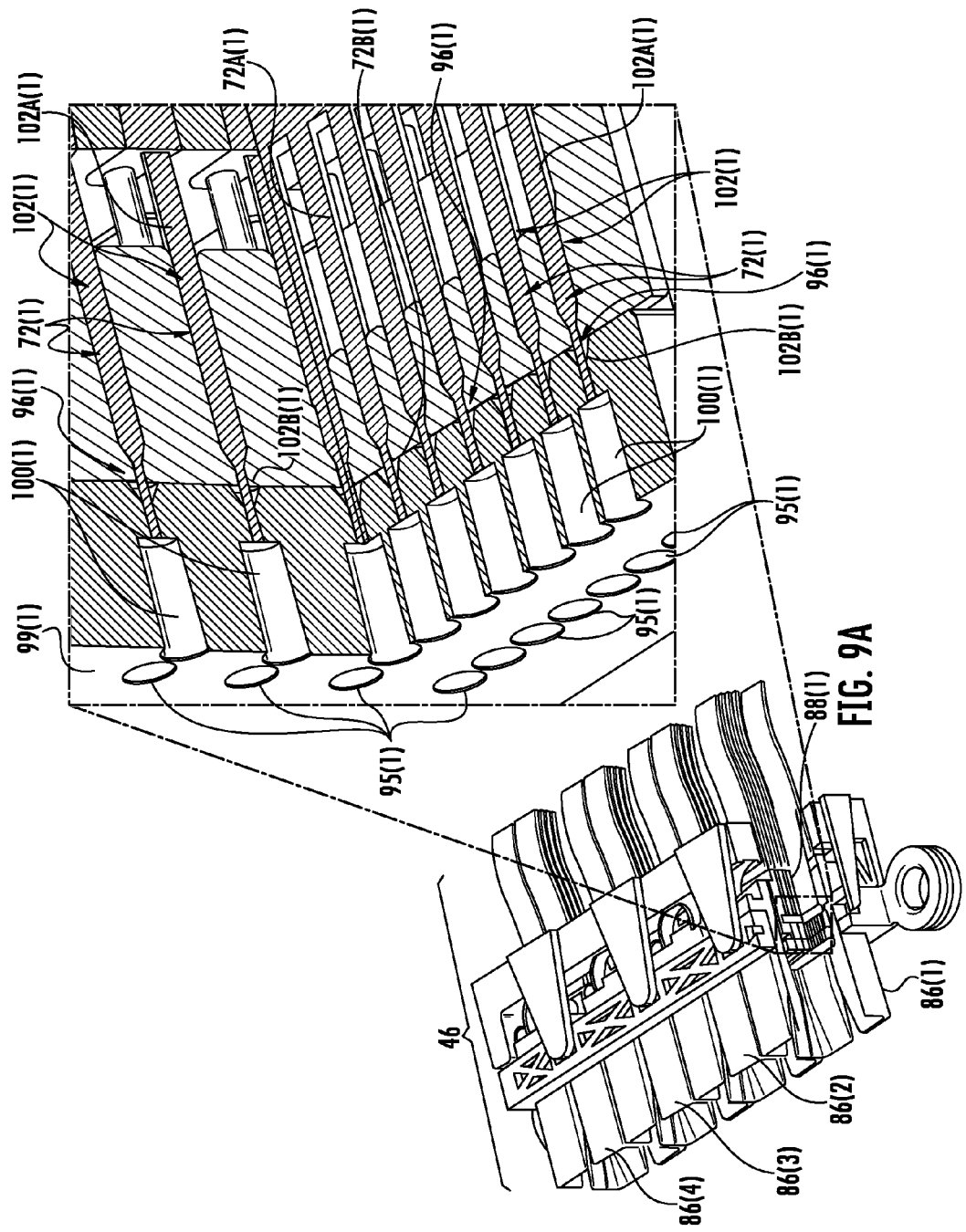
FIG. 9A is a perspective quarter cut view of an exemplary dense fiber optic connector assembly configured to support GRIN lenses that may be employed in the blade fiber optic receptacles in FIGS. 5, 6B, and 8.

As illustrated in FIG. 9A, a fiber optic receptacle sub-carrier 99(1) of the fiber optic receptacle body 86(1) is configured to receive the fiber optic receptacle ferrule 88(1). In this embodiment, the fiber optic receptacle sub-carrier 99(1) is comprised of GRIN lens internal chambers 100(1) aligned with GRIN lens openings 95(1). The GRIN lens internal chambers 100(1) are configured to support GRIN lenses whose end portions are disposed at the end face 98(1) through the GRIN lens openings 95(1). The fiber optic receptacle sub-carrier 99(1) is also comprised of internal fiber chambers 102(1) to support the optical fibers 72(1) and align the optical fibers 72(1) with the GRIN lens internal chambers 100(1) to align the optical fibers 72(1) with GRIN lenses. The internal fiber chambers 102(1) are comprised of a coated fiber chamber 102A(1) and a bare fiber chamber 102B(1) to securely support the coated portions 72A(1) and bare portions 72B(1) of the optical fibers 72(1) to avoid movement of the optical fibers 72(1) in the fiber optic receptacle sub-carrier 99(1). Note that although only the fiber optic receptacle sub-carrier 99(1) and fiber optic receptacle ferrule 88(1) are discussed with regard to FIG. 9A, the discussion of FIG. 9A is equally applicable to the other fiber optic receptacle ferrules 88(2)-88(4) and their fiber optic receptacle sub-carriers 99(2)-99(4).

Alternatively, the fiber optic receptacle bodies 86(1)-86(4) can be manufactured of a light transmission material having molded-in lenses at the end of blind holes for receiving optical fibers for optical transmissions at the interface. In this regard, FIG. 9B is a perspective cross-section view of the fiber optic receptacle body 86(1) providing a blind hole lens holder that may be employed in the blade fiber optic receptacles 46(1)-46(4) in FIGS. 5, 6B, and 8.

As illustrated in FIG. 9B, in this embodiment, a fiber optic receptacle sub-carrier is not employed. The fiber optic receptacle body 86(1) in this embodiment is comprised of blind hole lenses 104(1). The blind hole lenses 104(1) are disposed in the fiber optic receptacle body 86(1). The fiber optic receptacle body 86(1) is comprised of a light transmissive material forming blind holes 106(1) that allow light from the optical fibers 72(1) to be transmitted through the light transmissive material and through the blind hole lenses 104(1). The fiber optic receptacle body 86(1) is comprised of internal fiber chambers 102(1), like in FIG. 9A, to support the optical fibers 72(1) and align the optical fibers 72(1) with the blind hole lenses 104(1). The internal fiber chambers 102(1) are comprised of a coated fiber chamber 102A(1) and a bare fiber chamber 102B(1) to securely support the coated portions 72A(1) and bare portions 72B(1) of the optical fibers 72(1) to avoid movement of the optical fibers 72(1) in the fiber optic receptacle body 86(1). Note that although only the fiber optic receptacle body 86(1) is discussed with regard to FIG. 9B, the features of FIG. 9B can be applicable to the other fiber optic receptacle bodies 86(2)-86(4).

As will be described in more detail below with regard to FIGS. 10A-15B, the lenses 70(1)-70(4) can be shuttered. Shuttering allows for the optical fibers 48(1)-48(4) to not be exposed through the lenses 70(1)-70(4) when the backplane fiber optic plugs 44(1)-44(4) are not mated to prevent debris from entering the fiber optic plug bodies 58(1)-58(4) and affecting optical transmissions when the backplane fiber optic plugs 44(1)-44(4) are not mated. When the backplane fiber optic plugs 44(1)-44(4) are mated, the shutter exposes the optical transmission paths to the optical fibers 48(1)-48 (4) through the lenses 70(1)-70(4).

Debris entering the fiber optic plug bodies 58(1)-58(4) and entering through the GRIN lens openings 95(1)-95(4) or blind hole lenses 104(1)-104(4), as the case may be, can attenuate optical transmissions. As will be described in more detail below with regard to FIGS. 10A-15B, the GRIN lens openings 95(1)-95(4) or blind hole lenses 104(1)-104(4), as the case may be, can be shuttered. Shuttering for the dense fiber optic connections can be provided in the backplane fiber optic plugs 44(1)-44(4) and the blade fiber optic receptacles 46(1)-46(4) when not mated to prevent debris from entering and affecting optical transmissions. When the backplane fiber optic plugs 44(1)-44(4) and blade fiber optic receptacles 46(1)-46(4) are mated, the shutter can be designed to be actuated to expose the optical transmission paths.

Figure 11A:
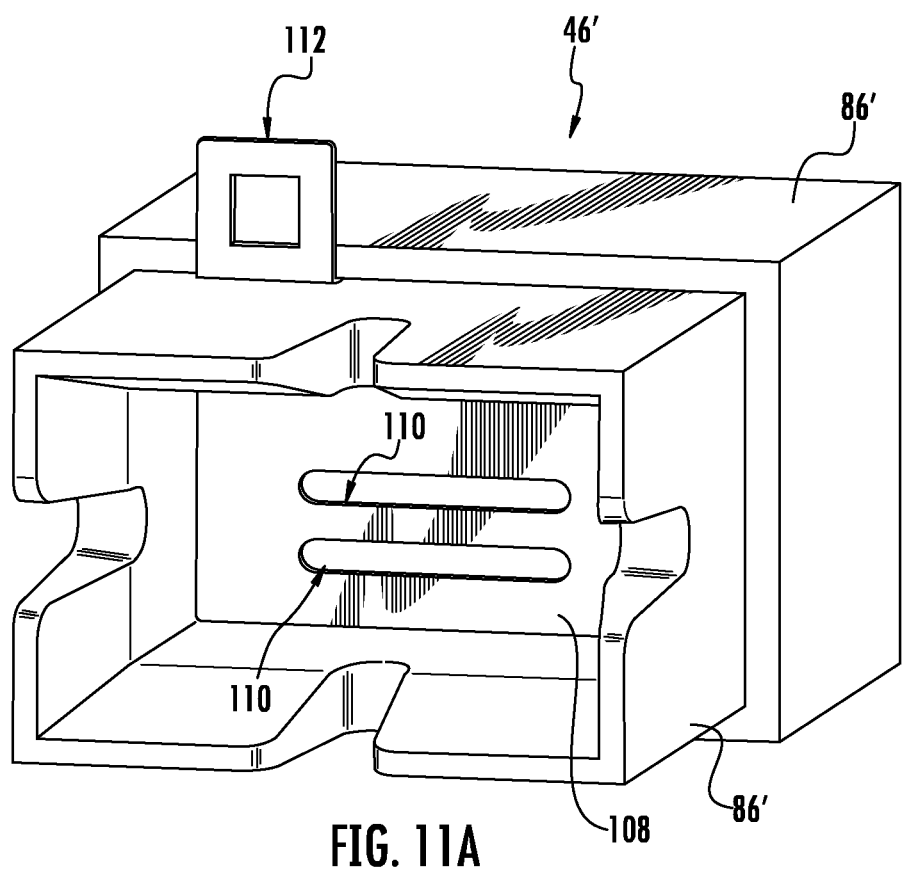
FIGS. 11A and 11B are rear perspective views of another exemplary shuttered fiber optic receptacle that can be employed as the blade fiber optic receptacles in FIGS. 5, 6B, and 8 with the slideable shutter disposed in closed and open positions, respectively.
Figure 11B:
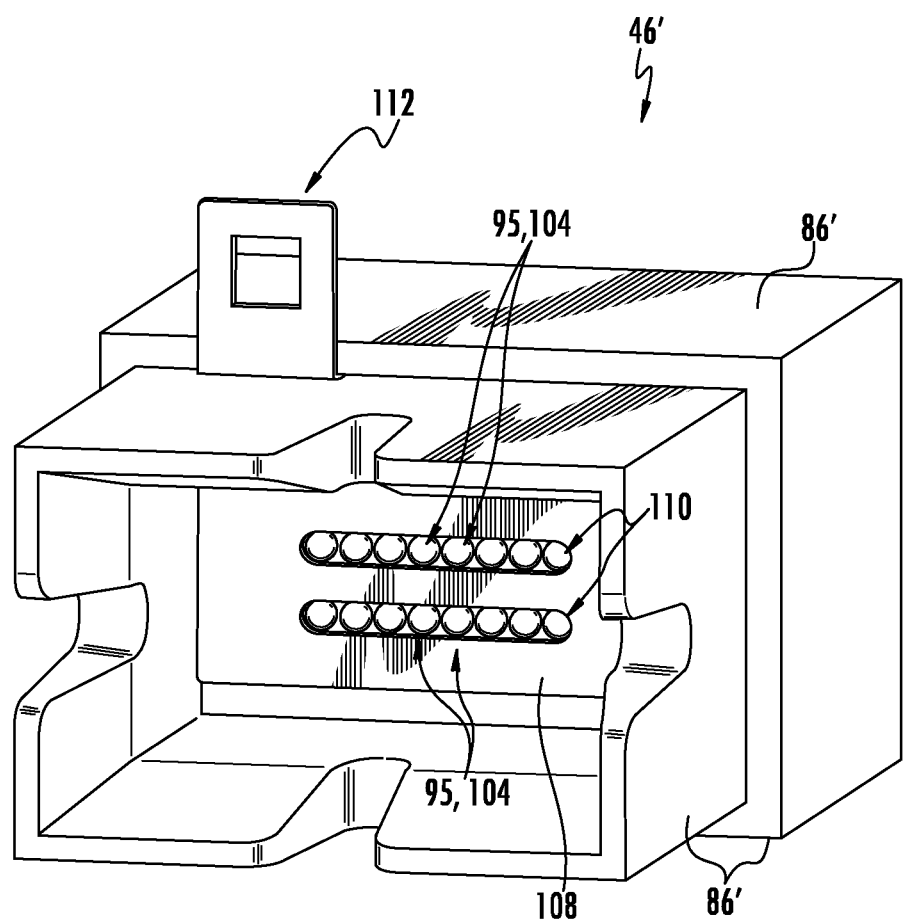

FIGS. 10A and 10B are right side perspective views of shuttered blade fiber optic receptacles 46'(1)-46'(4) that can be employed as the blade fiber optic receptacles 46(1)-46(4) in FIGS. 5, 6B, and 8 with slideable shutters 108(1)-108(4) disposed in open and closed positions, respectively. FIGS. 11A and 11B are rear perspective views of an exemplary shuttered fiber optic receptacle 46' that can be employed as the blade fiber optic receptacles 46(1)-46(4) in FIGS. 5, 6B, and 8 with the slideable shutter 108 disposed in closed and open positions, respectively. FIGS. 12A and 12B are side cross-sectional views of the shuttered fiber optic receptacle housing 86' in FIGS. 11A, and 11B, respectively, illustrating the slideable shutter 108 disposed in closed and open positions, respectively.

With reference to FIGS. 10A-12B, the shuttered fiber optic receptacle body 86' may be a dense fiber optic receptacle housing. The slideable shutter 108 is disposed in the optical transmission paths of the GRIN lens openings 95(1)- 95(4) or blind hole lenses 104(1)-104(4), as the case may be, of the fiber optic receptacle body 86'. The slideable shutter 108 has openings 110 configured to be aligned with the GRIN lens openings 95(1)-95(4) or blind hole lenses 104 (1)-104(4), as the case may be, in the fiber optic receptacle body 86' in an open position, as illustrated in FIG. 11B. The openings 110 of the slideable shutter 108 is also configured to block access to lenses disposed in the GRIN lens openings 95(1)-95(4) or blind hole lenses 104(1)-104(4), as the case may be, in a closed position, as illustrated in FIG. 11A. As illustrated in FIGS. 11A and 11B, an actuation member 112 is coupled to the slideable shutter 108. The actuation member 112 is configured to move the slideable shutter 108 from the closed position in FIG. 11A to the open position in FIG. 11B. The actuation member 112 may be a linear action actuation member configured to be linearly moved to linearly move the slideable shutter 108. By way of example, the slidable shutter is movable in a plane that is generally perpendicular to the optical axis of the fiber optic connector.

In this embodiment, because high density fiber count is supported by the fiber optic receptacle ferrule 88', a low actuation distance is provided. The slideable shutter 108 can be configured to move at least the distance of the inner diameter of the GRIN lens openings 95(1)-95(4) or blind hole lenses 104(1)-104(4), as the case may be, to achieve dust sealing and/or eye safety. The slideable shutter 108 is planar, thin, and requires little actuation distance. It can be actuated in a linear fashion with no rotation by the actuation member 112, as will be described in more detail below. The slideable shutter 108 can be use in collimated beam paths.

For example, as illustrated in FIG. 12A, when the actuation member 112 is not pressed down as is provided in FIG. 12B, the slideable shutter 108 is not in an open position. Solid sections 114 adjacent the openings 110 in the slideable shutter 108 are aligned with the GRIN lens openings 95(1)- 95(4) or blind hole lenses 104(1)-104(4), as the case may be, in a closed position, and thus block light transmission in FIG. 12A. In FIG. 12B, the solid sections 114 of the slideable shutter 108 are offset from the GRIN lens openings 95(1)-95(4) or blind hole lenses 104(1)-104(4), as the case may be, and the openings 110 are aligned with the GRIN lens openings 95(1)-95(4) or blind hole lenses 104(1)-104 (4), as the case may be, in an open position, and thus light transmission is not blocked.

Figure 13B:
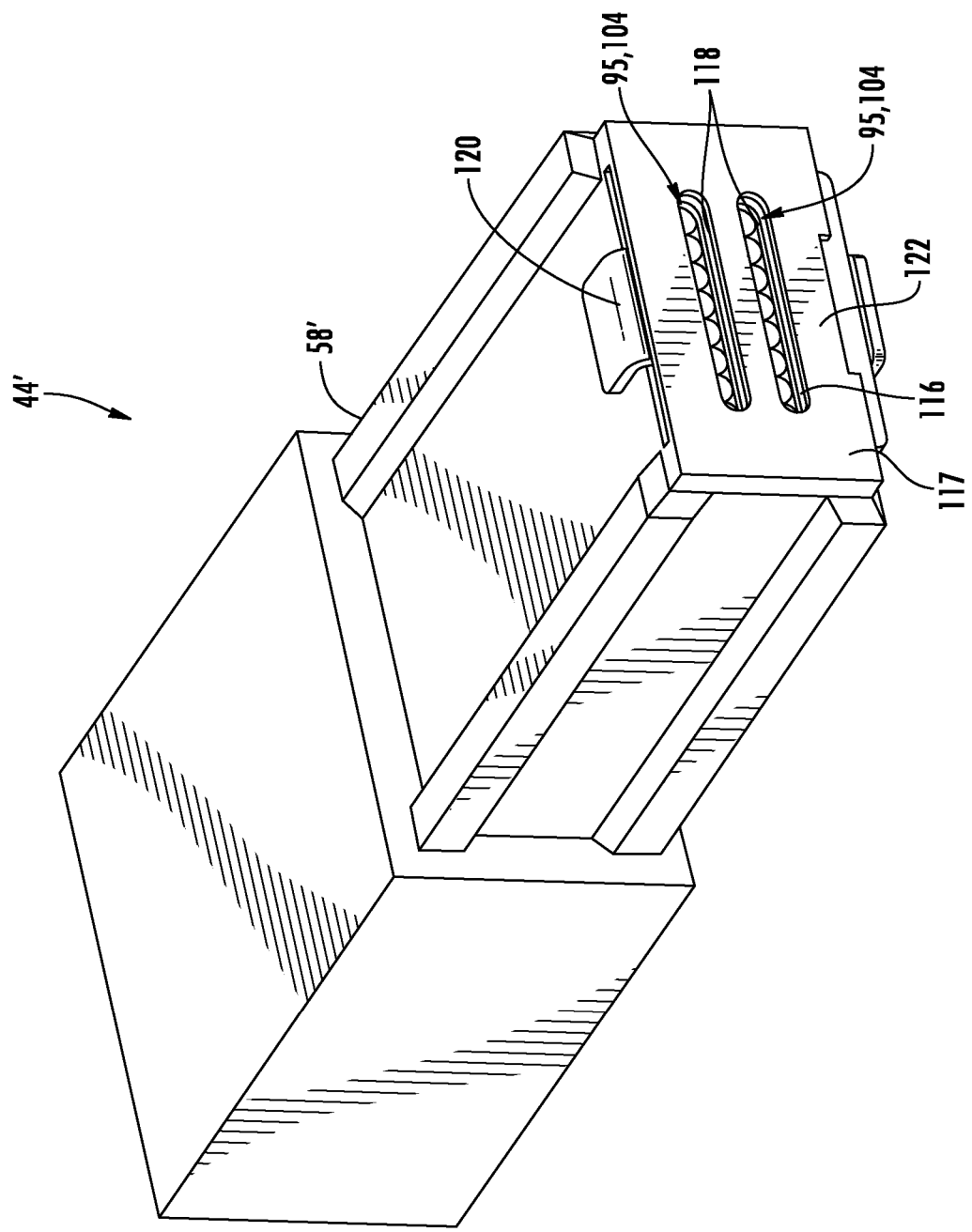
FIG. 13B is a rear perspective view of the shuttered fiber optic plug in FIG. 13A, with an actuation mechanism of the slideable shutter actuated to dispose the slideable shutter in an open position.
Figure 14:
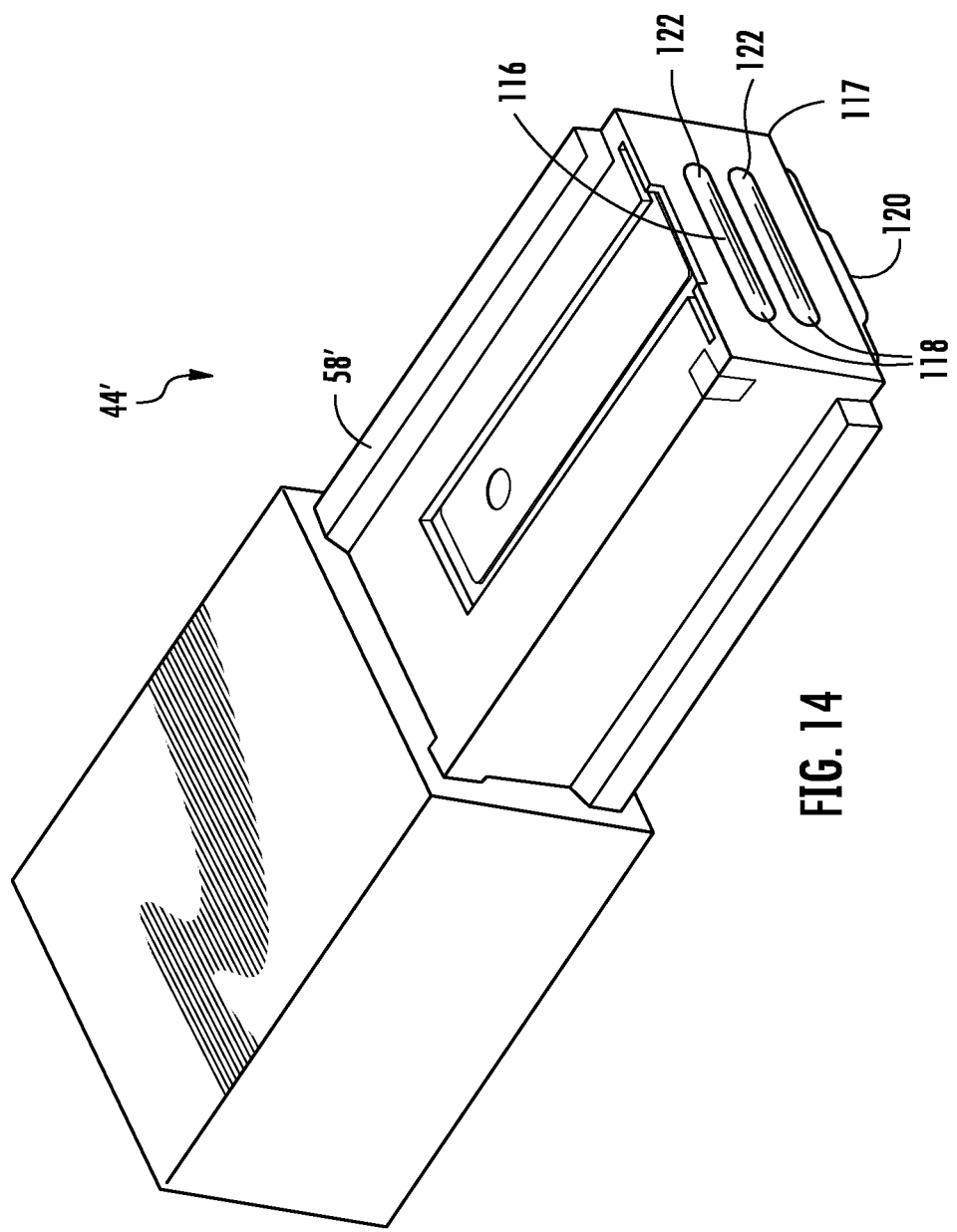
FIG. 14 is a rear perspective view of the shuttered fiber optic plug illustrated in FIG. 13A.

FIGS. 13A and 13B are perspective views of an exemplary shuttered backplane fiber optic plug 44' that can be employed as the backplane fiber optic plug 44 in FIGS. 5, 6A, and 7, with a slideable shutter 116 disposed in a closed and open position, respectively. FIG. 13C is a close-up view of FIG. 13B illustrating the slideable shutter in an open position. The slideable shutter 116 is an optical path of the lenses 70 disposed in the fiber optic plug ferrule 60' (see FIG. 7A). FIG. 14 is a bottom perspective view of the shuttered fiber optic plug 44' illustrated in FIG. 13A. The shuttered backplane fiber optic plug 44' may be a dense backplane fiber optic plug. The slideable shutter 116 has openings 118 configured to be aligned with the lenses 70 in the fiber optic plug ferrule 60 in an open position, as illustrated in FIGS. 13B and 13C. The slideable shutter 116 in this embodiment is protected behind a face plate 117 that is configured with openings 119 having the same geometry as openings 118, but the face plate 117 is optional. The openings 118 of the slideable shutter 116 are also configured to block access to the lenses 70 in a closed position, as illustrated in FIG. 13A. As illustrated in FIGS. 13A-13C, an actuation member 120 is coupled to the slideable shutter 116. The actuation member 120 is configured to move the slideable shutter 116 from the closed position in FIG. 13A to the open position in FIGS. 13B and 13C.

For example, as illustrated in FIG. 13A, when the actuation member 120 is not pressed down as is provided in FIGS. 13B and 13C, the slideable shutter 116 is not in an open position. Solid sections 122 adjacent the openings 118 in the slideable shutter 116 are aligned with the lenses 70 in a closed position, and thus block light transmission in FIGS. 13A and 14. In FIGS. 13B and 13C, the solid sections 122 of the slideable shutter 116 are offset from the GRIN lens openings 95(1)-95(4) or blind hole lenses 104(1)-104(4), as the case may be, and the openings 118 are aligned with the lenses 70 in an open position, and thus light transmission is not blocked.

FIG. 15A is a side perspective view of the shuttered fiber optic receptacle body 86' in FIGS. 11A and 11B with the actuation members 112, 120 unactuated to place the slideable shutters 108, 116 in closed positions before the shuttered fiber optic receptacle body 86' receipt of the fiber optic plug body 58' in FIGS. 13A-14. FIG. 15B is a side perspective view of the shuttered fiber optic receptacle body 86' in FIGS. 11A and 11B with the actuation members 112, 120 actuated to place the slideable shutters 108, 116 in open positions as the shuttered fiber optic receptacle body 86' receives and is mated with the fiber optic plug body 58' in FIGS. 13A-14.

With continuing reference to FIGS. 15A and 15B, the fiber optic plug body 58' contains a mating actuation member 124. The mating actuation member 124 is comprised of a mount 126 supporting an actuation arm 128. The actuation arm 128 is configured to engage the fiber optic receptacle actuation member 112 when the fiber optic plug body 58' is received by the fiber optic receptacle body 86'. The actuation arm 128 contains a protrusion 130 disposed on a distal end 132 of the actuation arm 128. As the fiber optic plug body 58' is received in the blade fiber optic receptacle 46', an end portion 134 of the actuation arm 128 is disposed in an engagement orifice 136 wherein the protrusion 130 will cause a lifting force to be disposed in the engagement orifice 136 to move the slideable shutter 108 in the blade fiber optic receptacle 46' from a closed to an open position. As the backplane fiber optic plug 44' penetrates the blade fiber optic receptacle 46', the actuation member 120 is indexed to open the slideable shutter 116 disposed in the backplane fiber optic plug 44' to an open position.

Other embodiments of dense fiber optic connector assemblies and related connectors and fiber optic cables suitable for establishing optical connections for optical backplanes in equipment racks are possible and disclosed herein. In this regard, FIG. 16A illustrates rack module housing 26 with information processing modules 24 disposed therein. FIG. 16B is a perspective view of the information processing modules 24 with the rack module housing 26 removed. As illustrated in FIG. 16B, another exemplary dense fiber optic connector assembly 131 is illustrated and provided to facilitate direct optical connections to the information processing modules 24 through the optical backplane extension module 28 illustrated previously in FIGS. 2A-3. As non-limiting examples, the dense fiber optic connector assembly 131 in FIG. 16B can support sixty-four (64), one-hundred and twenty-eight (128), two-hundred and fifty-six (256), or more optical fibers to provide sixty-four (64), one-hundred and twenty-eight (128), two-hundred and fifty-six (256), or more fiber optic connections, respectively.

Figure 17A:
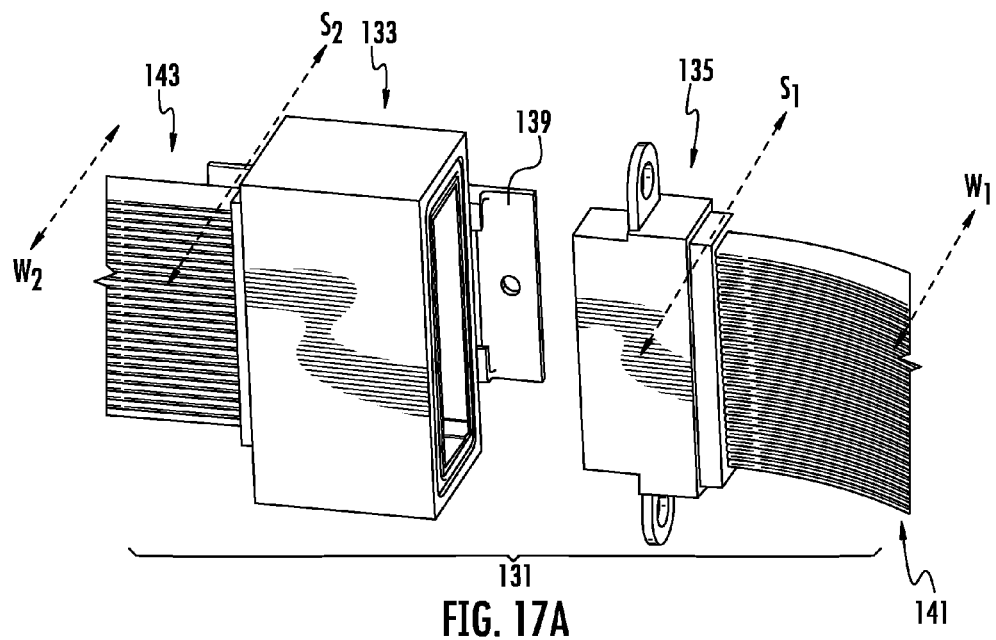
FIG. 17A is a side perspective view of the dense fiber optic connector assembly in FIG. 16B comprising a blade fiber optic plug configured to receive a backplane fiber optic plug.
Figure 17B:
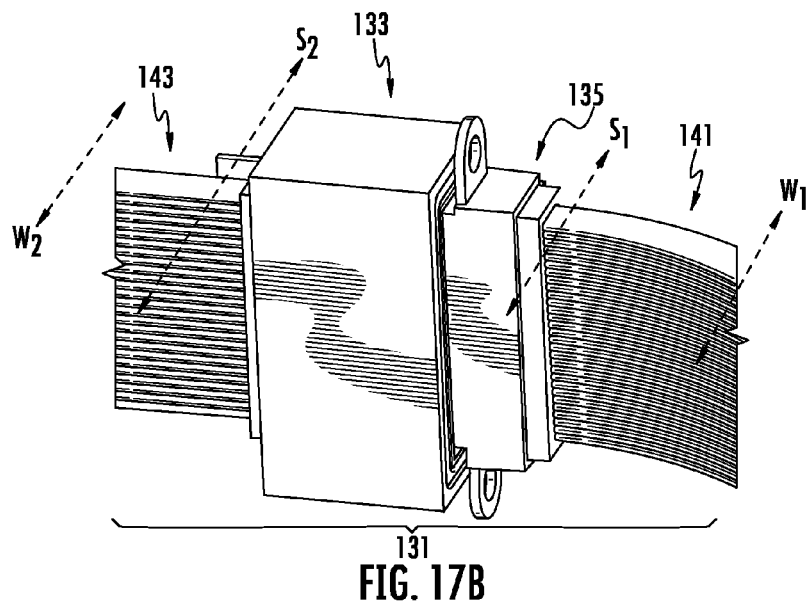
FIG. 17B is a side perspective view of the dense fiber optic connector assembly in FIG. 16B with the blade fiber optic plug receiving the backplane fiber optic plug.

FIG. 17A is a side perspective view of the dense fiber optic connector assembly 131 in FIG. 16B comprising a blade fiber optic receptacle 133 configured to receive a backplane fiber optic plug 135. FIG. 17B is a side perspective view of the dense fiber optic connector assembly 133 in FIG. 16B with the blade fiber optic receptacle 133 receiving the backplane fiber optic plug 135 to establish an optical connection between information processing modules 24 and the optical backplane extension module 28 illustrated previously in FIGS. 2A-3.

With continuing reference to FIGS. 16B-17B, the fiber optic connector assembly 131 is comprised of one or more the backplane fiber optic plugs 135 configured to be disposed through the rear side 38 of the extension module housing 35 (see FIG. 3). As illustrated in FIG. 17A, the backplane fiber optic plug 135 is configured to receive a plurality of fiber optic cables 138 or optical fibers. In this embodiment, the fiber optic cables 138 are ribbon cables that are stacked on top of each other with their wide axis $W_1$ disposed along the short axis $S_1$ of the backplane fiber optic plug 135. This arrangement allows the backplane fiber optic plug 135 to support a high fiber count and thus provide a dense backplane fiber optic plug 135.

With continuing reference to FIGS. 16B-17B, the fiber optic connector assembly 131 also comprises one or more blade fiber optic receptacles 133 mounted on the information processing modules 24. The blade fiber optic receptacles 133 are connected to components in the information processing modules 24 to facilitate transfer of data from these components. As illustrated in FIG. 17A, the blade fiber optic receptacle 133 is configured to receive a plurality of fiber optic cables 143 or optical fibers that may be ribbonized. In this embodiment, the fiber optic cables 143 are ribbon cables that are stacked on top of each other with their wide axis $W_2$ disposed along the short axis $S_2$ of the blade fiber optic receptacle 135. This arrangement allows the blade fiber optic receptacle 135 to support a high fiber count and thus provide a dense blade fiber optic receptacle 135.

When the backplane fiber optic plugs 135 are mated to the blade fiber optic receptacles 133, optical connections are established to the information processing modules 24. These optical connections can be routed through the fiber optic cables 32 connected to the backplane fiber optic plugs 135 (see FIG. 3) to other information processing modules 24 through intraconnections in the optical backplane extension module 28 and/or interconnections through the optical interconnection ports 40 (see FIG. 3). The blade fiber optic receptacle 133 include a mounting structure 139 that may be spring loaded to allow the blade fiber optic receptacles 133 to move when mounted on information processing modules 24 to assist in axis alignment and connection to the backplane fiber optic plug 135.

Figure 18A:
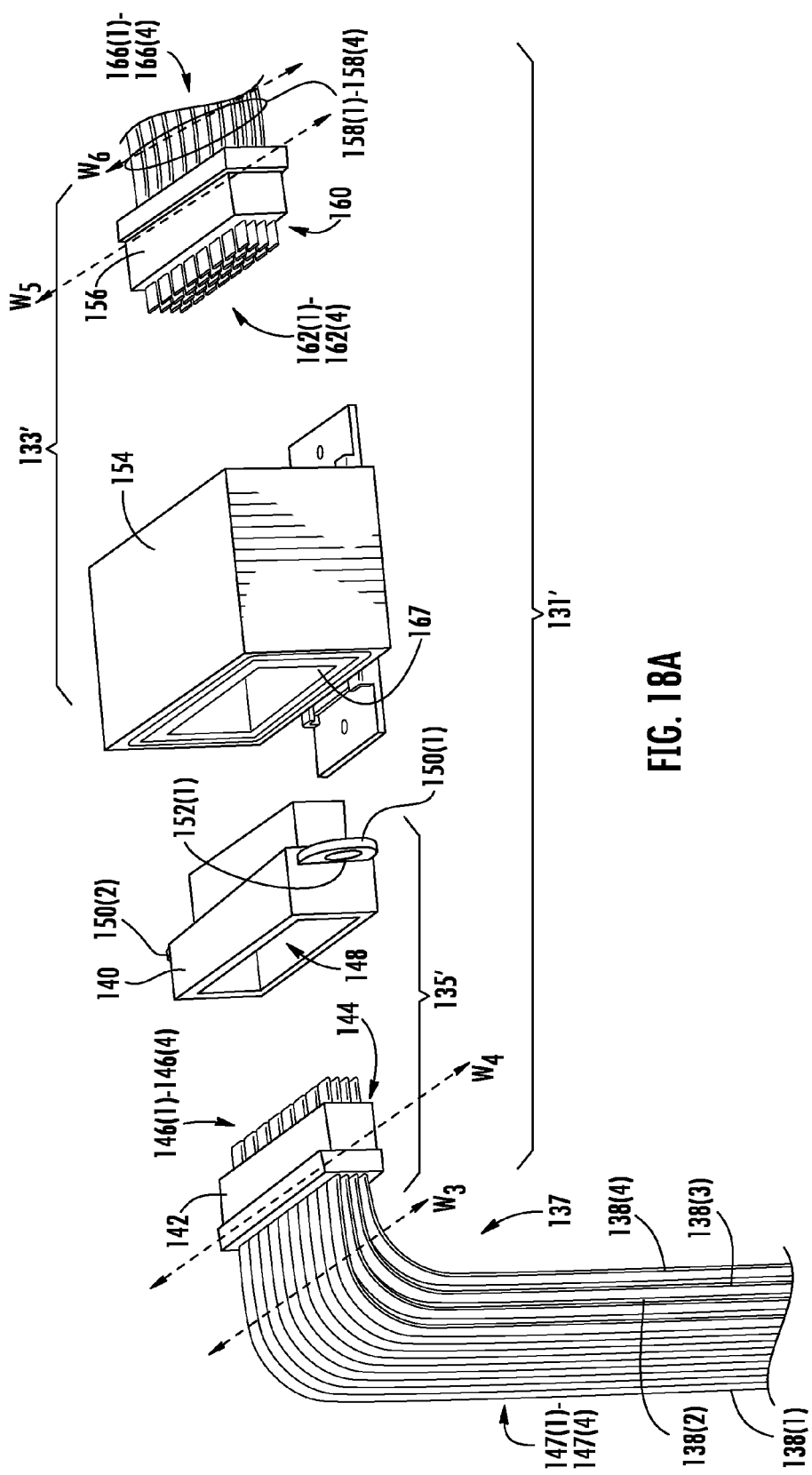
FIG. 18A is a side perspective, exploded view of another exemplary blade fiber optic receptacle and backplane fiber optic plug of a dense fiber optic connector assembly.
Figure 18B:
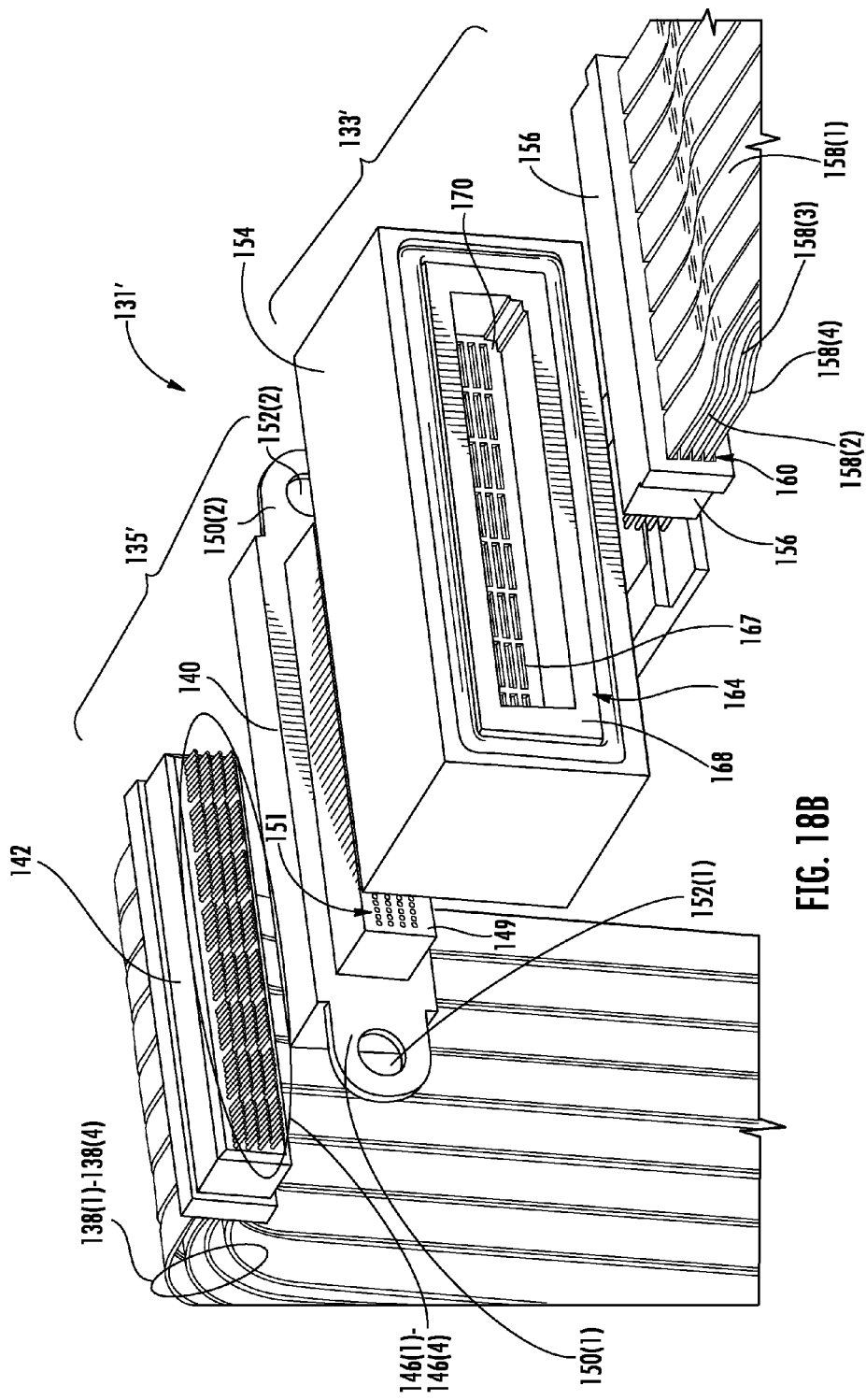
FIG. 18B is another close-up perspective, exploded view of the blade fiber optic receptacle and backplane fiber optic plug of the dense fiber optic connector assembly in FIG. 18A.
Figure 19:
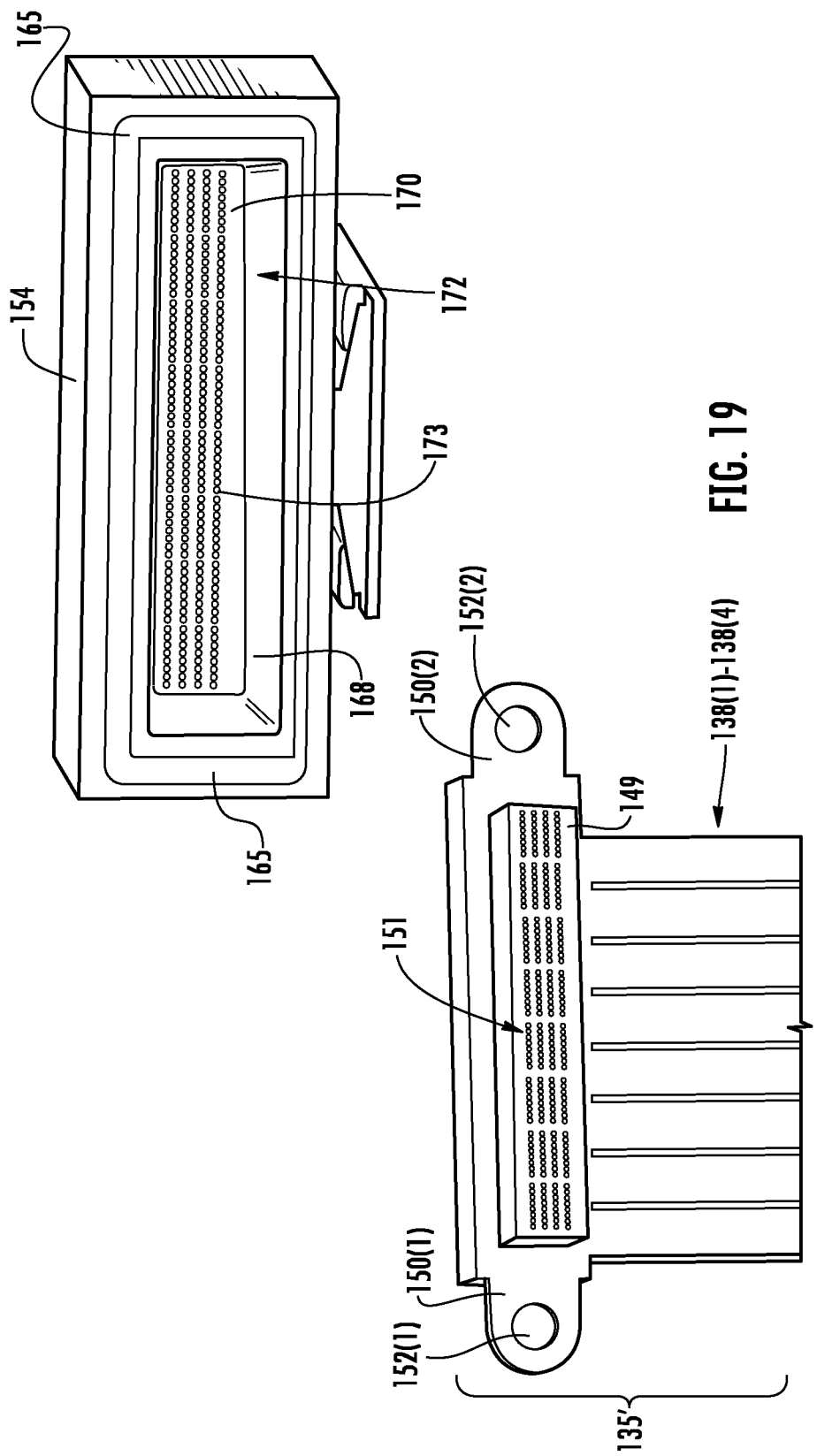
FIG. 19 is another close-up view of the blade fiber optic receptacle and backplane fiber optic plug of the dense fiber optic connector assembly in FIGS. 18A and 18B.

Another exemplary dense fiber optic connector assembly 131' is illustrated in FIGS. 18A-19B. FIG. 18A is a side perspective, exploded view of a blade fiber optic receptacle 133' and backplane fiber optic plug 135' of a dense fiber optic connector assembly 131'. FIG. 18B is another close-up perspective, exploded view of the blade fiber optic receptacle 133' and backplane fiber optic plug 135' of the dense fiber optic connector assembly 131' in FIG. 18A. FIG. 19 is another close-up view of the blade fiber optic receptacle 133' and backplane fiber optic plug 135' of the dense fiber optic connector assembly 131' in FIGS. 18A and 18B. The dense fiber optic connector assembly 131' in FIGS. 18A-19 is similar to the dense fiber optic connector assembly 131 in FIGS. 16B-17B. However, as will be discussed below in more detail, the dense fiber optic connector assembly 131' in FIGS. 18A-19 includes organizer ferrules that allow wider, higher fiber count, ribbonized fiber optic cables to be stacked and organized along their wide axis to be supported in the blade fiber optic receptacle 133' and the backplane fiber optic plug 135' to support a dense fiber count.

With reference to FIGS. 18A and 18B, the backplane fiber optic plug 135' supports up to two-hundred and fifty-six (256) or more optical fibers 137 in a single connector form factor. As will be described in more detailed below, the backplane fiber optic plug 135' is configured to support multiple stacked fiber optic cables 138(1)-138(4) or optical fibers for providing a high optical fiber count in the backplane fiber optic plug 135'. In this embodiment, the fiber optic cables 138(1)-138(4) are each comprised of a plurality of ribbonized fiber optic cables. As illustrated in FIG. 18A, the fiber optic cables 138(1)-138(4) are stacked along their wide axis $W_3$. Providing a backplane fiber optic plug 135' that is configured to receive ribbonized fiber optic cables is one method of allowing the backplane fiber optic plug 135' to support high density optical fiber count since ribbonized fiber optic cables are flat and efficient in terms of optical fiber count versus space. Further in this embodiment, each of the fiber optic cables 138(1)-138(4) are each comprised of a plurality of ribbonized cables which allows flexibility in providing intraconnections and interconnections facilitated by the optical backplane extension module 28 (see FIG. 3). Each fiber optic cable 138(1)-138(4) does not have to be intraconnected or interconnected to the same fiber optic connector depending on the design.

With continuing reference to FIGS. 18A and 18B, the backplane fiber optic plug 135' is comprised of a fiber optic plug body 140. The fiber optic plug body 140 may be a ferrule body. The fiber optic plug body 140 is configured to receive an organizer ferrule 142 that receives the fiber optic cables 138(1)-138(4) in an opening 144 disposed in the organizer ferrule 142. The organizer ferrule 142 is particularly well suited to facilitate ribbonization and insure that optical fibers engage the connector body 154 in an array structure. In this manner, the organizer ferrule 142 disposes end portions 146(1)-146(4) of the fiber optic cables 138(1)-138(4) in a compacted high density to be disposed in an opening 148 in the fiber optic plug body 140. The organizer ferrule 142 also facilitates pre-insertion laser processing of massed optical fibers exposed from the fiber optic cables 138(1)-138(4) for laser processing, including, without limitation, using the laser processing examples discussed above. In this embodiment, the fiber optic cables 138(1)-138(4) are disposed in the organizer ferrule 142 along the wide axis $W_4$ of the ferrule organizer 142. An adhesive may be provided to secure the organizer ferrule 142 in the fiber optic plug body 140 during assembly. The fiber optic plug body 140 and organizer ferrule 142 may be comprised of a plastic member that is molded or stamped, as examples. As illustrated in FIGS. 18B and 19, the fiber optic plug body 140 has an end face 149 that has a plurality of lenses 151 disposed therein to provide an optical transmission path to the end portions 146(1)-146(4) of optical fibers 147(1)-147(4) exposed from the fiber optic cables 138(1)-138(4).

With continuing reference to FIGS. 18A-19, the fiber optic plug body 140 also contains two tabs 150(1), 150(2) extending from the fiber optic plug body 140 for mounting the backplane fiber optic plug 135' to the rear side 38 of the extension module housing 35 (see FIG. 3). Each mounting tab 150(1), 150(2) contains an opening 152(1), 152(2) (FIG. 18B) that is configured to receive a fastener to secure the backplane connector frame 50 with the backplane fiber optic plugs 44(1)-44(4) to the extension module housing 35 (see FIG. 3) to form an optical backplane for connection to the blade fiber optic receptacles 46(1)-46(4).

FIGS. 18A and 18B illustrate details regarding the components of the blade fiber optic receptacle 133'. The blade fiber optic receptacle 133' includes a fiber optic receptacle body 154 and an organizer ferrule 156. The fiber optic receptacle body 154 is configured to receive the organizer ferrule 156, which then receives fiber optic cables 158(1)-158(4) from the information processing module 24 in an opening 160 disposed in the organizer ferrule 156. In this manner, the organizer ferrule 156 disposes end portions 162(1)-162(4) of the fiber optic cables 158(1)-158(4) in a compacted high density to form to be disposed in an opening 164 (FIG. 18B) in the fiber optic receptacle body 154. As illustrated in FIG. 18A, in this embodiment, the wide axis $W_5$ of the fiber optic cables 138(1)-138(4) are disposed in the organizer ferrule 142 along the wide axis $W_6$ of the ferrule organizer 142. An adhesive may be provided to secure the organizer ferrule 156 in the fiber optic receptacle body 154 during assembly. A soft elastomer 165 may be disposed in the fiber optic receptacle body 154 as illustrated in FIG. 19 to enable small movements of the organizer ferrule 156 in the connection direction axis. The fiber optic receptacle body 154 and organizer ferrule 156 may be comprised of a plastic member that is molded or stamped, as examples.

As illustrated in FIG. 18B, the fiber optic receptacle body 154 has an end face 167 disposed in a lens block 168 that has a plurality of lenses 170 disposed therein to provide an optical transmission path to end portions 162(1)-162(4) of the optical fibers 166(1)-166(4) (FIG. 18A) exposed from the fiber optic cables 158(1)-158(4). As illustrated in FIG. 19, the lens block 168 also has a plurality of lenses 172 disposed on an end face 173 of the fiber optic plug body 140 side of the fiber optic receptacle body 154 that are configured to be aligned with the end portions 146(1)-146(1) of the fiber optic cables 138(1)-138(4). In this manner, the lens block 168 is configured to provide a transmission path between the lenses 170, 172 to optically connect the end portions 146(1)-146(4) of the optical fibers 147(1)-147(1) disposed in the backplane fiber optic plug 135' to the end portions 162(1)-162(4) of the optical fibers 166(1)-166(4) disposed in the blade fiber optic receptacle 133'.

Figure 20A:
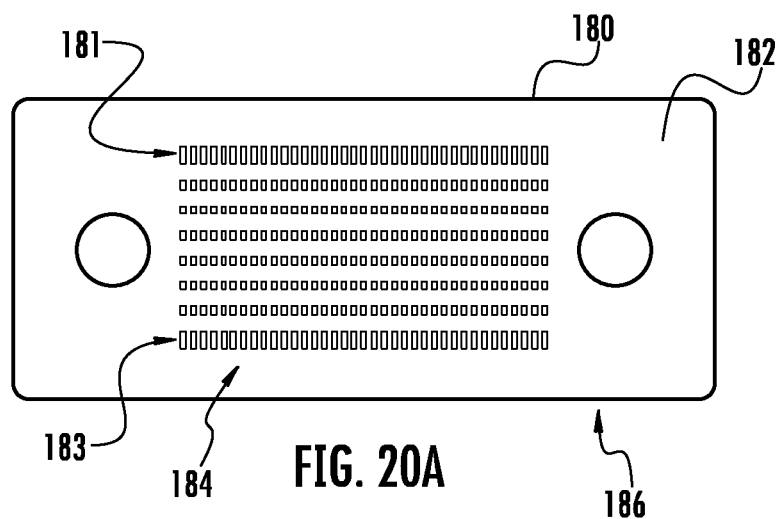
FIGS. 20A and 20B are front and rear views, respectively, of an exemplary molded fiber optic plug body that may be employed in a dense fiber optic connector assembly.
Figure 20B:
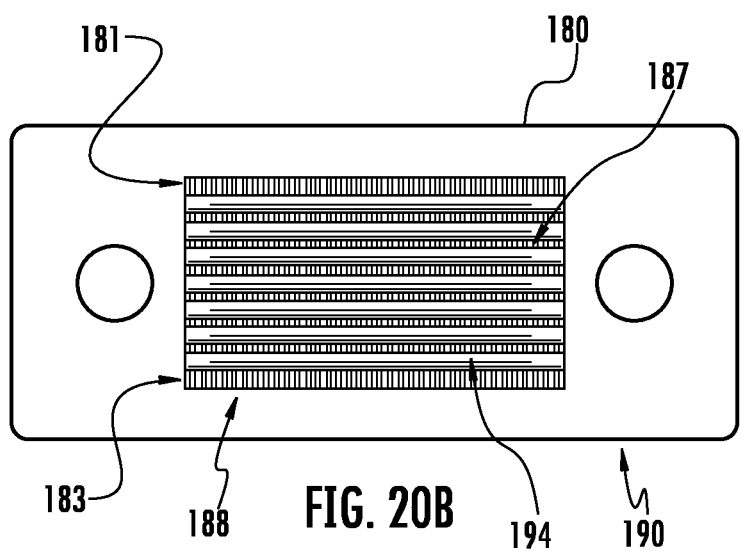
Figure 21B:
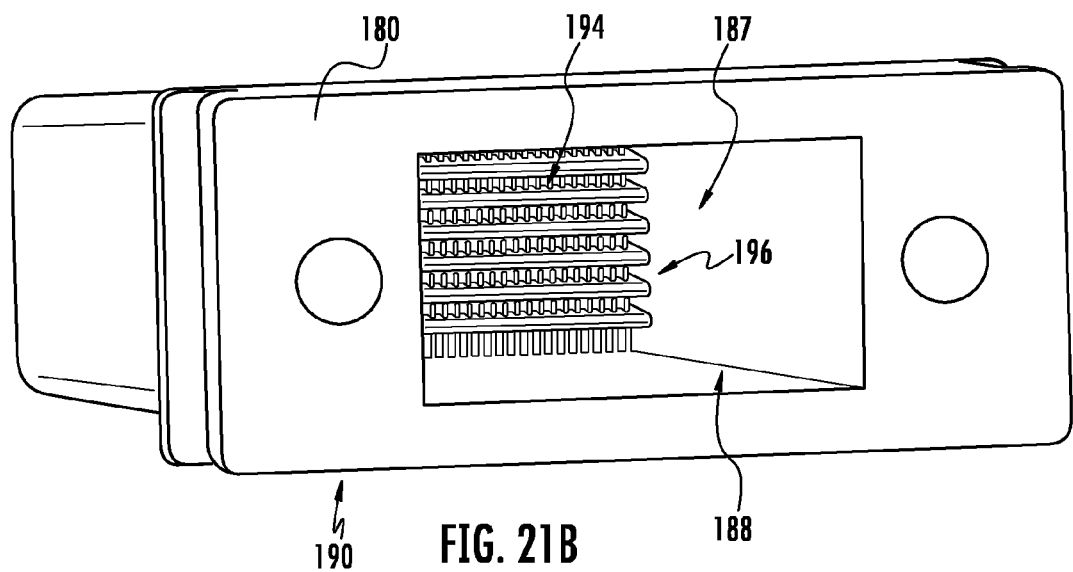

To provide the dense fiber optic connector disclosed herein, the dense fiber optic connectors may be molded. In this regard, FIGS. 20A and 20B are front and rear views, respectively, of an exemplary molded fiber optic plug body 180 that may be employed in a dense fiber optic connector assembly. FIGS. 21A and 21B are front and rear perspective views, respectively, of the molded fiber optic plug body 180 in FIGS. 20A and 20B. The molded fiber optic plug body 180 may be employed either as a blade fiber optic connector or a backplane fiber optic connector.

As illustrated in FIGS. 20A and 21A, the molded fiber optic plug body 180 has an end face 182 that includes fiber openings 184 disposed at a first end 186 to provide optical transmission paths to end portions of optical fibers disposed in the molded fiber optic plug body 180. The fiber openings 184 may be formed by curvatures formed in the end face 182 of the molded fiber optic plug body 180 wherein the molded fiber optic plug body 180 is formed from transmissive material having molded-in lenses, as previously described. Alternatively, the fiber openings 184 may receive GRIN lenses disposed in the molded fiber optic plug body 180 and end portions of the GRIN lenses disposed through the openings, as previously described. The top row 181 and the bottom row 183 of fiber openings disposed in the molded fiber optic plug body 180 are provided by the mold in this embodiment for mold robustness only, for example so that another strong material such as steel, can be inserted therein.

Figure 22B:
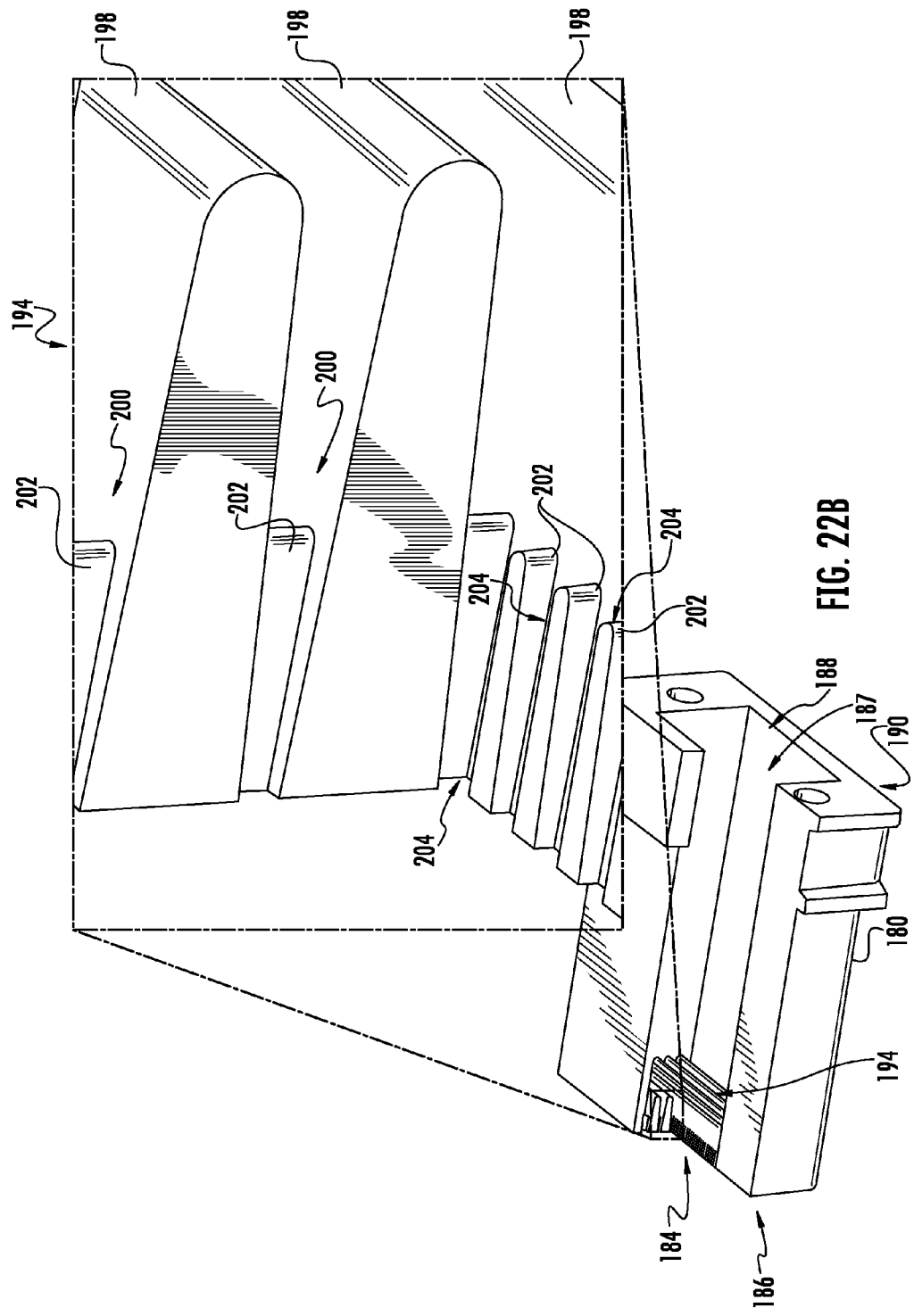
FIG. 22B is a close-up cutaway view of the lead-in detail of the molded fiber optic plug body in FIGS. 20A and 20B.

As illustrated in FIGS. 20B and 21B, an internal chamber 187 forming an opening 188 is molded into fiber optic plug body 180 on a second end 190. The opening 188 is configured to receive an organizer ferrule 192 illustrated in FIGS. 23A-23C and described below. A fiber lead-in structure 194 is disposed in the rear 196 of the internal chamber 187 to receive end portions of optical fibers disposed through the organizer ferrule 192. FIG. 22A is a close-up view of the rear perspective view of fiber lead-in structure 194 as a detail of the molded fiber optic plug body 180. As illustrated therein and in FIG. 22B, the fiber lead-in structure 194 is formed as part of the mold forming the internal chamber 187. The fiber lead-in structure 194 is comprised of row structures 198 with intermediate fiber lead-in areas 200 disposed therebetween. Vertical members 202 are disposed between the row structures 198 and spaced apart by width W to form openings 204 for receiving end portions of optical fibers. The number of row structures 198 and vertical members 202 and the width W between the vertical members 202 determine the number of optical fibers that can be supported by the molded fiber optic plug body 180. As an example, the outer diameter of the intermediate fiber lead-in areas 200 may be fifty (50) micrometers (μm) or more to support a high density of optical fibers in molded fiber optic plug body 180. MT technology or wire EDM may be leveraged to form intermediate fiber lead-in areas 200. The use of wire EDM to form the molded fiber optic plug body 180 can provide the fiber lead-in structure 194. For example, for a target one hundred (100) μm fiber coating, a ten to fifteen (10-15) μm "window" on either side of the square intermediate fiber lead-in areas 200 is available for fiber centering.

Figure 23B:
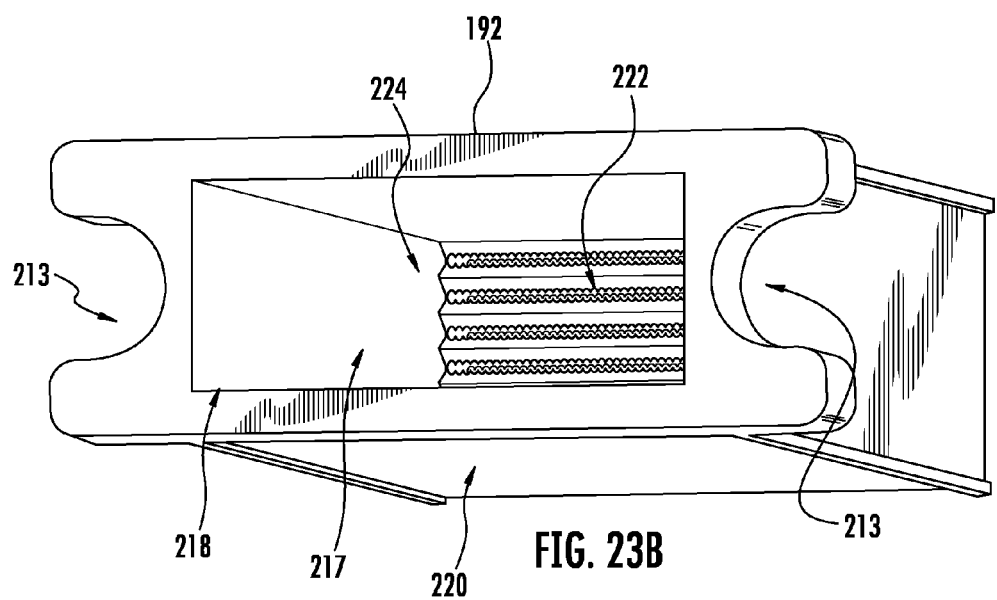
FIG. 23B is a rear perspective view of the organizer ferrule in FIG. 23A.
Figure 23C:
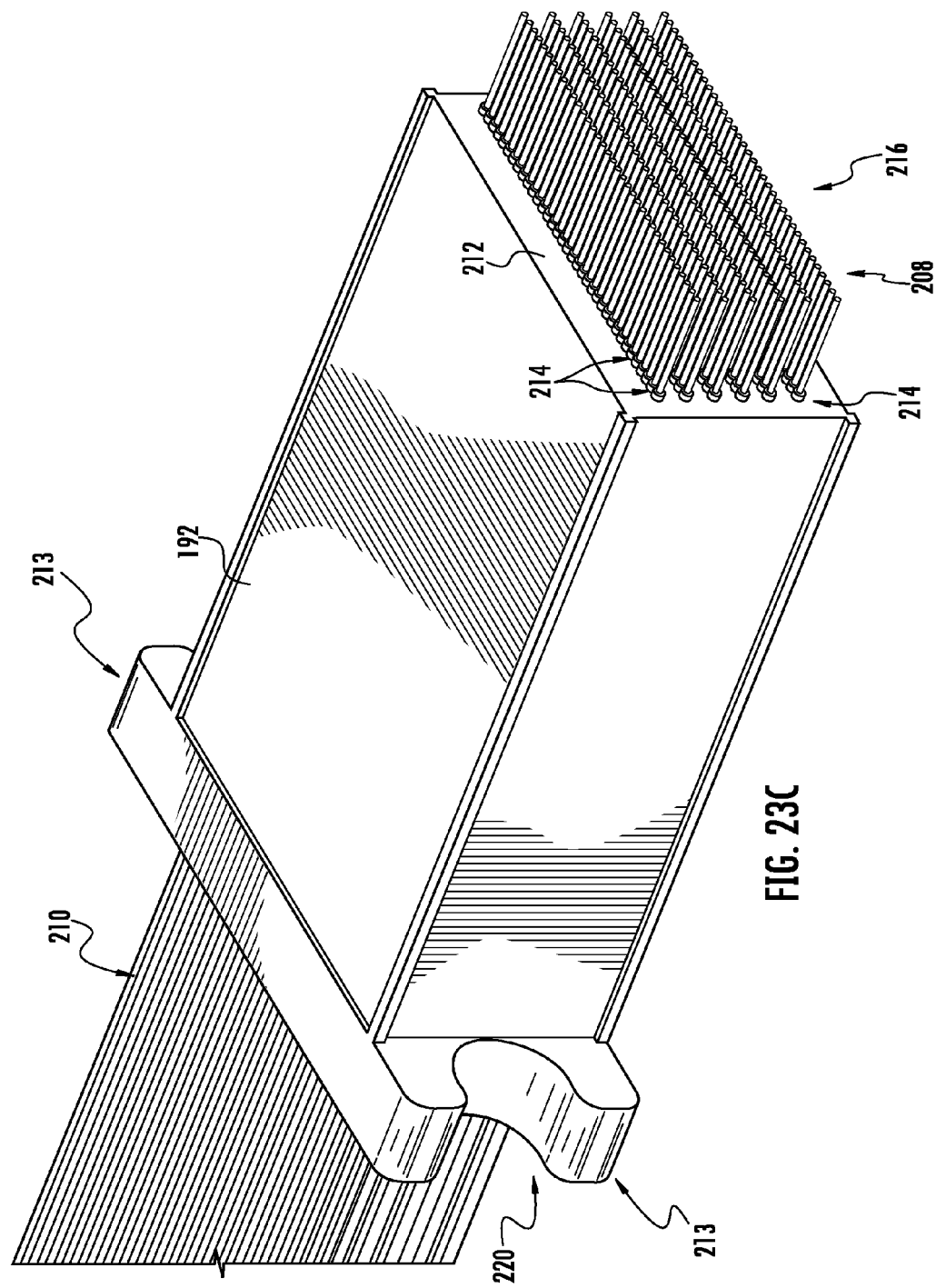
FIG. 23C is the organizer ferrule in FIGS. 23A and 23B receiving optical fibers.
Figure 24A:
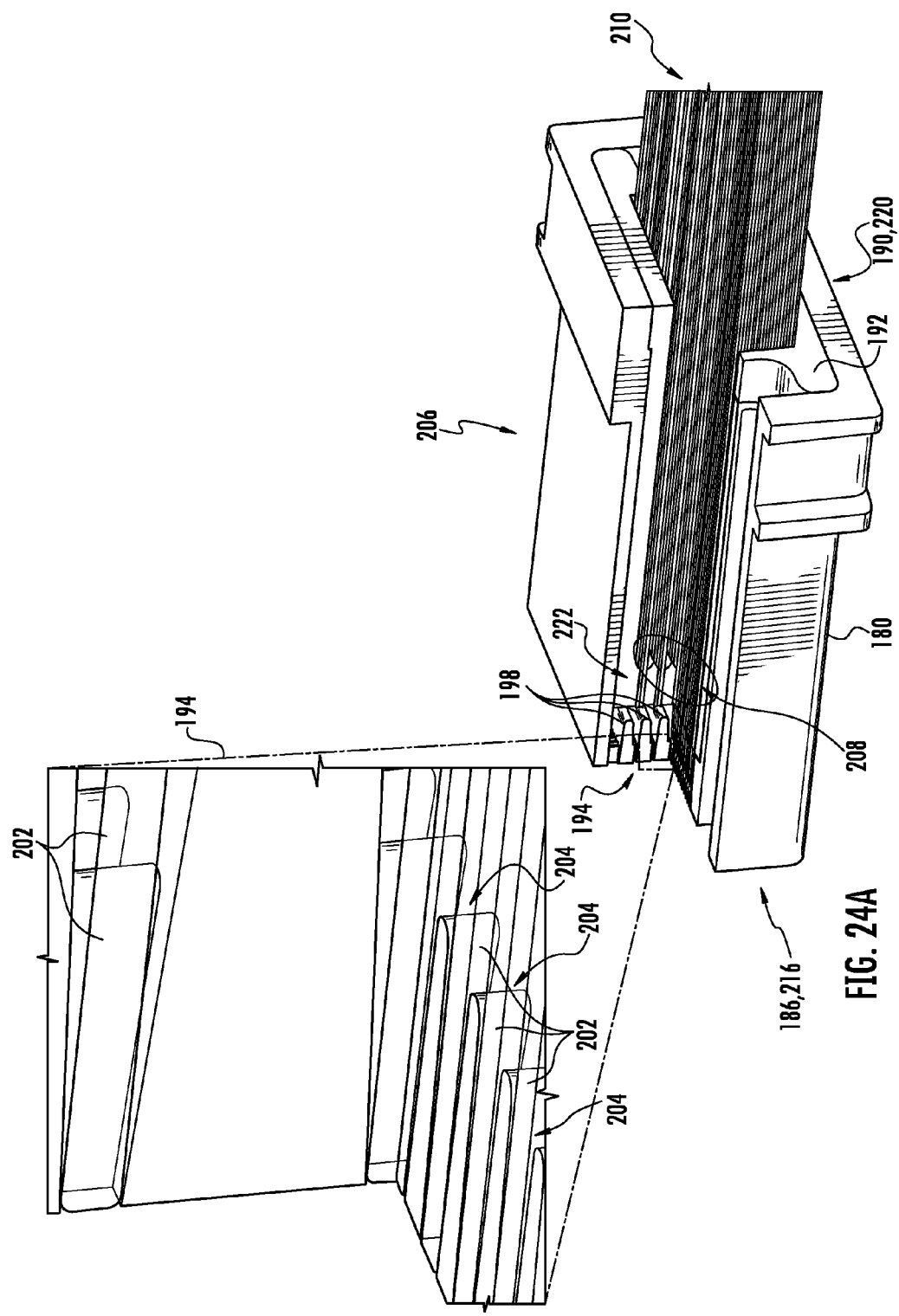
FIG. 24A is a rear perspective cutaway view of the organizer ferrule in FIGS. 23A-23C received in the molded fiber optic plug body in FIGS. 20A and 20B.

FIG. 23A is a front perspective view of the molded intermediate organizer ferrule 192 configured to facilitate optical fiber ribbonization and be disposed in the molded fiber optic plug body 180 in FIGS. 20A and 20B to form a dense fiber optic plug 206 in FIG. 24A. FIG. 23B is a rear perspective view of the organizer ferrule 192 in FIG. 23A. FIG. 23C is the organizer ferrule 192 receiving end portions 208 of optical fibers 210. As illustrated in FIG. 23A, the molded organizer ferrule 192 has an end face 212 that includes openings 214 disposed at a first end 216 to receive the end portions 208 of the optical fibers 210 disposed in the organizer ferrule 192, as illustrated in FIGS. 23C-24B. Note the inclusion of corner ribs 213 in the organizer ferrule 192 to allow high centering accuracy while still allowing draft, whether a ribbon, loose tube, or collection of small ribbon fibers are used.

Figure 24B:
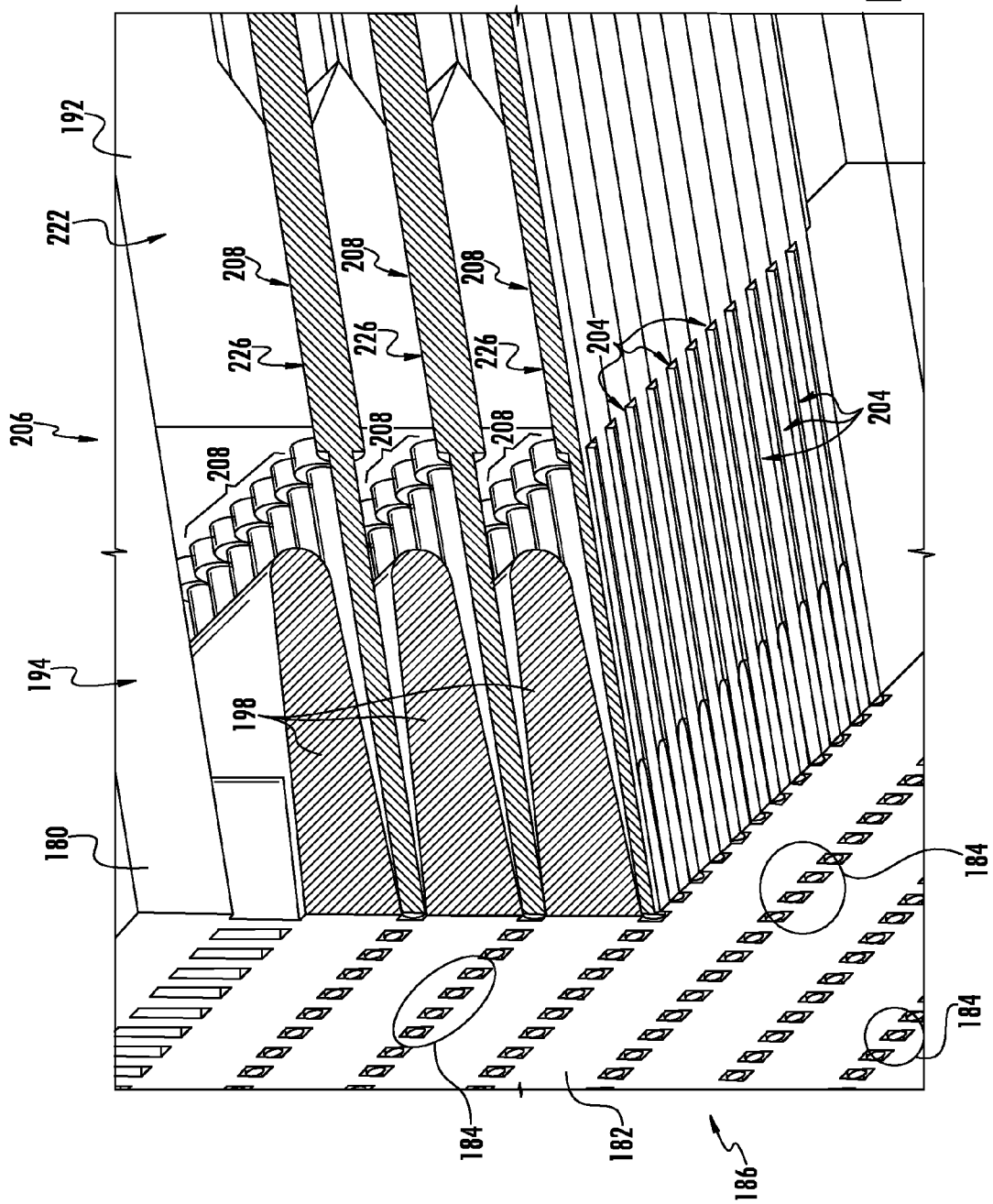
FIG. 24B is a close-up cutaway view of FIG. 24A.

As illustrated in FIG. 23B, an internal chamber 217 forming an opening 218 is molded into organizer ferrule 192 on a second end 220. The opening 218 is configured to receive the end portions 208 of the optical fibers 210 as illustrated in FIGS. 23C-24B and described below. A fiber lead-in structure 222 is disposed in the rear 224 of the internal chamber 217 to receive the end portions 208 of the optical fibers 210 disposed through the organizer ferrule 192. FIG. 24B is a close-up view of the rear perspective view of fiber lead-in structure 222 of the first end 216 of the organizer ferrule 192 interfaced with the fiber lead-in structure 194 of the molded fiber optic plug body 180. As illustrated therein and in FIG. 23B, the fiber lead-in structure 222 is formed as part of the mold forming the internal chamber 217. The fiber lead-in structure 222 is comprised of a plurality of the through holes 226 disposed in the rear 224 of the molded organizer ferrule 192 that form the openings 214 in the end face 212, as illustrated in FIG. 24B. The number of through holes 226 determines the number of optical fibers that can be supported by the organizer ferrule 192.

Figure 25A:
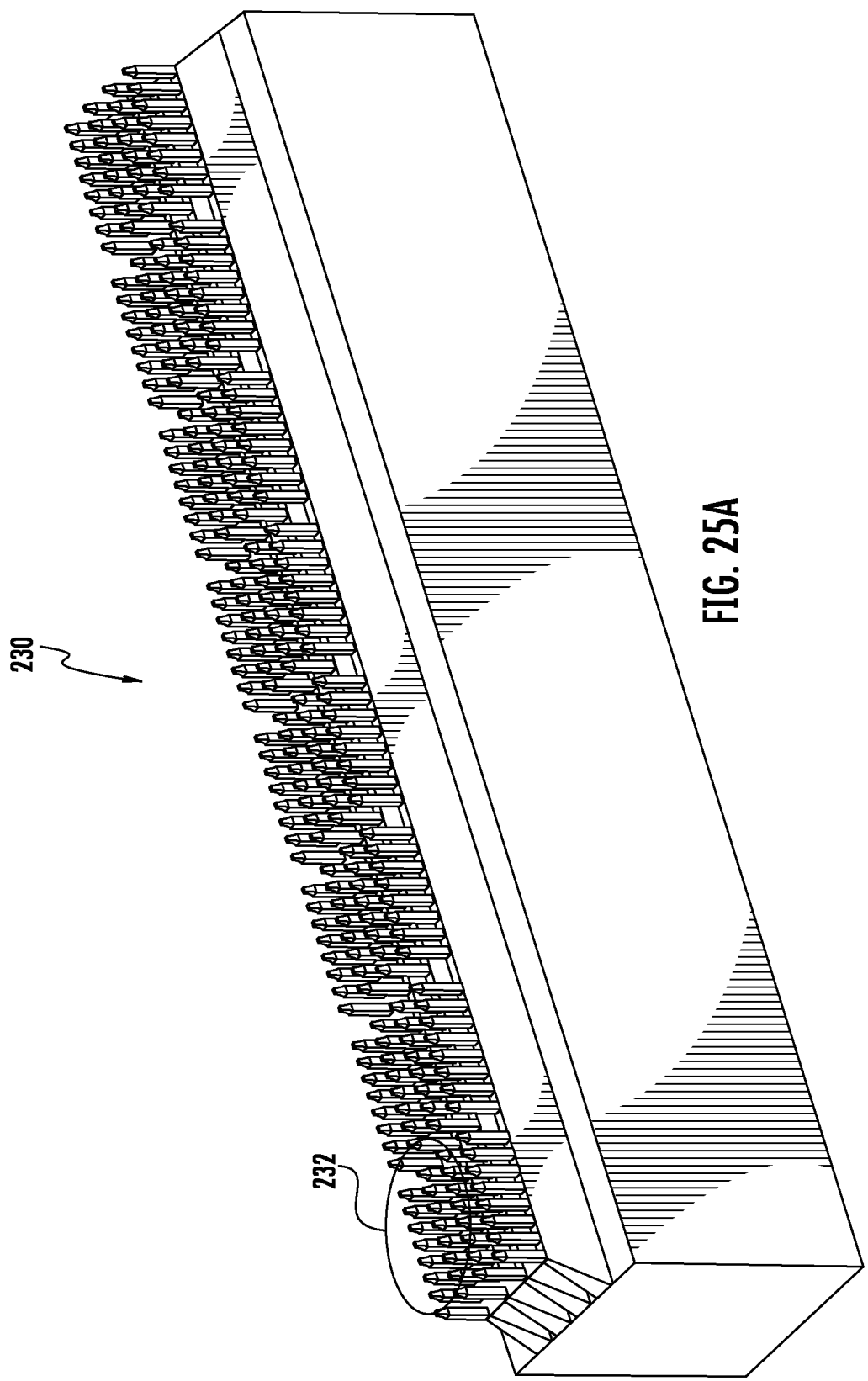
FIG. 25A is a perspective view of a projected fiber guide mold element that may be used to mold the fiber lead-in structure of the fiber optic plug body in FIGS. 21A-22B and organizer ferrule in FIGS. 23A-23C, respectfully.
Figure 25B:
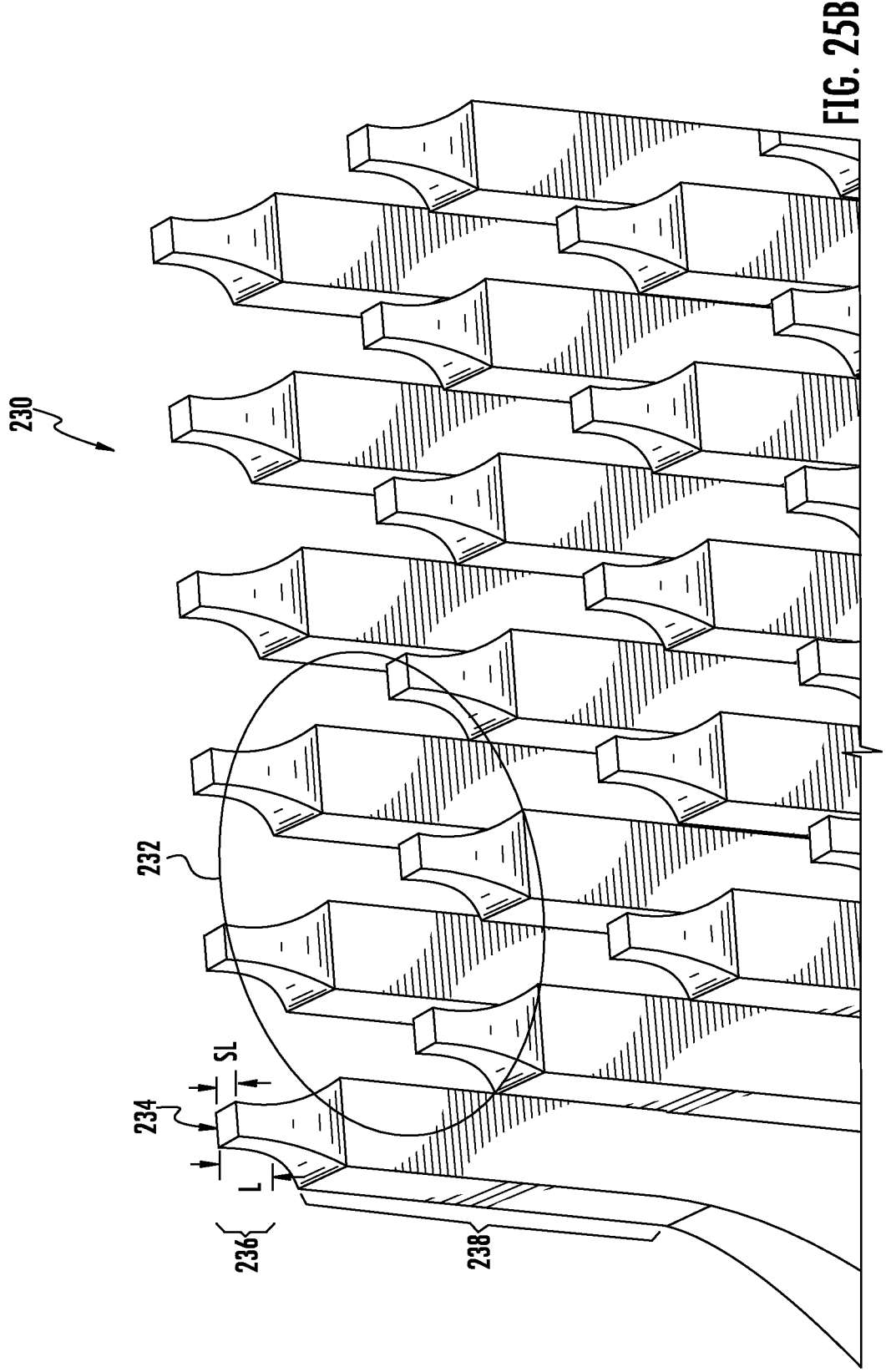
FIG. 25B is a perspective close-up view of the tips of the projected fiber guide mold element in FIG. 25A.

FIG. 25A is a perspective view of a projected fiber guide mold element 230 that may be used to mold the internal chambers 187, 217 and fiber lead-in structures 194, 222 in the fiber optic plug body 180 in FIGS. 21A-22B and the organizer ferrule 192 in FIGS. 23A-23C, respectfully. FIG. 25B is a perspective close-up view of the fiber lead-in mold tips 232 of the projected fiber guide mold element 230 in FIG. 25A. The projected fiber guide mold elements 230 may be constructed out of a suitable steel. As illustrated in FIGS. 25A and 25B, the fiber lead-in mold tips 232 of the projected fiber guide mold element 230 form the negative of the fiber lead-in structures 194, 222. The number of fiber lead-in mold tips 232 dictates the number of optical fibers supported. As illustrated in FIGS. 25A and 25B, there are up to two-hundred and fifty-six (256) fiber lead-in mold tips 232 or more to support up to two hundred fifty six (256) optical fibers or more.

As illustrated in FIG. 25B, the intermediate members 238 are square-shaped to form square-shaped passages when molding using the projected fiber guide mold element 230. Square-shaped passages can provide stronger mold elements as opposed to circular-shaped passages. Square-shaped passages also allow easier optical fiber insertion to reduce friction on the optical fiber and to provide additional space to support epoxy placing less sheer force on the optical fibers inserted therein. The end portions 234 of the fiber lead-in mold tips 232 are also square-shaped.

One purpose of the design of the mass array of the fiber lead-in mold tips 232 was to allow them to be brought against or adjacent to a planar mold surface. This may simplify the projected fiber guide mold element 230 by eliminating the need for a female side in which the fiber lead-in mold tips 232 are inserted into. In one embodiment, the array of fiber lead-in mold tips 232 could be brought into contact with a planar surface and open up the square-shaped members end portions 234 by a brushing or grinding operation. As an example, the fiber lead-in mold tips 232 of the projected fiber guide mold element 230 can be brought proximate to a planar surface in the mold. A secondary operation can be provided to open up the internal chambers 187, 217 formed by the fiber lead-in mold tips 232. The projected fiber guide mold element 230 used in a mold where the projected fiber guide mold element 230 is brought up against a planar mold surface such that the fiber lead-in mold tips 232 seal off.

With continuing reference to FIG. 25B, the side length or width of the tips 232 is SL (e.g., 100 um). The end portions 234 of the tips 232 are formed at the end of a length L of end sections 236 of the tips 232. The end section 236 is designed to provide a lead-in for a bare optical fiber and is sized appropriately. The intermediate member 238 is designed to provide a lead-in for a coated optical fiber and thus is sized larger than the end section 236. In one embodiment, the length L of the end sections 236 of the tips 232 is approximately one to three times the length of the side length SL of the end portions 234 of tips 232. This sizing is provided to provide an angled lead-in for the optical fiber as it is disposed in a lead-in formed by the fiber lead-in mold tip 232. If the ratio of length L of the end sections 236 of the tips 232 to the length of the side length SL of the end portions 234 of tips 232 is less than one (1), suppression of angular error may not be accomplished introducing optical attenuation.

More detail regarding the optical backplane extension module 28 illustrated in FIGS. 2A-3 will now be described. In this regard, FIGS. 26 and 27 are front and rear perspective views, respectively, of the optical backplane extension module 28. The optical backplane extension module 28 comprises the interior space 34 defined by the extension module housing 35 for maintaining and routing of the fiber optic cables 32 (see FIG. 3). The optical backplane extension module 28 support a plurality of backplane fiber optic connectors 36 attached to the fiber optic cables 32, which in this embodiment are backplane fiber optic plugs 44 described above.

As illustrated in FIGS. 26-28, the optical backplane extension module 28 supports disposing the fiber optic connectors 36 through a rear side 38 of the extension module housing 35 to form an optical backplane 240. The fiber optic connectors 36 are disposed through the rear side 38 of the extension module housing 35 along longitudinal axis $A_1$. The optical backplane 240 is provided to allow the backplane fiber optic connectors 36 to be directly optically connected to blade fiber optic connectors disposed in information processing modules 24. The backplane fiber optic connectors 36 may be comprised of different types of fiber optic connectors supporting different numbers of optical fibers. For example, as illustrated in FIGS. 26 and 27, the backplane fiber optic connector 36A is configured to be connected to a blade switch fiber optic connector. As an example, the switch fiber optic connector could be a monolithic connector that has enough fiber count to support connections to the other backplane fiber optic connectors 36B, with the fiber count being multiple of the number of other backplane fiber optic connectors 36B. The backplane fiber optic connectors 36B are configured to be connected to a server or data storage information processing modules 24.

With continuing reference to FIG. 26, the extension module housing 35 defines the interior space 34 by a base 242, a left side 244 disposed on a left end 245 of the base 242, and a right side 246 disposed on a right end 247 of the base 242. The rear side 38 is disposed on a rear end 248 of the base 242. A top side 250 is disposed on a top end 252 of the base 242. The base 242, left side 244, right side 246, rear side 38, and top side 250 form the extension module housing 35. A door 254 is hinged to base 242 to allow the internal chamber 34 to be closed off and opened for access.

Figure 29:
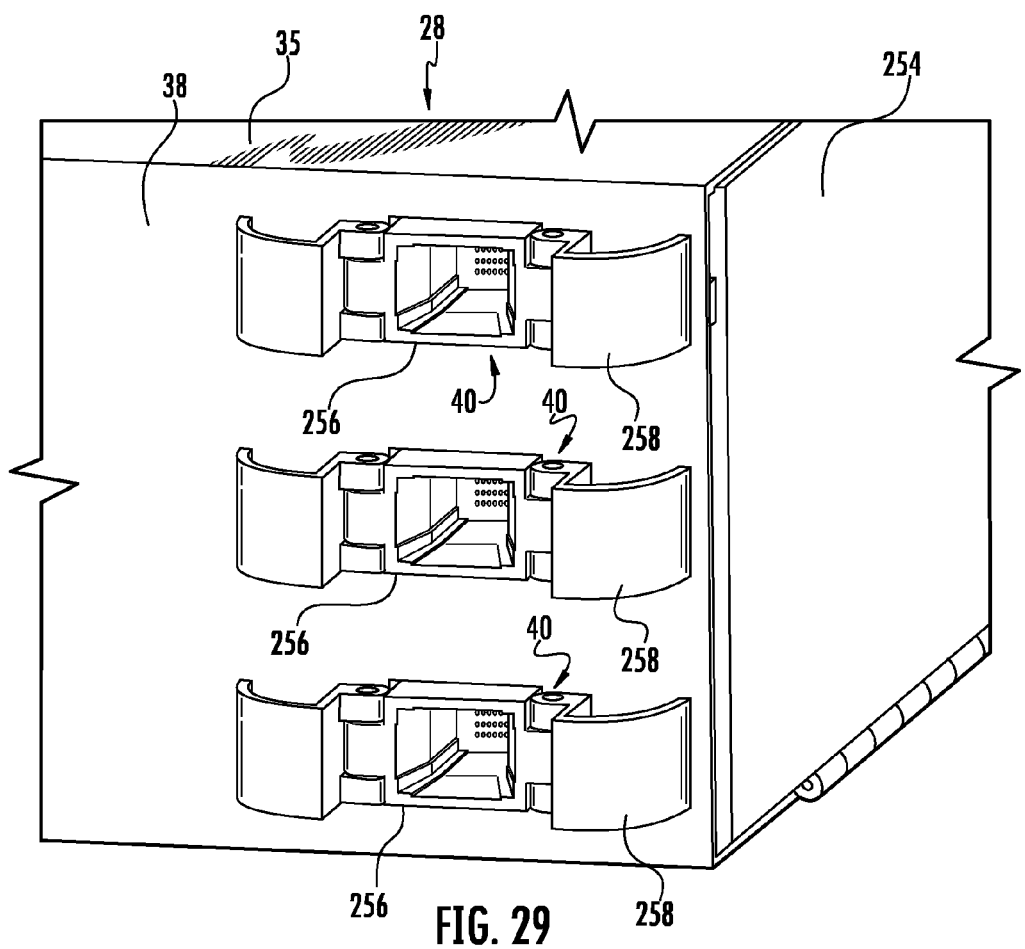
FIG. 29 is a close-up view of the interconnection fiber optic adapters disposed through interconnection ports in the side of the optical backplane extension module.

The optical interconnection ports 40 are illustrated in more detail in FIGS. 28 and 29. The optical interconnection ports 40 are disposed through the extension module housing 35 to allow fiber optic interconnections between the backplane fiber optic connectors 36 forming the optical backplane 240 and backplane fiber optic connectors 36 located outside of the extension module housing 35. For example, it may be desirable to optically connect one or more backplane fiber optic connectors 36 to other information processing modules 24 not optically connected to the backplane extension module 28 and/or other backplane extension modules 28 located in other areas of an equipment rack. Otherwise, the door 254 could not be fully closed on the backplane extension module 28 if fiber optic interconnections are desired. In this regard, fiber optic adapters 256 can be disposed in the optical interconnection ports 40 to allow for fiber optic interconnections in the backplane extension module 28. Debris shutters 258 may be provided as part of the fiber optic adapters 256 to prevent debris from entering the fiber optic adapters 256 when not in use. FIG. 28 shows the debris shutters 258 closed, and FIG. 29 shows the debris shutters 258 open.

Figure 30B:
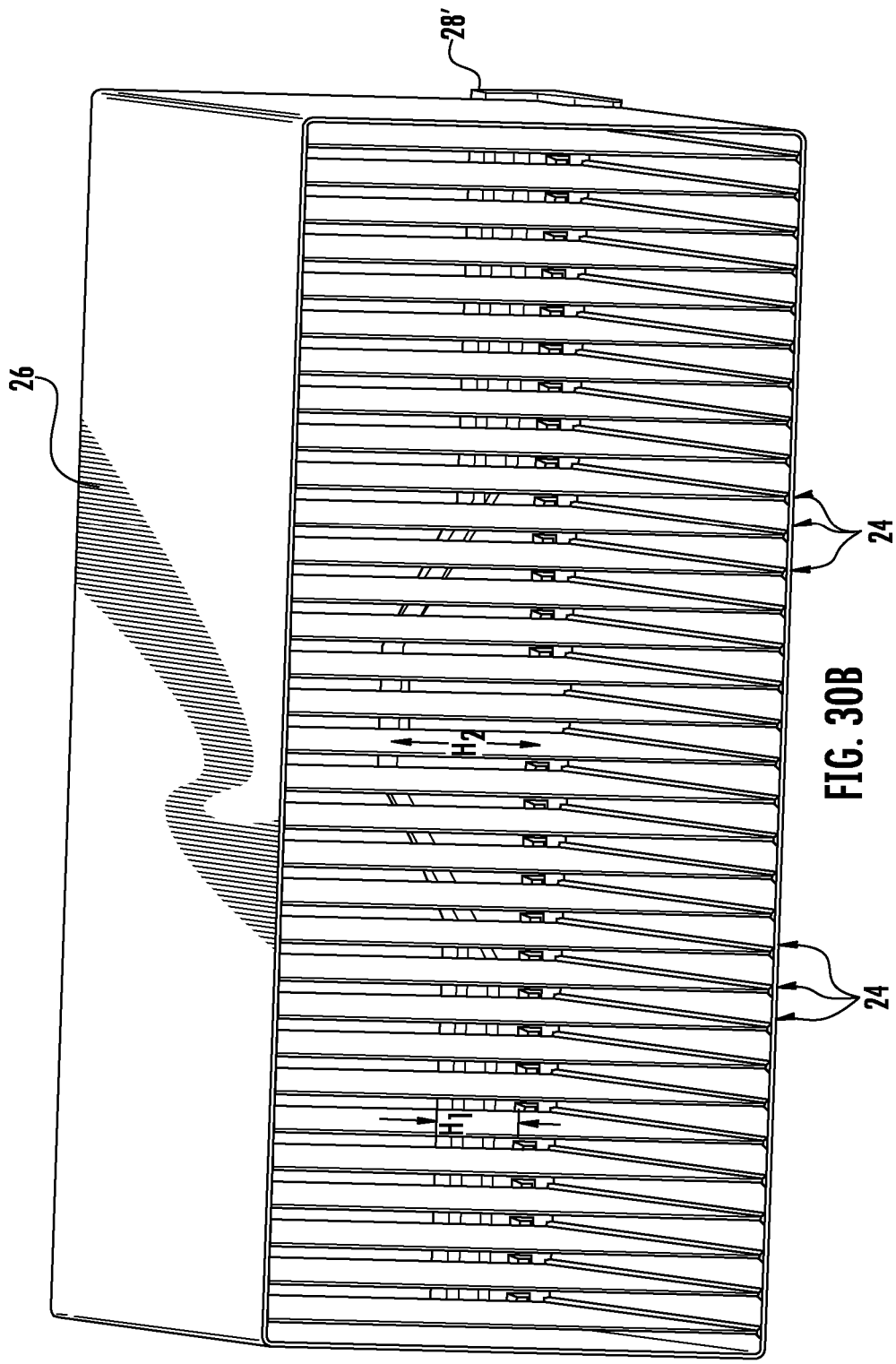

Other forms of the backplane extension module are possible. For example, FIGS. 30A and 30B are rear and front perspective views, respectively, of another backplane extension module 28' attached to a rack module housing 26. The rack module housing 26 supports information processing modules 24 as previously described. In this embodiment, the backplane extension module 28' includes an extension module housing 35' that is not rectangular and does not have the same height along the optical backplane. The extension module housing 35' is configured with different minimum height $H_1$ and maximum height $H_2$ to improve air flow from the information processing modules 24 in the rack module housing 26. This is because the fiber optic connectors disposed in the extension module housing 35' are not the same height, as illustrated in FIGS. 31A and 31B discussed below. Thus, the height of the extension module housing 35' can be tailored to avoid unnecessarily reducing air flow.

FIGS. 31A and 31B are front and rear perspective views, respectively, of the optical backplane extension module 28' in FIGS. 30A and 30B. As illustrated in FIG. 31B, a number of backplane fiber optic connectors 36' are disposed through a rear side 38' of the extension module housing 35' to provide an optical backplane 41 similar to that described above with respect to the optical backplane extension module 28. As illustrated, some of the backplane fiber optic connectors 36A' are less in height than other backplane fiber optic connectors 36B'. Thus, the height of the extension module housing 35' is provided as a non-planar height to avoid the height of the extension module housing 35' being greater than needed to support the backplane fiber optic connectors 36A' and backplane fiber optic connectors 36B' forming the optical backplane 41. This will reduce the surface area of the rear side 38' that is abutted adjacent to the rack module housing 26 when the extension module housing 35' is installed to reduce blocking air flow. Also, the backplane fiber optic connectors 36A' and 36B' are provided in pairs for redundant fiber optic connections in this embodiment.

When installing the optical backplane extension module 28' to a rack module housing 28, it is important to align the optical backplane 41 with the fiber optic connectors disposed on the information processing modules 24 for proper connection. Any alignment errors increase among stacked rack module housings 28. In this regard, FIG. 32A is a close-up view of alignment members 260 disposed in the rear side 38' of the optical backplane extension module 28' to align the optical backplane extension module 28' with the information processing modules 24 disposed in a rack module housing 26. FIG. 32B is a close-up perspective view of backplane fiber optic connectors 36 disposed between alignment members 260 in the optical backplane extension module 28'. The alignment members 260 are disposed on the exterior side of the rear side 38' of the extension module housing 35'.

With reference to FIGS. 32A and 32B, the alignment members 260 are configured to engage with a complementary alignment member disposed in the rack module housing 26 to align the plurality of backplane fiber optic connectors 36 with the plurality of blade fiber optic connectors. The intent of providing the alignment members 260 is to provide a more accurate rack module housing 26 for optical information processing modules 24, which may in turn allow simplified fiber optic connectors to be employed.

With continuing reference to FIGS. 32A and 32B, in this embodiment, the alignment members 260 are formed from a non-planar surface 262 disposed in the rear side 38' of the extension module housing 35'. The non-planar surface 262 is comprised of a plurality of protrusions 264 forming a plurality of grooves 266 each formed between adjacent protrusions 264 among the plurality of protrusions 264. Because the backplane fiber optic connectors 36' are disposed through the rear side 38' of the extension module housing 35' in a fixed, known location, the backplane fiber optic connectors 36 are located in known fixed location with respect to the alignment members 260. When the alignment members 260 mate with complementary grooves and alignment members 260 in the rack module housing 26, an alignment is forced to the extension module housing 35' that will assist in proper connection between the backplane fiber optic connectors 36' and the blade fiber optic connectors. The alignment members 260 may be disposed in the optical backplane extension module 28 in FIGS. 2A-3 as well.

It may also be desired to provide for the base member 267 in which the alignment members 260 are disposed to extend out beyond the rear side 38' of the backplane extension housing 35' to extend into the rack module housing 26. In this manner, the information processing modules 24 can be disposed on their bottom ends with the base member 267 and register with the base member 267 through a registration means. In this case, since both the information processing modules 24 and the backplane fiber optic connectors 36' would be fixedly disposed in the base member 267, alignment is forced to exist between the backplane fiber optic connectors 36' and the blade fiber optic connectors 46 (see FIG. 4B).

Even with alignment of backplane fiber optic connectors 36, 36' aligned with the rack module housing 26, the information processing modules 24 can be aligned and provided in known locations in the rack module housing 26. In this manner, alignment of an optical backplane extension module 28, 28' with the rack module housing 26 will ensure an alignment between the backplane fiber optic connectors 36, 36' and the blade fiber optic connectors. It may be desired to provide both vertical and horizontal alignment of the information processing modules 24 in the rack module housing 26.

Figure 33:
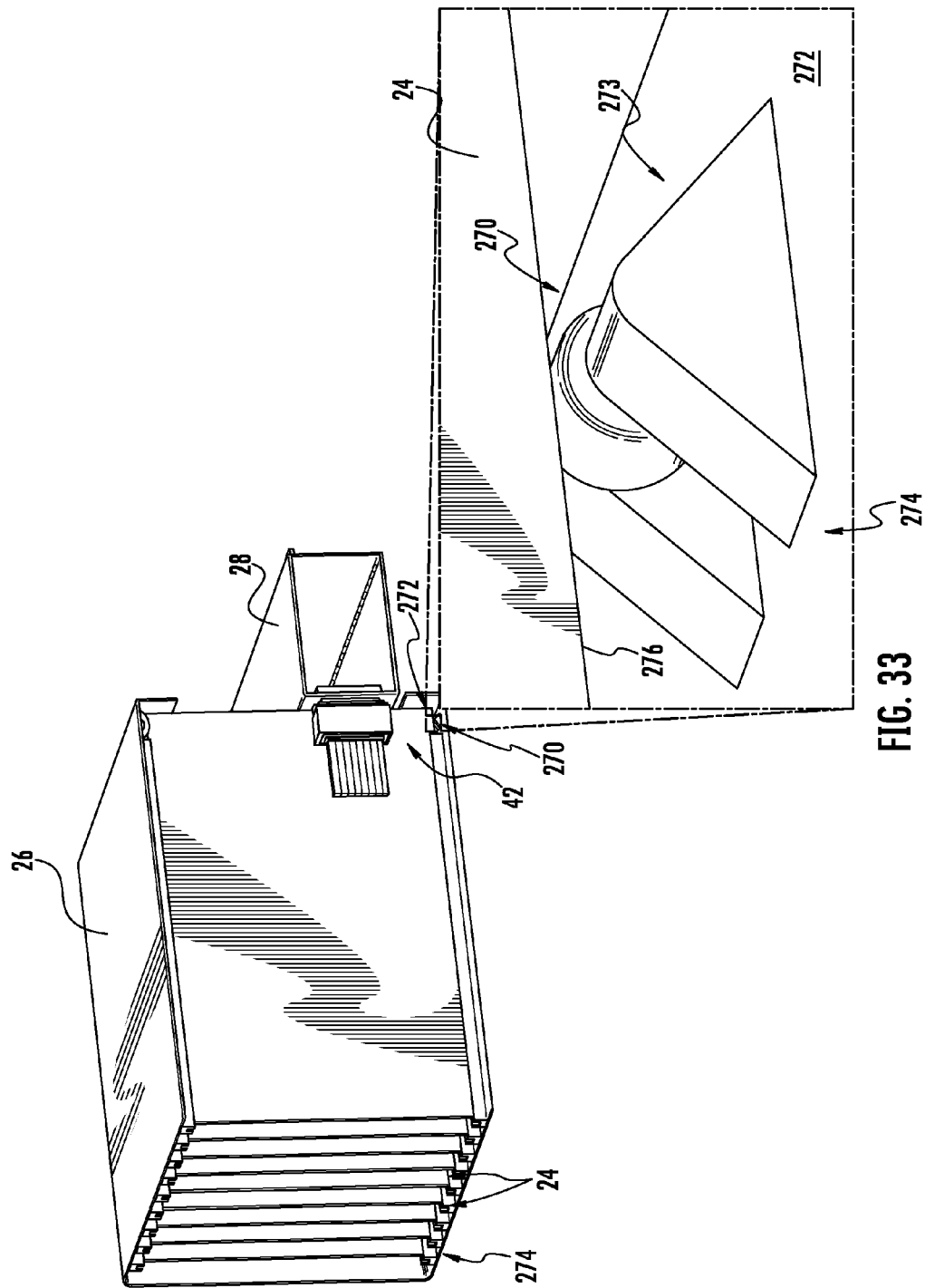
FIG. 33 is a side perspective view and close-up view of bias wheels that provides a lower datum for the information processing modules disposed in the rack module housing.

In this regard, FIG. 33 is a side perspective view and close-up view of bias wheels 270 that provides a lower datum for the information processing modules 24 disposed in the rack module housing 26. Only one bias wheel 270 is shown, but a plurality of bias wheels 270 can be provided, including one for each information processing module 24. The bias wheel 270 is mounted to a mounting structure 273. The bias wheel 270 is allowed to rotate in the mounting structure 273. As illustrated in FIG. 33, the bias wheel 270 is disposed in an interior space 272 on a base 274 of the rack module housing 26 in alignment with an insertion slot for an information processing module 24. For example, the base 274 may be the base member 267 in which the alignment members 260 are disposed to extend out beyond the rear side 38' of the backplane extension housing 35' to extend into the rack module housing 26. When the information processing module 24 is inserted in rack module housing 26, a bottom 276 of the information processing module 24 will engage the bias wheel 270. The bias wheel 270 will ensure the information processing module 24 is disposed in a fixed, known vertical location with the rack module housing 26 for vertical alignment.

To provide an upper datum for horizontal alignment of information processing modules 24 disposed in the rack module housing 26, FIG. 34 is provided. FIG. 34 illustrates a side perspective view and close-up view of spring-loaded biasing members 280. A spring-loaded biasing member 280 may be provided for each slot in the rack module housing 26 that can accept an information processing module 24. The spring-loaded biasing member 280 is installed at the top interior side 282 of the rack module housing 26 to be disposed above an information processing module 24 when installed in the rack module housing 26. The spring-loaded biasing member 280 comprises an alignment member 284 configured with a slot 286 to receive a spring 288. The spring 288 abuts the top interior side 282 of the rack module housing 26. When an information processing module 24 is inserted into the rack module housing 26, the top interior side 282 of the information processing module 24 is configured to abut and the alignment member 284 is configured push down against information processing module 24 to form an upper datum. Along with the lower datum provided by the bias wheels 270 in FIG. 33, the spring-loaded biasing member 280 assists in vertical alignment of the information processing module 24 disposed in the rack module housing 26.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, embodiments provide for fiber optic plugs to be disposed on the optical backplane extension module and fiber optic receptacles to be disposed on the information processing modules, the opposite configuration could be provided and is encompassed within the scope of the disclosure and the claims. Fiber optic receptacles could be disposed in the optical backplane extension module and fiber optic plugs disposed on the information processing modules.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. An optical backplane extension module, comprising:
an extension module housing comprising an interior space defined by a base, a left side disposed on a left end of the base, a right side disposed on a right end of the base opposite the left end, and a rear side disposed on a rear end of the base;
a plurality of backplane fiber optic connectors disposed through the rear side of the extension module housing and accessible through an exterior side of the rear side, the plurality of backplane fiber optic connectors configured to be directly optically connected to a plurality of blade fiber optic connectors disposed in a plurality of information processing modules disposed in a rack module housing; and
at least one interconnection port disposed in the extension module housing, the at least one interconnection port configured to establish an optical connection with one or more of the plurality of backplane fiber optic connectors.

2. The optical backplane extension module of claim 1, wherein the extension module housing further comprises a door attached to a front end of the base, the door configured to be opened to allow access to the interior space.

3. The optical backplane extension module of claim 1, further comprising at least one alignment member disposed on the exterior side of the rear side of the extension module housing, the at least one alignment member configured to engage with a complementary alignment member disposed in an equipment rack to align the plurality of backplane fiber optic connectors with the plurality of blade fiber optic connectors.

4. The optical backplane extension module of claim 3, wherein the at least one alignment member is comprised of a non-planar surface.

5. The optical backplane extension module of claim 4, wherein the non-planar surface is comprised of a plurality of protrusions forming a plurality of grooves each formed between adjacent protrusions among the plurality of protrusions.

6. The optical backplane extension module of claim 1, wherein a height of the extension module housing is less than a height of the rack module housing.

7. The optical backplane extension module of claim 1, further comprising a non-planar top side disposed in the extension module housing.

8. The optical backplane extension module of claim 1, wherein each of the plurality of backplane fiber optic connectors is comprised of a plurality of backplane fiber optic plugs configured to be directly optically connected to the plurality of blade fiber optic connectors comprised of a plurality of blade fiber optic receptacles disposed in the plurality of information processing modules.

9. The optical backplane extension module of claim 1, wherein the interior space is configured to provide a routing area inside the extension module housing for fiber optic cables optically connected to the plurality of backplane fiber optic connectors.

10. The optical backplane extension module of claim 1, wherein the plurality of backplane fiber optic connectors is comprised of at least one backplane fiber optic connector having a first height and at least one second backplane fiber optic connector having a second height.

11. The optical backplane extension module of claim 1, wherein the plurality of backplane fiber optic connectors are each configured to receive a plurality of backplane fiber optic ribbon ends.

12. The optical backplane extension module of claim 1, wherein the plurality of backplane fiber optic connectors are each comprised of backplane fiber optic connectors supporting at least one hundred twenty eight (128) optical fibers.

13. The optical backplane extension module of claim 1, wherein the plurality of backplane fiber optic connectors are aligned along a longitudinal axis of the rear side of the extension module housing.

14. A method of connecting an optical backplane extension module to a rack module housing, comprising:
providing an optical backplane extension module, comprising:
an extension module housing comprising an interior space defined by a base, a left side disposed on a left end of the base, a right side disposed on a right end of the base opposite the left end, and a rear side disposed on a rear end of the base;
a plurality of backplane fiber optic connectors disposed through the rear side of the extension module housing and accessible through an exterior side of the rear side; and
at least one interconnection port disposed in the extension module housing; and
directly optically connecting the plurality of backplane fiber optic connectors disposed through the rear side of the extension module housing to a plurality of blade fiber optic connectors disposed in a plurality of information processing modules disposed in a rack module housing; and
directly optically connecting at least one of the plurality of backplane fiber optic connectors to the at least one interconnection port.

15. The method of claim 14, further comprising attaching the extension module housing to the rack module housing.

16. The method of claim 14, further comprising engaging at least one alignment member disposed on the exterior side of the rear side of the extension module housing with a complementary alignment member disposed in an equipment rack to align the plurality of backplane fiber optic connectors with the plurality of blade fiber optic connectors.

17. The method of claim 16, wherein the at least one alignment member extends from the exterior side of the rear side of the extension module housing configured to be disposed in a rack module housing.

18. The method of claim 14, comprising directly optically connecting the plurality of backplane fiber optic connectors comprised of a plurality of first backplane fiber optic plugs, to the plurality of blade fiber optic connectors comprised of a plurality of blade fiber optic receptacles disposed in the plurality of information processing modules.

19. The method of claim 14, further comprising connecting at least one backplane fiber optic cable from at least one of the plurality of backplane fiber optic connectors to at least one interconnection port disposed in the extension module housing.

* * * * *